(12) United States Patent
Ferraro et al.

(10) Patent No.: US 7,554,542 B1
(45) Date of Patent: Jun. 30, 2009

(54) IMAGE MANIPULATION METHOD AND SYSTEM

(75) Inventors: Michael Ferraro, New York, NY (US);
Michael Sweet, Jersey City, NJ (US)

(73) Assignee: Possible Worlds, Inc., New York, NY (US)

( * ) Notice: Subject to any disclaimer, the term of this patent is extended or adjusted under 35 U.S.C. 154(b) by 967 days.

(21) Appl. No.: 09/713,476

(22) Filed: Nov. 15, 2000

Related U.S. Application Data

(60) Provisional application No. 60/165,822, filed on Nov. 16, 1999.

(51) Int. Cl.
*G06T 15/00* (2006.01)
(52) U.S. Cl. .................. 345/427; 345/473; 345/581
(58) Field of Classification Search .............. 345/427, 345/581, 473, 474, 475, 727
See application file for complete search history.

(56) References Cited

U.S. PATENT DOCUMENTS

| | | | | |
|---|---|---|---|---|
| 4,305,131 | A | | 12/1981 | Best .......................... 364/521 |
| 5,005,459 | A | | 4/1991 | Adachi et al. ................. 84/453 |
| 5,596,695 | A | | 1/1997 | Hamada et al. ............. 395/154 |
| 5,923,337 | A | * | 7/1999 | Yamamoto .................. 345/473 |
| 5,933,150 | A | | 8/1999 | Ngo et al. ................... 345/473 |
| 5,999,207 | A | * | 12/1999 | Rodriguez et al. ........ 348/14.03 |
| 6,535,215 | B1 | * | 3/2003 | DeWitt et al. ............... 345/473 |
| 6,662,161 | B1 | * | 12/2003 | Cosatto et al. .............. 704/260 |

FOREIGN PATENT DOCUMENTS

| | | |
|---|---|---|
| EP | 0 473 043 A2 | 3/1992 |
| EP | 0 597 316 A2 | 5/1994 |
| WO | WO/ 98/35320 | 8/1998 |

OTHER PUBLICATIONS

Patent Abstract of Japan, publication No. 11259679, published Sep. 24, 1999, entitled: "Method And Device For Transmitting And Receiving Finger Language CG Animation," 1 page.
Patent Abstract of Japan, publication No. 10312413, published Nov. 24, 1998, entitled: "Management Analysis System," 1 page.

(Continued)

*Primary Examiner*—Phu K Nguyen
(74) *Attorney, Agent, or Firm*—Morgan & Finnegan LLP

(57) ABSTRACT

An animation system is made up of an audio analysis unit, having an audio output and a state change output, and a control unit having an input and an output, the input being constructed to receive a state change indication from the audio analysis unit, the control unit being further constructed to generate compositing command information for individual component elements of an animation frame and send the compositing command information out the output. A method of creating an animation from a set of actions involves receiving a set of signals reflecting the set of actions, outputting a set of compositing commands based upon the set of signals, the set of compositing commands being related to the set of signals by sequences of transition data items, and compositing first images into a first animation using the set of compositing commands and a first graphic database.

87 Claims, 128 Drawing Sheets

OTHER PUBLICATIONS

Patent Abstract of Japan, publication No. 11319314, published Nov. 24, 1999, entitled: "Method For Controlling Music Game Device With Singing Voice By Automatic Accompaniment And Animation," 1 page.

Patent Abstract of Japan, publication No. 11328432, published Nov. 30, 1999, entitled: "Method For Reproducing Animation And Device Therefor And System Therefor" 1 page.

Baglole, Joel, "Cartoons Become Curricula at the Harvard of Computer Animation", Wall Street Journal Marketplace, Tuesday, Aug. 8, 2000, pp. B1 and B16.

Bregler, Chris, "Video Based Animation Techniques for Human Motion," 1 page, Apr. 1999.

International Search Report dated Apr. 4, 2001 of the PCT/US00/31505.

* cited by examiner

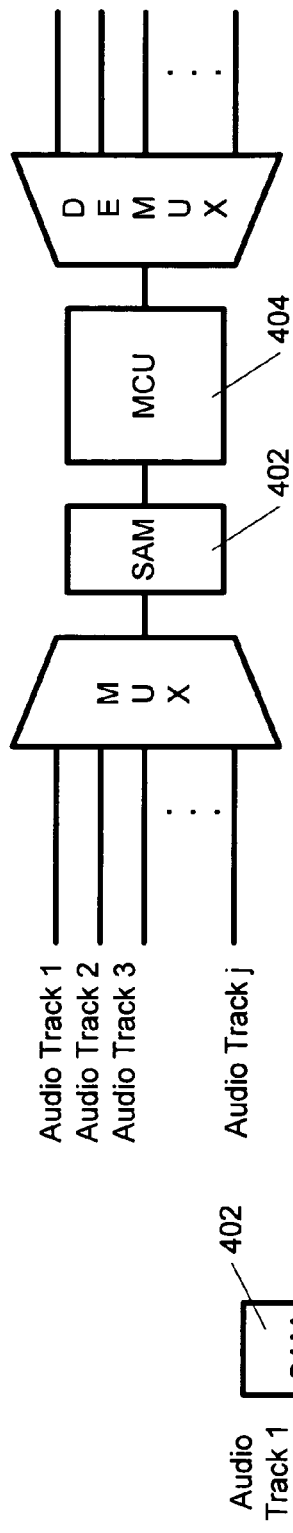
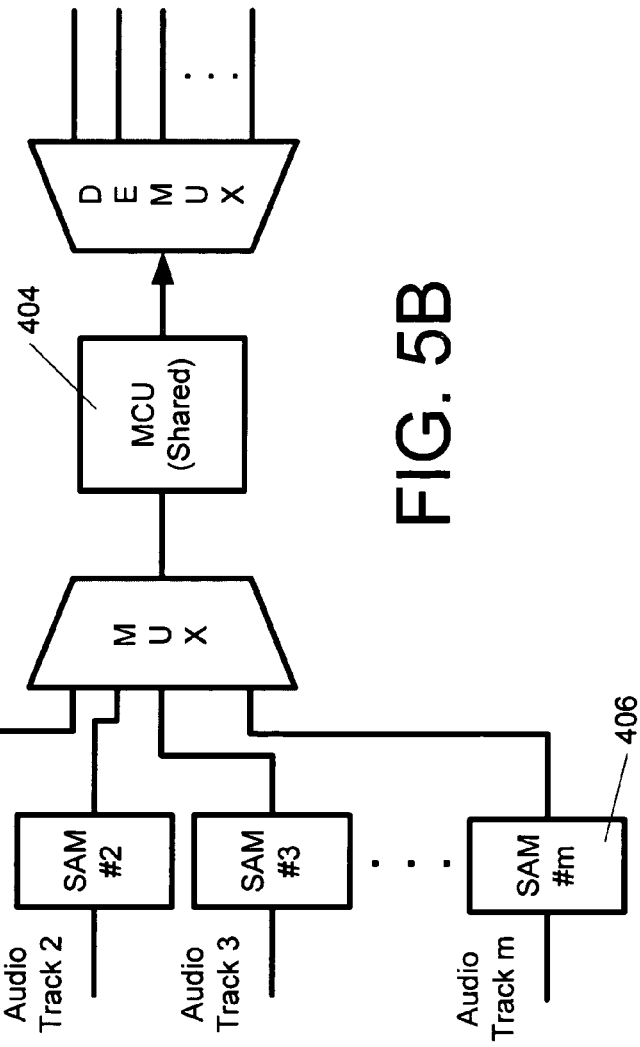
FIG. 5A
FIG. 5B

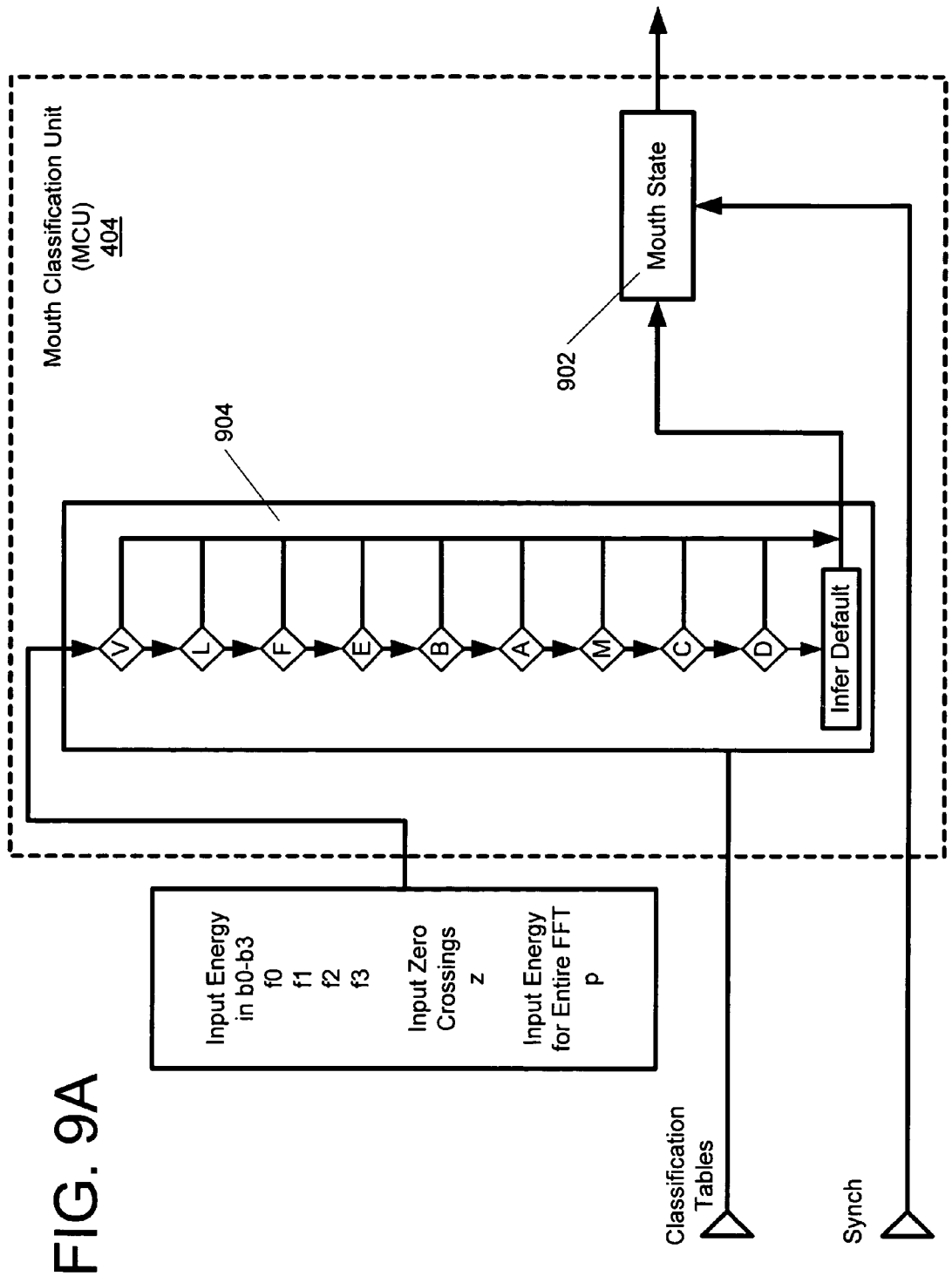

FIG. 10A

```
/* starting point for a Max external object ------ */ include <A4Stuff.h>
include <SetUpA4.h>

/* the required include files */
#include "ext.h"
#include <string.h>
#include <stdio.h>
include <unistd.h> define Min(x,y) ((y <= x) ? y : x)
define Max(x,y)            ((y >= x) ? y : x)
#define Abs(x)       ((x < 0) ? -x : x)

static long        instanceNum;
static long        logging = false;

typedef struct MCU
{
        Object  m_ob;
        FILE    *log;                    // required
        long    curr;
        long    prev;
        long    frame;
        long    power;
        long    zero;
        long    f0;
        long    f1;
        long    f2;
        long    f3;
        long    ppower;
        long    pzero;
```

```
        long    pf0;
        long    pf1;
        long    pf2;
        long    pf3;
        long    dbx;
        long    init;
        void    *out1;
} MCU;

/* global necessary for 68K function macros to work */
fptr *FNS;

/* globalthat holds the class definition */
void *MCU_class;

/* prototypes for your functions */ void *MCU_new   (void);
void *MCU_free  (MCU *x);
void MCU_bang   (MCU *x);

void MCU_power  (MCU *x, long n);
void MCU_zero   (MCU *x, long n);
void MCU_f0     (MCU *x, long n);
void MCU_f1     (MCU *x, long n);
void MCU_f2     (MCU *x, long n);
void MCU_f3     (MCU *x, long n);
void MCU_dbx    (MCU *x, long n);

static int range  (long n, int bot, int top);

static int tryA (MCU *x);
static int tryB (MCU *x);
```

```
static int tryC (MCU *x);
static int tryD (MCU *x);
static int tryL (MCU *x);
static int tryE (MCU *x);
static int tryF (MCU *x);
static int tryV (MCU *x);
static int tryM (MCU *x);

/* initialization routine */ void main(fptr *f)
{
    EnterCodeResource();
    PrepareCallback();
    FNS = f;

/* tell Max about your class. The cast to short is important for 68K */
    setup(&MCU_class, MCU_new, 0L, (short)sizeof(MCU), 0L, 0);

/* bind your methods to symbols */
    addbang ((method) MCU_bang);

addinx ((method) MCU_power, 1);
    addinx ((method) MCU_zero, 2);
    addinx ((method) MCU_f0, 3);
    addinx ((method) MCU_f1, 4);
    addinx ((method) MCU_f2, 5);
    addinx ((method) MCU_f3, 6);
    addinx ((method) MCU_dbx, 7);
```

FIG. 10D

```
/* list object in the new object list */
finder_addclass("Data","MCU");

ExitCodeResource();
}

/* instance creation routine */
void    *MCU_new(void)
{
    MCU     *x;
    char    fname[256];

x = (MCU *)newobject(MCU_class);

intin (x, 7);
    intin (x, 6);
    intin (x, 5);
    intin (x, 4);
    intin (x, 3);
    intin (x, 2);
    intin (x, 1);

x->out1 = intout (x);

sprintf (fname, "MCULOG-%d", instanceNum++);

x->log = fopen (fname, "w");
    if (x->log != 0)
        post (" -- MCU log file %s\n", fname);
    else
```

```
post (" -- Can't open MCU log file %s\n", frame);

x->frame   = 0;
x->ppower  = 0;
x->pzero   = 0;
x->pf0     = 0;
x->pf1     = 0;
x->pf2     = 0;
x->pf3     = 0;
x->power   = 0;
x->zero    = 0;
x->f0      = 0;
x->f1      = 0;
x->f2      = 0;
x->f3      = 0;
x->dbx     = 0;
x->init    = -1;

return (x);
} void *MCU_free (MCU *x)
{
    if (x->log != 0) {
        fclose (x->log);
        post ("MCU - EXIT");
    }
    return (x);
} void MCU_bang (MCU *x)
{
```

```
int mouth = -1;
int found = -1;
int was   = -1;
int   now   = -1;

char *failed = "******";
char *ok     = "......";

EnterCallback();

if (found == -1) {
    mouth = tryM (x);
    if (mouth != -1)
        found = mouth;
} if (found == -1) {
    mouth = tryA (x);
    if (mouth != -1)
        found = mouth;
} if (found == -1) {
    mouth = tryV (x);
    if (mouth != -1)
        found = mouth;
} if (found == -1) {
    mouth = tryL (x);
    if (mouth != -1)
        found = mouth;
```

FIG. 10G

```
if (found == -1) {
    mouth = tryB (x);
    if (mouth != -1)
        found = mouth;
} if (found == -1) {
    mouth = tryF (x);
    if (mouth != -1)
        found = mouth;
} if (found == -1) {
    mouth = tryE (x);
    if (mouth != -1)
        found = mouth;
} if (found == -1) {
    mouth = tryD (x);
    if (mouth != -1)
        found = mouth;
} if (found == -1) {
    mouth = tryC (x);
    if (mouth != -1)
        found = mouth;
} was = found;
```

FIG. 10H

```c
if (found == -1) {
    found = x->prev;
}

// transitions out of A/Z mouths need extra force
if ((found != 0 && found != 1) && (x->prev == 0 || x->prev == -1)) {
    if (x->power <= 20 && x->zero < 200)
        found = 1;
} if (x->frame >= 1) {
    outlet_int (x->out1, (long) found);
    if (x->dbx != 0) {
        if (was == -1) {
            post ("  %d [%d] %s %d -- %6d %4d -- %4d %4d %4d %4d", found, x->frame, failed, was, x->power, x->zero, x->f0, x->f1, x->f2, x->f3);
            fprintf (x->log, "[%5d] (%2d) (%2d) *** %6d %4d -- %4d %4d %4d %4d\n", x->frame, was, found, x->power, x->zero, x->f0, x->f1, x->f2, x->f3);
            fflush (x->log);
        }
        if (was >= 0) {
            post ("  %d [%d] %s %d -- %6d %4d -- %4d %4d %4d %4d" , found, x->frame, ok, was, x->power, x->zero, x->f0, x->f1, x->f2, x->f3);
            fprintf (x->log, "[%5d] (%2d) (%2d) *** %6d %4d -- %4d %4d %4d %4d\n", x->frame, was, found, x->power, x->zero, x->f0, x->f1, x->f2, x->f3);
            fflush (x->log);
        }
    }
} x->frame++;
```

FIG. 10I

```
       x->prev = found;
       ExitCallback();
}

// the further down the try-chain the more latitude with power and zeros int tryV (MCU *x)
{
       /*     VVV mouth    -    vee */
       if (range (x->power, 1, 20) && range (x->zero, 400, 700)) {
           if (range (x->f0, 10, 50) && range (x->f1, 10, 25) && range (x->f2, 10, 30) && range (x->f3, 10, 30)) {
               return 8;
           }
       }
       /*     VVV mouth    -    eff */
       if (range (x->power, 1, 6000) && range (x->zero, 150, 500)) {
           if (range (x->f0, 60, 93) && range (x->f1, 4, 50) && range (x->f2, 2, 40) && range (x->f3, 0, 90)) {
               if (x->f2 < x->f1) {
                   return 8;
               }
           }
       }
       return (-1);
} int tryL (MCU *x)
{
       /* LLL Mouth    -    tee    */
       if ((range (x->power, 5, 6000) && range (x->zero, 80, 450))) {
```

```
        if (range (x->f0, 0, 15) && range (x->f1, 0, 20) && range (x->f2, 30, 92) && range (x->f3, 10, 30)) {
            return 7;
        }
    }

/* LLL Mouth   -   ndd   */
    if ((range (x->power, 5, 6000) && range (x->zero, 80, 250))) {
        if (range (x->f0, 0, 15) && range (x->f1, 0, 20) && range (x->f2, 30, 92) && range (x->f3, 0, 10)) {
            return 2;
        }
    }

/* LLL Mouth   -   ell   */
    if ((range (x->power, 2, 2000) && range (x->zero, 200, 400))) {
        if (range (x->f0, 25, 85) && range (x->f1, 0, 16) && range (x->f2, 0, 10) && range (x->f3, 5, 75)) {
            return 7;
        }
    } return (-1);
} int tryF (MCU *x)
{
    /* FFF Mouth   -   oo   */
    if (range (x->power, 2, 6000) && range (x->zero, 15, 120)) {
        if (range (x->f0, 97, 100) && range (x->f1, 0, 10) && range (x->f2, 0, 4) && range (x->f3, 0, 1)) {
            return 6;
        }
    }

/* filters out transition ambiguities */
    if (x->prev == 6) {
        if (range (x->f0, 93, 100) && range (x->f1, 0, 10) && range (x->f2, 0, 4) && range (x->f3, 0, 1)) {
```

```
        return 6;
      }
    return (-1);
} int tryE (MCU *x)
{
    /* EEE Mouth  -  er  */
    if (range (x->power, 1, 15000) && range (x->zero, 15, 110)) {
        if (range (x->f0, 40, 96) && range (x->f1, 0, 50) && range (x->f2, 0, 11) && range (x->f3, 0, 5)) {
            return 5;
        }
    }
    /* EEE Mouth  -  er  */
    if (range (x->power, 1, 15000) && range (x->zero, 30, 90)) {
        if (range (x->f0, 0, 60) && range (x->f1, 90, 100) && range (x->f2, 0, 11) && range (x->f3, 0, 5)) {
            return 5;
        }
    }
    return (-1);
} int tryB (MCU *x)
{
    /*   BBB mouth  -  ee  */
    if (range (x->power, 1, 12000) && range (x->zero, 15, 400)) {
        if (range (x->f0, 10, 97) && range (x->f1, 0, 35) && range (x->f2, 1, 85) && range (x->f3, 0, 15)) {
            if ((x->f0 > (x->f1) * 2) && (x->f1 < x->f2) && (x->f2 > x->f3)) {
                return 2;
```

```
            }
      }
   /*  BBB mouth       -      ess        */
   if (range (x->power, 1, 12000) && range (x->zero, 200, 650)) {
      if (range (x->f0, 0, 50) && range (x->f1, 0, 5) && range (x->f2, 0, 80) && range (x->f3, 0, 100)) {
         if ((x->f3 > x->f1) && (x->f2 > x->f1)) {
            return 2;
         }
      }
   }
   return (-1);
} int tryA (MCU *x)
{
   /*  AAA mouth       -      bee, pee   */    // M-B-P mouths (zero power but could have mid-high zero (breaths) no spectral content)
   if (range (x->power, 1, 2) && range (x->zero, 0, 600)) {
      if (range (x->f0, 0, 0) && range (x->f1, 0, 0) && range (x->f2, 0, 0) && range (x->f3, 0, 0)) {
         return 1;
      }
   }
   /*  AAA mouth       -      bee, pee   */
   if (range (x->power, 1, 2) && range (x->zero, 0, 600)) {
      if (range (x->f0, 0, 40) && range (x->f1, 0, 10) && range (x->f2, 0, 10) && range (x->f3, 0, 0)) {
         return 1;
      }
   }
   /*  AAA mouth       -      emm   */
   if (range (x->power, 1, 20) && range (x->zero, 10, 100)) {
```

FIG. 10L

```
        if (range (x->f0, 50, 95) && range (x->f1, 0, 40) && range (x->f2, 0, 10) && range (x->f3, 0, 5)) {
            return 1;
        }
    }
    return (-1);
} int tryM (MCU *x)       // M mouth (breaths, tape noise, quiet - non-MBP)
{
    /*    MMM mouth    -    tape noise     return ZZZ mouth*/
    if (range (x->power, 0, 1) && range (x->zero, 0, 1000)) {
        if (range (x->f0, 0, 10) && range (x->f1, 0, 1) && range (x->f2, 0, 1) && range (x->f3, 0, 1)) {
            return 0;
        }
    }

/*    MMM mouth    -    breaths */
    if (range (x->power, 1, 5) && range (x->zero, 1, 60)) {
        if (range (x->f0, 0, 50) && range (x->f1, 0, 10) && range (x->f2, 0, 5) && range (x->f3, 0, 1)) {
            return 9;
        }
    } return (-1);
} int tryC (MCU *x)
{
    /* CCC Mouth    -      EH */
    if (range (x->power, 1, 15000) && range (x->zero, 30, 200)) {
        if (range (x->f0, 10, 80) && range (x->f1, 10, 80) && range (x->f2, 0, 20) && range (x->f3, 0, 5)) {
            return 3;
```

FIG. 10M

```
    /*        CCC mouth        -        AH */
    if (range (x->power, 1, 15000) && range (x->zero, 30, 225)) {
        if (range (x->f0, 0, 50) && range (x->f1, 10, 99) && range (x->f2, 0, 60) && range (x->f3, 0, 10)) {
            return 3;
        }
    } return (-1);
} int tryD (MCU *x)
{
    /*        DDD mouth        -        EH */
    if (range (x->power, 15000, 40000) && range (x->zero, 30, 150)) {
        if (range (x->f0, 10, 80) && range (x->f1, 10, 80) && range (x->f2, 0, 20) && range (x->f3, 0, 5)) {
            return 4;
        }
    }
    /*        DDD mouth        -        AH */
    if (range (x->power, 15000, 40000) && range (x->zero, 30, 180)) {
        if (range (x->f0, 0, 30) && range (x->f1, 10, 99) && range (x->f2, 0, 60) && range (x->f3, 0, 10)) {
            return 4;
        }
    } return (-1);
} void MCU_power        (MCU *x, long n)
```

FIG. 10N

```
            EnterCallback();

if ((x->frame % 2) == 0) {
                x->power = x->power;
                x->ppower = n;
            }
            else {
                x->power = (x->ppower + n) / 2;
                x->ppower = n;
            }

ExitCallback();
        } void MCU_zero  (MCU *x, long n)
        {
            EnterCallback();

if ((x->frame % 2) == 0) {
                x->zero = x->zero;
                x->pzero = n;
            }
            else {
                x->zero = (x->pzero + n) / 2;
                x->pzero = n;
            }

ExitCallback();
        }
```

FIG. 100

```
void MCU_f0    (MCU *x, long n)
{
    EnterCallback();

if ((x->frame % 2) == 0) {
        x->f0 = x->f0;
        x->pf0 = n;
    }
    else {
        x->f0 = (x->pf0 + n) / 2;
        x->pf0 = n;
    }

ExitCallback();
} void MCU_f1    (MCU *x, long n)
{
    EnterCallback();

if ((x->frame % 2) == 0) {
        x->f1 = x->f1;
        x->pf1 = n;
    }
    else {
        x->f1 = (x->pf1 + n) / 2;
        x->pf1 = n;
    }

ExitCallback();
}
```

FIG. 10P

```
void MCU_f2    (MCU *x, long n)
{
    EnterCallback();

if ((x->frame % 2) == 0) {
        x->f2 = x->f2;
        x->pf2 = n;
    }
    else {
        x->f2 = (x->pf2 + n) / 2;
        x->pf2 = n;
    }

ExitCallback();
} void MCU_f3    (MCU *x, long n)
{
    EnterCallback();

if ((x->frame % 2) == 0) {
        x->f3 = x->f3;
        x->pf3 = n;
    }
    else {
        x->f3 = (x->pf3 + n) / 2;
        x->pf3 = n;
    }

ExitCallback();
}
```

FIG. 10Q

```
void MCU_dbx    (MCU *x, long n)
{
    EnterCallback();

x->dbx = n;

if (n == 1 && x->log != 0) {
        post ("Logging: ON");
        x->frame = 0;
    }
    else
        post ("Logging: OFF");

ExitCallback();
} static int range (long n, int bot, int top)
{
    if (n >= bot && n <= top)
        return 1;
    else
        return 0;
}
```

```c
/* starting point for a Max external object ------ */ include <A4Stuff.h>
include <SetUpA4.h>

/* the required include files */
#include "ext.h"
#include <string.h>
#include <stdio.h>
include <unistd.h>
include <math.h> define Min(x,y)  ((y <= x) ? y : x)
define Max(x,y)  ((y >= x) ? y : x)
#define Abs(x)    ((x < 0) ? -x : x)

static long     instanceNum;
static long     logging = false;

typedef enum erange {ALL, Z, VL, L, ML, M, MH, H, VH, X} Erange;

typedef struct MCU
{
    Object  m_ob;                                   // required
    FILE    *log;
    long    curr;
    long    prev;
    long    frame;
    long    ppow;
    long    power;
    long    zero;
    long    f0;
    long    f1;
    long    f2;
    long    f3;
    long    ppower;                                 // used in finalCheck()
    long    pzero;
```

```
        long    pf0;
        long    pf1;
        long    pf2;
        long    pf3;
        long    dbx;
        long    init;
        void    *out1;
} MCU;

/* global necessary for 68K function macros to work */
fptr *FNS;

/* globalthat holds the class definition */
void *MCU_class;

/* prototypes for your functions */ void *MCU_new  (void);
void *MCU_free (MCU *x);
void MCU_bang  (MCU *x);

void MCU_power (MCU *x, long n);
void MCU_zero  (MCU *x, long n);
void MCU_f0    (MCU *x, long n);
void MCU_f1    (MCU *x, long n);
void MCU_f2    (MCU *x, long n);
void MCU_f3    (MCU *x, long n);
void MCU_dbx   (MCU *x, long n);

static int   range (long n, int bot, int top);      // low level range classification static Erange franger (long f);                              // high level range classification return enun
static Erange zranger (long z);                              // high level range classification return enum
static Erange pranger (long p);                              // high level range classification return enum static int  matcher (long p, long z, long f0, long f1, long f2, long f3);
```

```
static int   matchf (long f0, long f1, long f2, long f3);
static int   matchz (long lz, long hz);
static int   matchp (long lp, long hp);

static int   finalCheck (int candidate);

static MCU*     gState;

static int tryA (MCU *x);
static int tryB (MCU *x);
static int tryC (MCU *x);
static int tryD (MCU *x);
static int tryL (MCU *x);
static int tryE (MCU *x);
static int tryF (MCU *x);
static int tryV (MCU *x);
static int tryM (MCU *x);

/* initialization routine */ void main(fptr *f)
{
    EnterCodeResource();
    PrepareCallback();
    FNS = f;

post ("MCU-bunny fall v1.0");

/* tell Max about your class. The cast to short is important for 68K */
    setup(&MCU_class, MCU_new, 0L, (short)sizeof(MCU), 0L, 0);

/* bind your methods to symbols */
    addbang ((method) MCU_bang);

addinx ((method) MCU_power, 1);
    addinx ((method) MCU_zero, 2);
```

```
    addinx ((method) MCU_f0,   3);
    addinx ((method) MCU_f1,   4);
    addinx ((method) MCU_f2,   5);
    addinx ((method) MCU_f3,   6);
    addinx ((method) MCU_dbx,  7);

/* list object in the new object list */
    finder_addclass("Data","MCU");

ExitCodeResource();
}

/* instance creation routine */
void    *MCU_new(void)
{
    MCU    *x;
    char   fname[256];

x = (MCU *)newobject(MCU_class);

intin (x, 7);
    intin (x, 6);
    intin (x, 5);
    intin (x, 4);
    intin (x, 3);
    intin (x, 2);
    intin (x, 1);

x->out1 = intout (x);

sprintf (fname, "MCULOG-%d", instanceNum++);
```

FIG. 10V

```
x->log = fopen (fname, "w");
if (x->log != 0)
        post (" -- MCU log file %s\n", fname);
else
        post (" -- Can't open MCU log file %s\n", fname);

x->prev    = 0;
x->curr    = 0;
x->ppow    = 0;

x->frame   = 0;
x->ppower  = 0;
x->pzero=  0;
x->pf0     = 0;
x->pf1     = 0;
x->pf2     = 0;
x->pf3     = 0;
x->power   = 0;
x->zero    = 0;
x->f0      = 0;
x->f1      = 0;
x->f2      = 0;
x->f3      = 0;
x->dbx     = 0;
x->init    = -1;

return (x);
} void *MCU_free (MCU *x)
{
if (x->log != 0) {
        fclose (x->log);
        post ("MCU - EXIT");
        }
return (x);
}
```

FIG. 10W

```
void MCU_bang (MCU *x)
{
    int mouth = -1;
    int found = -1;
    int was   = -1;
    int       now   = -1;
    int lf    = 0;

char    *failed = "******";
    char    *ok     = "......";

EnterCallback();

if (found == -1) {
        mouth = tryV (x);
        if (mouth != -1)
            found = mouth;
    } if (found == -1) {
        mouth = tryL (x);
        if (mouth != -1)
            found = mouth;
    } if (found == -1) {
        mouth = tryB (x);
        if (mouth != -1)
            found = mouth;
    } if (found == -1) {
        mouth = tryA (x);
        if (mouth != -1)
```

FIG. 10X

```
            found = mouth;
        }
        if (found == -1) {
            mouth = tryM (x);
            if (mouth != -1)
                found = mouth;
        }
        if (found == -1) {
            mouth = tryF (x);
            if (mouth != -1)
                found = mouth;
        }
        if (found == -1) {
            mouth = tryE (x);
            if (mouth != -1)
                found = mouth;
        }
        if (found == -1) {
            mouth = tryD (x);
            if (mouth != -1)
                found = mouth;
        }
        if (found == -1) {
            mouth = tryC (x);
            if (mouth != -1)
                found = mouth;
        }
        was = found;
        if (found == -1) {
            found = 3;
```

FIG. 10Y

```
// transitions out of A/Z mouths need extra force
//if ((found != 0 && found != 1) && (x->prev == 0 || x->prev == 1)) {
//    if (x->power <= 20 && x->zero < 200)
//        found = 1;
//    }
//} if (x->frame >= 1) {
    outlet_int (x->out1, (long) found);
    if (x->dbx != 0) {
        if (was == -1) {
            post (" %d [%d] %s %d -- %6d %4d -- %4d %4d %4d" , found, x->frame, failed, was, x->power, x->zero, x->f0, x->f1, x->f2, x->f3);
            fprintf (x->log, "[%5d] (%2d) *** %6d %4d -- %4d %4d %4d\n", x->frame, was, found, x->power, x->zero, x->f0, x->f1, x->f2, x->f3);
            fflush (x->log);
        }
        if (was >= 0) {
            post (" %d [%d] %s %d -- %6d %4d -- %4d %4d %4d" , found, x->frame, ok, was, x->power, x->zero, x->f0, x->f1, x->f2, x->f3);
            fprintf (x->log, "[%5d] (%2d) *** %6d %4d -- %4d %4d %4d\n", x->frame, was, found, x->power, x->zero, x->f0, x->f1, x->f2, x->f3);
            fflush (x->log);
        }
    }
} x->frame++;
x->prev = found;
x->ppow = x->power;

ExitCallback();

```
int tryV (MCU *x)
{
    gState = x;

/*       VVV mouth      -       eff      */
    if (matchf (M, M, L, Z) || matchf (M, M, Z, Z))
        if (matchz (VH, VH) && matchp (VL, L))
            return 8;

/*       VVV mouth      -       vvv      */
    if (matchf (X, Z, Z, Z) || matchf (VH, Z, Z, Z))
        if (matchz (VL, VL) && matchp (VL, L))
            return 8;

return (finalCheck (8));
} int tryL (MCU *x)
{
    gState = x;

/* LLL Mouth      -       ell      */
    if (matchf (H, M, Z, Z) || matchf (H, L, Z, Z))
        if (matchz (M, M) && matchp (L, H))
            return 7;

/* LLL Mouth      -       all      */
    if (matchf (M, M, Z, Z) || matchf (M, L, Z, Z))
        if (matchz (M, M) && matchp (L, H))
            return 7;
```

FIG. 10AA

```
       if (matchf (M, L, L, L) || matchf (M, L, Z, L))
           if (matchz (M, M) && matchp (L, H))
               return 7;

if (matchf (M, Z, L, Z) || matchf (M, Z, Z, Z))
           if (matchz (M, M) && matchp (L, H))
               return 7;

return (finalCheck (7));
} int tryF (MCU *x)
{
       if (matchz (VL, VL))
           return 6;

return (finalCheck (6));
} int tryE (MCU *x)
{
       if (matchf (L, L, Z, Z) {
           if (matchz (L, M) && matchp (L, H))
               return 5;
       } return (finalCheck (5));
} int tryB (MCU *x)
{
       gState = x;

/*      BBB mouth    -         tsss      */
```

FIG. 10BB

```
if (matchz (H, H) && matchp (VL, M))
    return 2;

if (matchf (Z, Z, Z, L) || matchf (Z, Z, Z, M) || matchf (Z, Z, Z, H)) {
    if (matchz (H, H) && matchp (VL, M))
        return 2;
} if (matchf (Z, Z, VL, L) || matchf (Z, Z, VL, M) || matchf (Z, Z, VL, H)) {
    if (matchz (H, H) && matchp (VL, M))
        return 2;
} if (matchf (Z, VL, VL, L) || matchf (Z, VL, VL, M) || matchf (Z, VL, VL, H)) {
    if (matchz (H, H) && matchp (VL, M))
        return 2;
} return (finalCheck (2));
} int tryA (MCU *x)  // M-B-P mouths
{
    gState = x;

if (matchf (M, Z, Z, Z)) {
        if (matchz (VL, VL) && matchp (VL, X))
            return 1;
    } return (-1);           // dont finalCheck()
} int tryM (MCU *x)  // M mouth (breaths, tape noise, quiet - non-MBP)
{
    gState = x;

if (matchf (Z, Z, Z, Z) || matchz (Z, Z))                 /* silence */
```

FIG. 10CC

/* MMM */

```
        return 9;
    if (matchp (Z, VL) && matchz (VL, X))
        return 9;                    /* breath */ return (-1);           // dont finalCheck()
}
int tryC (MCU *x)
{
    gState = x;

if (matchp (L, M))
        return 3;

return (finalCheck (3));
}
int tryD (MCU *x)
{
    gState = x;

if (matchp (M, X))
        return 4;

return (finalCheck (4));
}
void MCU_power (MCU *x, long n)
{
    EnterCallback();

if ((x->frame % 2) == 0) {
        x->power = x->power;
        x->ppower = n;
```

FIG. 10DD

```
        }
        else {
            x->power = (x->ppower + n) / 2;
            x->ppower = n;
        }

ExitCallback();
} void MCU_zero  (MCU *x, long n)
{
    EnterCallback();

if ((x->frame % 2) == 0) {
        x->zero = x->zero;
        x->pzero = n;
    }
    else {
        x->zero = (x->pzero + n) / 2;
        x->pzero = n;
    }

ExitCallback();
} void MCU_f0    (MCU *x, long n)
{
    EnterCallback();

if ((x->frame % 2) == 0) {
        x->f0 = x->f0;
        x->pf0 = n;
    }
    else {
        x->f0 = (x->pf0 + n) / 2;
```

ExitCallback();
} void MCU_f1    (MCU *x, long n)
{
    EnterCallback();

if ((x->frame % 2) == 0) {
        x->f1 = x->f1;
        x->pf1 = n;
    }
    else {
        x->f1 = (x->pf1 + n) / 2;
        x->pf1 = n;
    }

ExitCallback();
} void MCU_f2    (MCU *x, long n)
{
    EnterCallback();

if ((x->frame % 2) == 0) {
        x->f2 = x->f2;
        x->pf2 = n;
    }
    else {
        x->f2 = (x->pf2 + n) / 2;
        x->pf2 = n;
    }
```

```
        ExitCallback();
} void MCU_f3   (MCU *x, long n)
{
    EnterCallback();

if ((x->frame % 2) == 0) {
        x->f3 = x->f3;
        x->pf3 = n;
    }
    else {
        x->f3 = (x->pf3 + n) / 2;
        x->pf3 = n;
    }

ExitCallback();
} void MCU_dbx   (MCU *x, long n)
{
    EnterCallback();

x->dbx = n;

if (n == 1 && x->log != 0) {
        post ("Logging: ON");
        x->frame = 0;
    }
    else     post ("Logging: OFF");

ExitCallback();
} static int range (long n, int bot, int top)
```

FIG. 10GG

```
        if (n >= bot && n <= top)
            return 1;
        else
            return 0;
} static int finalCheck (int candidate)
{
    long change, small, power, ppow;

int match = -1;

if (candidate == gState->prev) {
        power = gState->power;
        ppow  = gState->ppow;

if (power < 25)
            small = 10;
        else if (power <   50)
            small = 15;
        else if (power <  100)
            small = 20;
        else if (power <  300)
            small = 50;
        else if (power < 1000)
            small = 100;
        else if (power < 3000)
            small = 150;
        else
            small = 200;

change = Abs ((power - ppow));

if (change < small){
```

FIG. 10HH

```
        match = candidate;
        // post ("final Check (%d): %d, %d - %d %d", candidate, small, change, ppow, power);
    }
    return match;
}

// classify formant ranges as High, Med, Low &c.

Erange franger (long f)
{
    if (range (f, 0, 5))
        return Z;

if (range (f, 5, 11))
        return VL;

if (range (f, 11, 40))
        return L;

if (range (f, 40, 70))
        return M;

if (range (f, 70, 92))
        return H;

if (range (f, 93, 97))
        return VH;

if (range (f, 98, 100))      // N.B. X is used here when MAX extends downward
        return X;
}

// classify zero crossing ranges as High, Med, Low &c.
```

FIG. 10II

```
Erange zranger (long z)
{
    if (range (z, 0, 5))
        return Z;

if (range (z, 5, 20))
        return VL;

if (range (z, 21, 43))
        return L;

if (range (z, 43, 120))
        return M;

if (range (z, 120, 250))
        return H;

if (range (z, 250, 500))
        return VH;

if (range (z, 500, 2000))
        return X;
}

// classify power ranges as High, Med, Low &c.

Erange pranger (long p)
{
    if (range (p, 0, 2))
        return Z;

if (range (p, 3, 35))
        return VL;

if (range (p, 35, 300))
        return L;
```

FIG. 10JJ

```
if (range (p, 300, 1000))
    return ML;

if (range (p, 1000, 4000))
    return M;

if (range (p, 4000, 8000))
    return H;

if (range (p, 8000, 10000))
    return VH;

if (range (p, 10000, 100000))
    return X;
} int matchf (long f0, long f1, long f2, long f3)
{
    MCU *x = gState;

if (franger (x->f0) != f0)
        return 0;

if (franger (x->f1) != f1)
        return 0;

if (franger (x->f2) != f2)
        return 0;

if (franger (x->f3) != f3)
        return 0;

return 1;
}
```

FIG. 10KK

```
int matchz (long lz, long hz)
{
    int     z = (int) zranger (gState->zero);
    if (z < lz || z > hz)
        return 0;
    return 1;
}
int matchp (long lp, long hp)
{
    int p = (int) pranger (gState->power);
    if (p < lp || p > hp)
        return 0;
    return 1;
}
```

FIG. 10LL

FIG. 12
*Character Table*
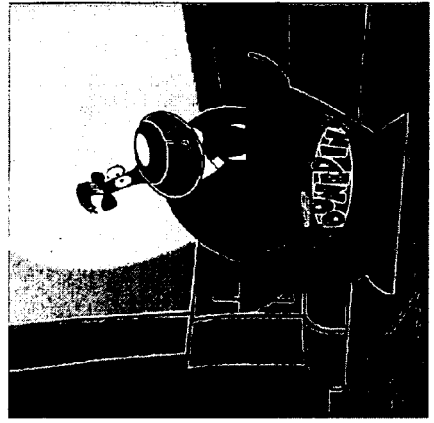
Pose A
Character: Buddy
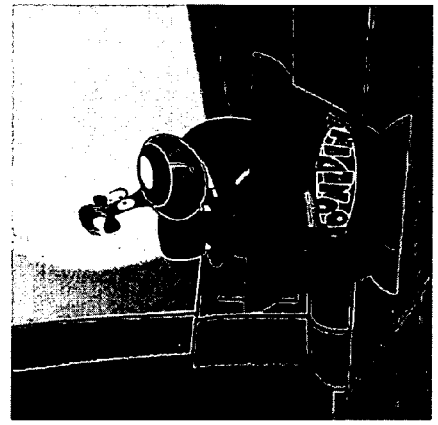
Pose B
Character: Buddy
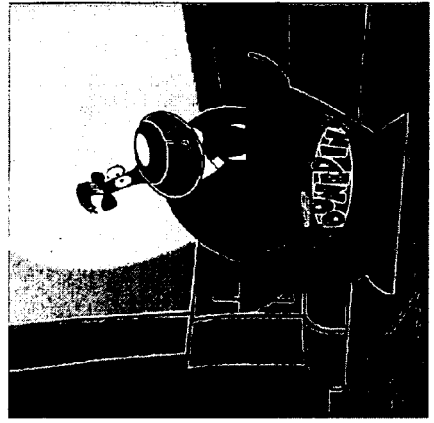
Pose C
Character: Buddy
Pose D
Character: Buddy

| TwoShot scene | Buddy character | Pose A pose | LeftArm element | - | Gestures | | | |
|---|---|---|---|---|---|---|---|---|
| TwoShot : Buddy : Pose A | | (partial) | | | | | | |
| LeftArm: | atSide | onHip | | | fingerUp | palmHigh | palmLow | readCard |
| RightArm: | atSide | onHip | | | | palmHigh | | |
| Head: | profile-L | 3/4Left | | | front | 3/4Front | | profile-R |
| Mouth: | down | up | | | | | | |
| Eyes: | wide | halfmast | | | | | | |

Sequence Table (in Pose transition) 1402

| | | | | | | |
|---|---|---|---|---|---|---|
| Image 1 | Image 2 | Image 3 | Image 4 | Image 5 | Image 6 | Image 7 |
| TwoShot *Scene* | Buddy *character* | Pose A *pose* | LeftArm *element* | atSide *fromGesture* | to | onHip *toGesture* |

FIG. 14A

Sequence Table (Pose to Pose transition) 1404

| | | | |
|---|---|---|---|
| Image 7 | Image 101 | Image 102 | Image 103 |
| TwoShot *Scene* | Buddy *character* | Pose A *pose* | LeftArm *element* | onHip *fromGesture* |
| TwoShot *Scene* | Buddy *character* | Pose B *pose* | LeftArm *element* | onDesk *toGesture* |

Transition Table (partial)

<character> Buddy
<state>  Pose-A : LeftArm - atSide

Table entries in cells may include: other commands, program segments, control information, indirect references, geometric transformations (i.e. rotation, translation and scale), tags, magnification or zoom factors, functions, parameters (i.e. lighting, shading, color, color change, layer shift, gradient, warp, bend, twist), or combinations thereof

| | | 1 | 2 | 3 | 4 | 5 | 6 | 7 |
|---|---|---|---|---|---|---|---|---|
| In-Pose transitions | Pose-A : LeftArm - atSide | | | | | | | |
| | Pose-A : LeftArm - onHip | | | | | | | 7 |
| | Pose-A : LeftArm - fingerUp | | | | | | | |
| | Pose-A : LeftArm - palmHigh | | | | | | | |
| | Pose-A : LeftArm - palmLow | | | | | | | |
| | Pose-A : LeftArm - readCard | | | | | | | |
| | class-1 | | | | | | | |
| | default | | | | | | | |
| Pose-Pose transitions | Pose-B: LeftArm - atSide | 7 | | | | | | |
| | Pose-B : LeftArm - onDesk | | 101 | 102 | 103 | | | |
| | Pose-B : LeftArm - tapDesk | | | | | | | |
| | Pose-B : LeftArm - pointWest | | | | | | | |
| | class-1 | | | | | | | |
| | default | | | | | | | |

```
/* pics.c -- PICS file animation in a window using Sprites */
/*
    Mile 1 was creation of mpics objects based on pics object
    Mile 2 compositing with blue background
    Mile 3 compositing with masks Bug fixes 11/5 - 11/10 file not found use -M, stems eyes,matte bug
    11/11 Move BG         =============>look into efficiancy
    11/18,19/98 fixed crashing of going outside of bg with clipping in PM5Copy.
             ->CAN BE OPTOMIZED MORE,some done 12/8/98mm
    through 12 - 1 - 98 Continued work on large file crashes.  FLIP FLOP and FLIP FLOP and FLIP and FLOP impl
    through 12-??? work on dirty rects, large file loading

*/ include "QDOffScreen.h"
include "ext.h"
#include "ext_common.h"
#include "ext_wind.h"
#include <Palettes.h>
#include "ext_anim_mm.h"
#include "ext_strings.h"
#include <SetUpA4.h>
#include <Movies.h>
#include <Math.h>
#include <Retrace.h>

// MPICS_h
#include "mpicsdef.h"
#include "mpicsproto.h"

fptr *FNS;
void *pics_class;
//short numPaletteColors;
short hasColorQD;
Symbol *ps_pics;
int inMask;

void main(fptr *f)
{
    CInfoRec ct;

EnterCodeResource();
```

FIG. 17

```
PrepareCallback();
FNS = f;

setup(&pics_class, pics_new, (method)pics_free, (short)sizeof(Pics), 0L, A_GIMME, 0);
addbang((method)pics_bang);
addint((method)pics_int);
addinx((method)pics_in1,1);
addinx((method)pics_in2,2);
addmess ((method)pics_update, "update", A_CANT, 0);
addmess ((method)pics_activate, "activate", A_CANT, 0);
addmess ((method)pics_close, "close", A_CANT, 0);

addmess((method)pics_priority, "priority", A_GIMME, 0);
addmess((method)pics_assist,"assist",A_CANT,0);
addmess((method)pics_test,"test",A_LONG,0);
addmess((method)TestMethod,"mm",A_GIMME,0);
addmess((method)pics_Loadit,"loadit",A_GIMME,0);
finder_addclass("Graphics",MPICSX);
addmess((method)pics_setxy,"setxy",A_GIMME,0);
addmess((method)pics_winxy,"winxy",A_GIMME,0);
addmess((method)pics_movxy,"movxy",A_GIMME,0);
addmess((method)pics_BGxy,"BGxy",A_GIMME,0);

addmess((method)pics_bbang,"bigbang",A_LONG,0);

addmess((method)pics_hide,"hide",A_GIMME,0);
addmess((method)pics_show,"show",A_GIMME,0);
addmess((method)pics_next,"next",A_GIMME,0);
addmess((method)pics_prev,"prev",A_GIMME,0);
addmess((method)pics_whatframe,"whatframe",A_GIMME,0);
addmess((method)pics_globxy,"globxy",A_GIMME,0);
addmess((method)pics_setframe,"setframe",A_GIMME,0);
addmess((method)pics_getmovie,"getmovie",A_GIMME,0);
addmess((method)pics_closeall,"closeall",A_GIMME,0);
addmess((method)pics_startmovie,"startmovie",A_GIMME,0);
addmess((method)pics_stopmovie,"stopmovie",A_GIMME,0);
addmess((method)pics_setmovieframe,"setmovieframe",A_GIMME,0);
addmess((method)pics_front,"front",A_GIMME,0);

alias("pics2");
//finder_addclass("Graphics","pics2");
ps_pics = gensym(MPICSX);
colorinfo(&ct);
hasColorQD = ct.c_hasColorQD;
```

FIG. 18

```
//numPaletteColors = ct.c_depth==8? 256 : (ct.c_depth==4? 16 : 2);
rescopy('STR#',3011);
post("MPICS 4.9v");
ExitCodeResource();
} int Alias2Index(Pics *x, char *c)
{
    int i;
    for(i=0;i<=x->count;i++)
    {
        if(strcmp(x->m[i].AliasName,c)==0)
            return(i);
    }
    post("mpics: %s not valid alias",c);
    return -1;
} int MGAlias2Index(Pics *x, char *c)
{
    int i;
    for(i=0;i<=x->MGCount;i++)
    {
        if(strcmp(x->MG[i].MMAlias,c)==0)
            return(i);
    }
    post("mpics: %s not valid MOVIE alias",c);
    return -1;
} void pics_bang(Pics *x)
{
    int i;
    int frame;
    Rect sr;
    EnterCallback();

if(x->lock)
    {
        error("LOCKED QFN");
        goto hell;
    }
```

FIG. 19

```
for(i=0;i<=x->count;i++)
{
    if(x->m[i].dirty == FIRST_XY)//
    {
        x->m[i].dirty = 1;
    }
} for(i=0;i<=x->count;i++)
{
    if(x->m[i].visible == 0)
        continue;

if(x->m[i].dirty == 1)//
    //post("dirty %s",x->m[i].AliasName);

frame = x->m[i].p_curFrame;
    x->m[i].RR[x->m[i].RRCount].top = x->m[i].p_top+x->glob_v;
    x->m[i].RR[x->m[i].RRCount].left = x->m[i].p_left+x->glob_h;
    x->m[i].RR[x->m[i].RRCount].right = x->m[i].p_left + ((*x->m[i].p_pic(frame))->bounds.right - (*x->m[i].p_pic(frame))->bounds.left)+x->glob_h+1;//209
    x->m[i].RR[x->m[i].RRCount].bottom = x->m[i].p_top + ((*x->m[i].p_pic(frame))->bounds.bottom - (*x->m[i].p_pic(frame))->bounds.top)+x->glob_v;
//donot go lightly into this forest
    sr = x->m[i].RR[x->m[i].RRCount];
    if(x->m[i].RRCount < NUM_DR_NBX-1)
        x->m[i].RRCount += 1;
    else
        error("Ask MRN again");
    DirtyIntersects(x,sr,i);
}
//..........pics_int(x,x->m[i].p_curFrame,i);
}

//for(i=0;i<=x->count;i++)
    //if(x->m[i].cue == 1)
pics_int(x,x->m[i].p_curFrame,i);
MoviesTask (x->MG[0].MM, MOVIE_TIME);
for(i=0;i<=x->MGCount;i++)
{
    if(x->MG[i].MMactive)
        MoviesTask (x->MG[i].MM, MOVIE_TIME);
    //FlashMenuBar(0L);
}
}
```

FIG. 20

```
hell:    pics_qfn(x);
         ExitCallback();
} void DirtyIntersects(Pics *x,Rect r,int thisone)
{
    int i;
    Rect r1,r2;
    int frame;

x->m[thisone].cue = 1;
    for(i=0;i<=x->count;i++)
    {
        if(x->m[i].visible == 0)
            continue;

if(i==thisone)
            continue;

//post("vis %s",x->m[i].AliasName);

frame = x->m[i].p_curFrame;
        r1.top = x->m[i].p_top+x->glob_v;
        r1.left = x->m[i].p_left+x->glob_h;
        r1.right = x->m[i].p_left + (*x->m[i].p_pic(frame])->bounds.right - (*x->m[i].p_pic(frame])->bounds.left)+x->glob_h+1;//209 donot go lightly into this forest
        r1.bottom = x->m[i].p_top + ((*x->m[i].p_pic(frame])->bounds.bottom - (*x->m[i].p_pic(frame])->bounds.top)+x->glob_v;

if(SectRect(&r,&r1,&r2)==TRUE)
        {
            if(x->m[i].dirty != 1)
            {
                x->m[i].dirty = 2;
                //post("dirty add %s",x->m[i].AliasName);
                x->m[i].RR[x->m[i].RRCount] = r2;//////r1 is entire curr guy r2;
                x->m[i].cue = 1; //cue it
                if(x->m[i].RRCount < NUM_DR_NBX-1)
                    x->m[i].RRCount += 1;
                else
                    error("ASK MRN");
            }
        }
    }
}
```

FIG. 21

```
void pics_whatframe(Pics *x, Symbol *s, short argc, Atom *argv)
{
    int i=0,ndx;
    EnterCallback();

if(argv[i].a_type==A_SYM)
    {
        ndx=Alias2Index(x,argv[i].a_w.w_sym->s_name);
        if(ndx == -1)
            goto bagout;
    }
    i++;
    outlet_int (x->m_intout, x->m[ndx].p_curFrame);

bagout:
    ExitCallback();
} void pics_next(Pics *x, Symbol *s, short argc, Atom *argv)
{
    int i=0,ndx;
    EnterCallback();

if(x->lock)
    {
        error("LOCKED QFN");
        goto bagout;
    }
    if(argv[i].a_type==A_SYM)
    {
        ndx=Alias2Index(x,argv[i].a_w.w_sym->s_name);
        if(ndx == -1)
            goto bagout;
    }
    i++;
    if (x->m[ndx].p_curFrame>=x->m[ndx].p_numFrames-1)
```

FIG. 22

```
                              x->m[ndx].p_curFrame = x->m[ndx].p_startFrame;
        else
                              x->m[ndx].p_curFrame = x->m[ndx].p_curFrame+1;

if(x->m[ndx].dirty != FIRST_X)// do not nuke undrawn dirty rect
              {
                    x->m[ndx].dirty = 1;
              //    x->m[ndx].dirtyleft = x->m[ndx].p_left;
              //    x->m[ndx].dirtytop = x->m[ndx].p_top;
              }
bagout:
        ExitCallback();
} void pics_prev(Pics *x, Symbol *s, short argc, Atom *argv)
{
        int i=0,ndx;
        EnterCallback();

if(x->lock)
        {
              error("LOCKED QFN");
              goto bagout;
        } if(argv[i].a_type==A_SYM)
        {
              ndx=Alias2Index(x,argv[i].a_w.w_sym->s_name);
              if(ndx == -1)
                    goto bagout;
        }
        i++;

if (x->m[ndx].p_curFrame<=0)
                              x->m[ndx].p_curFrame = x->m[ndx].p_numFrames-1;
        else
                              x->m[ndx].p_curFrame = x->m[ndx].p_curFrame-1;

if(x->m[ndx].dirty != FIRST_X)// do not nuke undrawn dirty rect
              {
                    x->m[ndx].dirty = 1;
              //    x->m[ndx].dirtyleft = x->m[ndx].p_left;
              //    x->m[ndx].dirtytop = x->m[ndx].p_top;
              }
```

FIG. 23

```
bagout:     ExitCallback();
} void pics_int(Pics *x, long n,int mp)
{
    EnterCallback();
    if(x->lock)
        {
            error("LOCKED QFN");
            goto bag;
        }
    //if (n >= x->m[mp].p_numFrames || n < x->m[mp].p_startFrame)
    //      goto bag;
    //x->m[mp].p_curFrame = n;
    //qelem_set(x->p_qelem);
bag:    ExitCallback();
} void pics_setxy(Pics *x, Symbol *s, short argc, Atom *argv)
{
    int i,ndx,t,l;
    EnterCallback();
    if(x->lock)
        {
            error("LOCKED QFN");
            goto bagout;
        }
    i=0;
    if(argv[i].a_type==A_SYM)
        {
            ndx=Alias2Index(x,argv[i].a_w.w_sym->s_name);
            if(ndx == -1)
                goto bagout;
        }
    i++;
    if(argv[i].a_type==A_LONG)
        {
            l=x->m[ndx].p_left;
            x->m[ndx].p_left = argv[i].a_w.w_long;
```

FIG. 24

```
            if(x->Scale < 1.0)
                x->m[ndx].p_left = x->m[ndx].p_left * x->Scale;
            if(x->m[ndx].lScale < 1.0)
                x->m[ndx].p_left = x->m[ndx].p_left * x->m[ndx].lScale;
        }
        i++;
        if(argv[i].a_type==A_LONG)
        {
            t=x->m[ndx].p_top;
            x->m[ndx].p_top = argv[i].a_w.w_long;
            if(x->Scale < 1.0)
                x->m[ndx].p_top = x->m[ndx].p_top * x->Scale;
            if(x->m[ndx].lScale < 1.0)
                x->m[ndx].p_top = x->m[ndx].p_top * x->m[ndx].lScale;
        }
        i++;
        if(x->m[ndx].dirty != FIRST_X)// do not nuke undrawn dirty rect
        {
            x->m[ndx].dirty = 1;
//          x->m[ndx].dirtyleft = l;
//          x->m[ndx].dirtytop = t;
        }
bagout: ExitCallback();
    }
}
void pics_winxy(Pics *x, Symbol *s, short argc, Atom *argv)
{
    int i;
    EnterCallback();
    i=0;
    if(argv[i].a_type==A_LONG)
    {
        x->wx = argv[i].a_w.w_long;
    }
    i++;
    if(argv[i].a_type==A_LONG)
    {
        x->wy = argv[i].a_w.w_long;
    }
```

FIG. 25

```
            i++;
            MoveWindow ((GrafPtr)&(x->Display->w_wind), x->wx, x->wy, FALSE);
bagout:     ExitCallback();
} void pics_movxy(Pics *x, Symbol *s, short argc, Atom *argv)
{
    int ndx,i,wx=0,wy=0;
    Rect movieBox;

EnterCallback();

i=0;
    if(argv[i].a_type==A_SYM)
    {
        ndx=MGAlias2Index(x,argv[i].a_w.w_sym->s_name);
        if(ndx == -1)
            goto bagout;
    }
    i++;
    if(argv[i].a_type==A_LONG)
    {
        wx = argv[i].a_w.w_long;
    }
    i++;
    if(argv[i].a_type==A_LONG)
    {
        wy = argv[i].a_w.w_long;
    }
    i++;
    GetMovieBox (x->MG[ndx].MM, &movieBox);
    SetRect (&movieBox, wx, wy,movieBox.right-movieBox.left,movieBox.bottom-movieBox.top);

SetMovieBox (x->MG[ndx].MM, &movieBox);

bagout:     ExitCallback();
} void pics_BGxy(Pics *x, Symbol *s, short argc, Atom *argv)
{
    int i;
```

FIG. 26

```
        EnterCallback();

i=0;
        if(argv[i].a_type==A_LONG)
            {
                x->BGx = argv[i].a_w.w_long;
            }
        i++;
        if(argv[i].a_type==A_LONG)
            {
                x->BGy = argv[i].a_w.w_long;
            }
        i++;

x->draw_back = 1;
bagout:
        ExitCallback();
} void pics_front(Pics *x, Symbol *s, short argc, Atom *argv)
{
        EnterCallback();
        BringToFront ((GrafPtr)&(x->Display->w_wind));
        ExitCallback();
} void pics_setmovieframe(Pics *x, Symbol *s, short argc, Atom *argv)
{
        int i,frame,ndx;
        TimeValue tb;

EnterCallback();

i=0;
        if(argv[i].a_type==A_SYM)
            {
                ndx=MGAlias2Index(x,argv[i].a_w.w_sym->s_name);
                if(ndx == -1)
                    goto bagout;
            }
        i++;
        if(argv[i].a_type==A_LONG)
```

FIG. 27

```
            {
            frame = argv[i].a_w.w_long;
            }
        i++;

tb = GetMovieTimeScale(x->MG[ndx].MM);

SetMovieTimeValue(x->MG[ndx].MM,(tb * frame)/FRAME_PER_SEC);
        SetMovieRate(x->MG[ndx].MM,x->stopRate);

bagout:
        ExitCallback();
} void pics_getmovie(Pics *x, Symbol *s, short argc, Atom *argv)
{
    Rect movieBox;
    TimeRecord tr;
    TimeValue start, end;

int i,wx=0,wy=0;
    EnterCallback();
    i=0;
    x->MGCount += 1;
    if(x->MGCount > NUM_MOV)
        {
        error("Too Many Movies");
        goto bagout;
        }
    if(argv[i].a_type==A_SYM)
        {
        x->MG[x->MGCount].MM = GetMovie(x,argv[i].a_w.w_sym->s_name);
        }
    i++;
    if(argv[i].a_type==A_SYM)
        {
```

FIG. 28

```
            strcpy(x->MG[x->MGCount].MMAlias, argv[i].a_w.w_sym->s_name);
        }
        i++;
        if(argv[i].a_type==A_LONG)
        {
            wx = argv[i].a_w.w_long;
        }
        i++;
        if(argv[i].a_type==A_LONG)
        {
            wy = argv[i].a_w.w_long;
        }
        i++;

GetMovieBox (x->MG[x->MGCount].MM, &movieBox);
        OffsetRect (&movieBox, wx, wy);

//OffsetRect (&movieBox, -movieBox.left, -movieBox.top);
        SetMovieBox (x->MG[x->MGCount].MM, &movieBox);

GoToBeginningOfMovie (x->MG[x->MGCount].MM);
        start = GetMovieTime(x->MG[x->MGCount].MM, &tr);

GoToEndOfMovie (x->MG[x->MGCount].MM);
        end = GetMovieTime (x->MG[x->MGCount].MM, &tr);

GoToBeginningOfMovie (x->MG[x->MGCount].MM);

SetMovieGWorld(x->MG[x->MGCount].MM, (CGrafPtr)&(x->Display->w_wind), nil);

bagout:
        ExitCallback();
} void pics_closeall(Pics *x, Symbol *s, short argc, Atom *argv)
{
    EnterCallback();
    HideWindow((struct GrafPort *)&(x->Display->w_wind));
    ExitCallback();
} void pics_startmovie(Pics *x, Symbol *s, short argc, Atom *argv)
```

FIG. 29

```
{
    int i,ndx=0;
    EnterCallback();
    i=0;
    if(argv[i].a_type==A_SYM)
    {
        ndx=MGAlias2Index(x,argv[i].a_w.w_sym->s_name);
        if(ndx == -1)
            goto bagout;
    }
    i++;
    x->MG[ndx].MMactive = 1;
    //GoToBeginningOfMovie (x->MG[ndx].MM);
    SetMovieRate(x->MG[ndx].MM,x->startRate);
    StartMovie(x->MG[ndx].MM);
bagout:
    ExitCallback();
} void pics_stopmovie(Pics *x, Symbol *s, short argc, Atom *argv)
{
    int i,ndx=0;
    EnterCallback();
    i=0;
    if(argv[i].a_type==A_SYM)
    {
        ndx=MGAlias2Index(x,argv[i].a_w.w_sym->s_name);
        if(ndx == -1)
            goto bagout;
    }
    i++;
    x->MG[ndx].MMactive = 0;
    SetMovieRate(x->MG[ndx].MM,x->stopRate);
    //GoToEndOfMovie (x->MG[ndx].MM);
bagout:
    ExitCallback();
```

FIG. 30

```
void pics_globxy(Pics *x, Symbol *s, short argc, Atom *argv)
{
    int i;
    long v,h
    EnterCallback();
    i=0;
    if(argv[i].a_type==A_LONG)
        {
        h = x->glob_h;
        x->glob_h = argv[i].a_w.w_long;
        }
    i++;
    if(argv[i].a_type==A_LONG)
        {
        v = x->glob_v;
        x->glob_v = argv[i].a_w.w_long;
        }
    i++;
    //dirty up for erase
    if(x->back_ground != -1)
        x->draw_back = 1;
bagout:    ExitCallback();
} void pics_hide(Pics *x, Symbol *s, short argc, Atom *argv)
{
    int i,ndx;
    EnterCallback();
    i=0;
    if(argv[i].a_type==A_SYM)
        {
        ndx=Alias2Index(x,argv[i].a_w.w_sym->s_name);
        if(ndx ==-1)
            goto bagout;
        }
    i++;
    x->m[ndx].visible = 0;
```

FIG. 31

```
bagout:      ExitCallback();
         } void pics_show(Pics *x, Symbol *s, short argc, Atom *argv)
{
         int i,ndx;
         EnterCallback();
         i=0;

if(argv[i].a_type==A_SYM)
         {
             ndx=Alias2Index(x,argv[i].a_w.w_sym->s_name);
             if(ndx == -1)
                 goto bagout;
         }
         i++;
         x->m[ndx].visible = 1;
bagout:      ExitCallback();
         } void pics_priority(Pics *x, Symbol *s, short argc, Atom *argv)
{
         int i,ndx;
         EnterCallback();
         i=0;

if(argv[i].a_type==A_SYM)
         {
             ndx=Alias2Index(x,argv[i].a_w.w_sym->s_name);
             if(ndx == -1)
                 goto bagout;
         }
         i++;
         if(argv[i].a_type==A_LONG)
         {
             x->m[ndx].p_pri = argv[i].a_w.w_long;
             if(x->m[ndx].p_pri>10)
             {
                 x->m[ndx].p_pri = MAX_PRI;
                 post("Max Priority of %d substituted",MAX_PRI);
             }
         }
```

```c
        if(x->m[ndx].p_pri<0)
        {
            x->m[ndx].p_pri = 0;
            post("Min Priority of %d substituted",0);
        }
        i++;
    }
bagout:    ExitCallback();
} void sort_priorities(Pics *x)
{
    int i,p,ndx;

ndx = 0;//reset for priority ordering
    for(p=0;p<=MAX_PRI;p++)
    {
        for(i=0;i<=x->count;i++)
        {
            if(x->m[i].p_pri==p)
            {
                x->prior[ndx]=i;
                ndx++;
            }
        }
    }
} void pics_setframe(Pics *x, Symbol *s, short argc, Atom *argv)
{
    int i,ndx;
    EnterCallback();
    i=0;
    if(x->lock)
    {
        error("LOCKED QFN");
        goto bagout;
    }
    if(argv[i].a_type==A_SYM)
    {
        ndx=Alias2Index(x,argv[i].a_w.w_sym->s_name);
```

```
            if(ndx == -1)
                goto bagout;
            }
        i++;
        if(argv[i].a_type==A_LONG)
            {
            x->m[ndx].p_curFrame = argv[i].a_w.w_long;
            if(x->m[ndx].p_curFrame < 0)
                {
                //error("setframe less than 0. 0 used.");
                x->m[ndx].p_curFrame = 0;
                }
            if(x->m[ndx].p_curFrame > x->m[ndx].p_numFrames-1)
                {
                //error("setframe to large for this seq. maximum used.");
                x->m[ndx].p_curFrame = x->m[ndx].p_numFrames-1;
                }
            }
        i++;
        if(x->m[ndx].dirty != FIRST_X)// do not nuke undrawn dirty rect
            {
            x->m[ndx].dirty = 1;
//          x->m[ndx].dirtyleft = x->m[ndx].p_left;
//          x->m[ndx].dirtytop = x->m[ndx].p_top;
            }
        if((strcmp(x->m[ndx].AliasName,"bg") == 0) ||
           (strcmp(x->m[ndx].AliasName,"BG") == 0))
            {
            x->draw_back = 1;
            for(i=0;i<=x->count;i++)
                x->m[i].dirty = 1;
            }
bagout:    ExitCallback();
        }
void pics_qfn(Pics *x)
    {
    GrafPtr op,gp;
#if 0
    GWind *it;
```

FIG. 34

```
#endif
        Wind *it;
        short frame,bgframe;
        Rect nb,nbx;
        int i,j,k;
        int first = 0;
        Rect BIGGUYRect = {0,0,0,0};

//return;
        EnterCallback();

//if(Button())
        //        post("...........");
        if(x->lock)
        {
            error("MULTIPLE QFN CALLS");
            goto bag;
        } x->lock = 1;
        //PenSize(4,4);
#if 0
        it = gwind_get(x->p_sym);
        sort_priorities(x);
        if (!it ||!(top = gp = gwind_setport(it)))
            goto bag;
#endif
        it = x->Display;
        sort_priorities(x);
        if (!it ||!(op = gp = wind_setport(it)))
            goto bag;
        {
/////////////////////////
// erase section
if(x->draw_back)//draws entire back_grown use with caution
            {
            frame = x->m[x->back_ground].p_dFrame = x->m[x->back_ground].p_curFrame;

nb.top = (*x->m[x->back_ground].p_pic[frame])->bounds.top;
            nb.left = (*x->m[x->back_ground].p_pic[frame])->bounds.left;
            nb.bottom = (*x->m[x->back_ground].p_pic[frame])->bounds.bottom;
            nb.right = (*x->m[x->back_ground].p_pic[frame])->bounds.right;

BGCopy(x->the_off, x->m[x->back_ground].p_pic[frame], x->m[x->back_ground].p_mem[frame], &nb,x);
```

FIG. 35

```
BIGGUYRect = nb;
//....flashes screen off_copyrect(x->the_off,&nb);
//x->draw_back = 0;
}
else
{
    for(k=0;k<=x->count;k++)
    {
        if(x->m[k].dirty != 0)
        {
            int drc;

for(drc=0;drc < x->m[k].RRCount;drc++)
            {
                nb = x->m[k].RR[drc];
                if(x->back_ground == -1)
                {
                    EraseRect(&nb);
                }
                else
                {
                    //EraseRect(&nb);
                    bgframe = x->m[x->back_ground].p_curFrame;
                    BGCopy(x->the_off, x->m[x->back_ground].p_pic[bgframe], x->m[x->back_ground].p_mem[bgframe], &nb,x);
                    //ValidRect(&nb);
                    //    InsetRect(&nb,-1,-1);
                    //    FrameRect(&nb);
                }
            }
        }
    }//for
}
// end erase section
//////////////////////////////
for(j=0;j<=x->count;j++)
{
    i = x->prior[j];
    if(x->m[i].visible == 0)
        continue;
    frame = x->m[i].p_dFrame = x->m[i].p_curFrame;

if (x->m[i].dirty != 0) //was if color qd
        //post("Doing %s",x->m[i].AliasName);
```

FIG. 36

```
if (x->the_off)
{
    if (x->m[i].p_pic && x->m[i].p_pic[frame])
    {
        nb = (*x->m[i].p_pic[frame])->bounds;
        OffsetRect(&nb,x->glob_h + x->m[i].p_left + x->m[i].p_offset[frame].h,
                    x->glob_v + x->m[i].p_top + x->m[i].p_offset[frame].v);

if(x->back_ground != -1)
        {
            {
                int drc=0;
                HLock(x->msk[i].runs);
            }

//post("RR %d",x->m[i].RRCount);

for(drc=0;drc < x->m[i].RRCount;drc++)
            {
                nbx = x->m[i].RR[drc];
                InsetRect(&nbx,-1,-1);
                //if(x->m[i].dirty == 1)
                //    nbx = nb;

if(PM5Copy(x->the_off,((long *)(*(x->msk[i].runs))) + frame * x->msk[i].RSize, x->m[i].p_pic[frame],x->m[
                    x->m[i].p_mem[frame],x->m[x->back_ground].p_mem[x->m[x->back_ground].p_curFrame], &nb, &nbx)==1)
                {
                    x->DirtyRects[x->NumDirty]=nbx;
                    if(x->NumDirty < NUM_DR-1)
                        x->NumDirty+=1;
                    if(x->m[i].dirty == 2)
                        ://FrameRect(&nbx);//draw debugger
                }
                x->m[i].RRCount = 0;
                HUnlock(x->msk[i].runs);
            }

//x->DirtyRects[x->NumDirty]=nb;
            //x->NumDirty+=1;
            //FrameRect(&nbx);//draw debugger
        }
    }
}//dirty
```

*back_ground].p_pic[x->m[x->back_ground].p_curFrame].

://PrintRun(&x->msk[x->count]);

FIG. 37

```
}// for x->count

{//////////FINAL CLEANUP
int i;
//Rect xx;

//xx.top = 48;
//xx.left = 194;
//xx.right = 437;
//xx.bottom = 346;
//RGBColor xxcol;
//.BIGGUYRect.top = BIGGUYRect.left = 0;
//.BIGGUYRect.bottom = 400;
//.BIGGUYRect.right = 600;
//.x->draw_back = 1;
if(x->draw_back)
    {
        off_copyrect(x->the_off,&BIGGUYRect);
        x->draw_back = 0;
    }
else
    {
        for(i=0;i<x->NumDirty;i++)
            {
                off_copyrect(x->the_off,&x->DirtyRects[i]);
                //off_copyrect(x->the_off, &xx);
                //MWinBlit(x->the_off, &x->DirtyRects[i], x);

//FrameRect(&x->DirtyRects[i]);
            }
    }
x->NumDirty = 0;

for(i=0;i<x->count;i++)
    {
        x->m[i].dirty = 0;//new turn off
    }
}//////////
outlet_bang(x->m_bangout);/* send out a bang */

SetPort(op);

x->lock = 0;

bag:
```

FIG. 38

```
        ExitCallback();
} void pics_free(Pics *x)
{
    short i,j;
    EnterCallback();
    if(x->Display)
        HideWindow((struct GrafPort *)&(x->Display->w_wind));
    for(j=0;j<=x->count;j++)
    {
        //qelem_free(x->p_qelem);
        if(x->msk[j].runs)
            DisposeHandle(x->msk[j].runs);
        if (x->m[j].p_pic) {
            for (i=0; i < x->m[j].p_numFrames; i++) {
                if (x->m[j].p_pic[i])
                    DisposePixMap(x->m[j].p_pic[i]);
            }
            DisposePtr((Ptr)x->m[j].p_pic);
        }
        if (x->m[j].p_mem) {
            for (i=0; i < x->m[j].p_numFrames; i++) {
                if (x->m[j].p_mem[i])
                    DisposeHandle(x->m[j].p_mem[i]);
            }
            DisposePtr((Ptr)x->m[j].p_mem);
        }
        if (x->m[j].p_mask) {
            for (i=0; i < x->m[j].p_numFrames; i++) {
                if (x->m[j].p_mask[i])
                    DisposeHandle((Handle)x->m[j].p_mask[i]);
            }
            DisposePtr((Ptr)x->m[j].p_mask);
        }
        if (x->m[j].p_offset)
            DisposePtr((Ptr)x->m[j].p_offset);
    }
    ExitCallback();
}
```

FIG. 39

```
/*
void pics_assist(Pics *x, void *b, long m, long a, char *s)
{
    EnterCallback();
    assist_string(3011,m,a,1,4,s);
    ExitCallback();
}
*/ void pics_assist (Pics *x, void *b, long msg, long arg, char *dst)
{
    EnterCallback();
    if (msg==ASSIST_INLET)
    {
        switch (arg)
        {
            case 0:
            case 1:
            case 2:
                strcpy(dst,"all messages to here");
                break;
        }
    }
    else if (msg==ASSIST_OUTLET)
    {
        switch (arg)
        {
            case 0:
                strcpy(dst,"bang when done drawing");
                break;
            case 1:
                strcpy(dst,"answer to what frame");
                break;
        }
    }
    ExitCallback();
} void pics_test(Pics *x,long n)
{
    EnterCallback();
    if(n == 5)
        FlashMenuBar(0L);
    ExitCallback();
}
```

FIG. 40

```
void pics_bbang(Pics *x,long n)
{
    int i;
    int frame;
    Rect sr;
    EnterCallback();

//post("-------");
    for(i=0;i<=x->count;i++)
    {
        x->m[i].dirty = 1;
    } for(i=0;i<=x->count;i++)
    {
        if(x->m[i].visible == 0)
            continue;

if(x->m[i].dirty == 1)//
        {
            //post("dirty %s",x->m[i].AliasName);

frame = x->m[i].p_curFrame;
            x->m[i].RR[x->m[i].RRCount].top = x->m[i].p_top+x->glob_v;
            x->m[i].RR[x->m[i].RRCount].left = x->m[i].p_left+x->glob_h;
            x->m[i].RR[x->m[i].RRCount].right = x->m[i].p_left + ((*x->m[i].p_pic[frame])->bounds.right - ((*x->m[i].p_pic[frame])->bounds.left)+x->glob_h+1;//209
            x->m[i].RR[x->m[i].RRCount].bottom = x->m[i].p_top + (((*x->m[i].p_pic[frame])->bounds.bottom - ((*x->m[i].p_pic[frame])->bounds.top)+x->glob_v;
//donot go lightly into this forest
            sr = x->m[i].RR[x->m[i].RRCount];
            if(x->m[i].RRCount < NUM_DR_NBX-1)
                x->m[i].RRCount += 1;
            else
                error("Ask MRN again");
            DirtyIntersects(x,sr,i);
        }
//.........pics_int(x,x->m[i].p_curFrame);
    }
//for(i=0;i<=x->count;i++)
    //if(x->m[i].cue == 1)
        pics_int(x,x->m[i].p_curFrame,i);
}
```

FIG. 41

```
//          MoviesTask (x->MG[0].MM, MOVIE_TIME);
            for(i=0;i<=x->MGCount;i++)
            {
                if(x->MG[i].MMactive)
                    MoviesTask (x->MG[i].MM, MOVIE_TIME);
                    //FlashMenuBar(0L);
            }
            pics_qfn(x);
            ExitCallback();
} void TestMethod(Pics *x, Symbol *s, short argc, Atom *argv)
{
    short i;

EnterCallback();
    for (i=0; i < argc; i++)
    {
        switch (argv[i].a_type)
        {
            case A_LONG:
                post("argument %ld is a long: %ld", (long)i, argv[i].a_w.w_long);
                break;
            case A_SYM:
                post("argument %ld is a symbol: name %s", (long)i, argv[i].a_w.w_sym->s_name);
                break;
            case A_FLOAT:
                post("argument %ld is a float: %lf", (long)i, argv[i].a_w.w_float);
                break;
        }
    }
    ExitCallback();
} void pics_Loadit(Pics *x, Symbol *s, short argc, Atom *argv)
{
    short i;
    short vol,refNum;
    char *fn;
    char name[128],maskname[128];
    short oldResFile;
    long    size = 0,sizesize = 0;
    Handle scratch;
```

FIG. 42

```
EnterCallback():

if(x->count >= NUM_PICS_FILES -1)
    {
    error("MAX PICS FIles reached");
    goto bag;
    }
x->count += 1;
i=0; //i < argc;
x->m[x->count].p_pic = 0;
x->m[x->count].p_offset = 0;
x->m[x->count].p_mem = 0;
x->m[x->count].p_top = x->m[x->count].p_left = 0;
x->m[x->count].p_mask = 0;
x->m[x->count].p_pri = 3;
x->m[x->count].p_curFrame = 0;
x->m[x->count].p_dFrame = 0;
x->m[x->count].p_startFrame = 0;
x->m[x->count].this_elem = x->count;
x->m[x->count].p_sym = x->p_sym;
x->m[x->count].visible=1;
x->m[x->count].xScale=x->Scale;
x->m[x->count].lScale=1.0;
x->m[x->count].angle=0.0;
x->m[x->count].dirty = FIRST_X;
x->m[x->count].RRCount = 0;

oldResFile = -3300;
//////x->m[x->count].p_backmode = !(sel==ps_pics);

if(argv[i].a_type == A_FLOAT)
    {
    x->m[x->count].lScale = argv[i].a_w.w_float;
    i++;argc--;
    } if(argv[i].a_type == A_FLOAT)
    {
    if(argv[i].a_w.w_float < -0.001)
        x->m[x->count].angle = argv[i].a_w.w_float;//key flip/flop on neg angle
    else//convert to radians
        x->m[x->count].angle = (argv[i].a_w.w_float/360)*(2*3.14159);
    i++;argc--;
```

FIG. 43

```
if(argv[i].a_type == A_SYM)
{
    //post("argument %ld is a symbol: name %s", (long)i, argv[i].a_w.w_sym->s_name);
    fn = argv[i].a_w.w_sym->s_name;
    if (!locatefiletype(fn,&vol,'PICS',0L))
    {
        ctopcpy(name,fn);
        refNum = OpenRFPerm((Byte *)name,vol,0);
        if (refNum != -1)
        {
            oldResFile = CurResFile();
            UseResFile(refNum);
            inMask = 0;
            if(loadit_pics_file(&(x->m[x->count]),fn) == -1)
                goto ferr;
        }
    }
    else
    {
        error("pics: no file %s",fn);
        goto bag;
    }
}
i++;argc--;

if(argv[i].a_type == A_SYM)
{
    //post("argument %ld is a symbol: name %s", (long)i, argv[i].a_w.w_sym->s_name);
    strcpy(x->m[x->count].AliasName, argv[i].a_w.w_sym->s_name);
    post("%s = %s", fn, x->m[x->count].AliasName);
    //-- special case for background
    if((strcmp(x->m[x->count].AliasName,"bg") == 0) ||
       (strcmp(x->m[x->count].AliasName,"BG") == 0))
    {
        x->back_ground = x->count;
        x->m[x->back_ground].visible = 0;
        x->draw_back = 1;
    }
    //--
}
```

FIG. 44

```
#if 1
///////////////////////
////// MASK PART
//x->count += 1; // no inc
x->msk[x->count].p_pic = 0;
x->msk[x->count].p_offset = 0;
x->msk[x->count].p_mem = 0;
x->msk[x->count].p_top = x->m[x->count].p_left = 0;
x->msk[x->count].p_mask = 0;
x->msk[x->count].p_pri = 3;
x->msk[x->count].p_curFrame = 0;
x->msk[x->count].p_dFrame = 0;
x->msk[x->count].p_startFrame = 0;
x->msk[x->count].this_elem = x->count;
x->msk[x->count].p_sym = x->p_sym;
x->msk[x->count].visible=0;//masks are invisible
x->msk[x->count].runs = 0L;
x->msk[x->count].xScale=x->Scale;
x->msk[x->count].lScale=x->m[x->count].lScale;
x->msk[x->count].angle=x->m[x->count].angle;

// add msk to name
//fn = argv->a_w.w_sym->s_name + "mask";
//post("DEBUG name %s",name);

ctopcpy(maskname,fn);

//      post("DEBUG maskname %s",maskname);

maskname[maskname[0]+1]='-';
maskname[maskname[0]+2]='m';
maskname[maskname[0]+3]=0;
maskname[0] += 2;

post("DEBUG maskname %s",&(maskname[1]));

if (!locatefiletype(&(maskname[1]),&vol,'PICS',0L))
{
    refNum = OpenRFPerm(((Byte *)maskname,vol,0);
    if (refNum != -1)
    {
        oldResFile = CurResFile();
        UseResFile(refNum);
```

FIG. 45

```
            inMask=1;
            if(loadit_pics_file(&(x->msk[x->count]),"mask part") == -1)
                goto ferr;
            }
        }
    else
        {
        // report no mask file
        error("pics: no mask file %s",fn);
        goto bag;
        }
    {// encode the mask
    int ix;
    x->msk[x->count].runs = NewHandleClear(RUN_ELEMS * 4 * x->msk[x->count].p_numFrames);

// encode and free masks just after they are read
    for(ix=0;ix<x->msk[x->count].p_numFrames;ix++)
        {
        //PixMapHandle pmc;
        HLock(x->msk[x->count].runs);
        //pmc = (PixMapHandle) NewHandleClear(GetHandleSize((Handle)x->msk[x->count].p_pic[ix]));
        //HLock((Handle)pmc);
        //CopyPixMap(x->msk[x->count].p_pic[ix],pmc);
        if(MEncode(x->the_off,((long *)(*(x->msk[x->count].runs))) + ix * RUN_ELEMS,x->msk[x->count].p_pic[ix],x->msk[x->count].p_mem[ix])==1)
            //PrintRun(&x->msk[x->count]);
        //MEncode(x->the_off,((long *)(*(x->msk[x->count].runs))) + ix * RUN_ELEMS,pmc,x->msk[x->count].p_mem[ix]);
//PrintRun(&x->msk[x->count]);
        pics_free_pic_inmask(x,x->count,ix);
        HUnlock(x->msk[x->count].runs);
        //HUnlock((Handle)pmc);
        //DisposeHandle((Handle)pmc);
        }
    //get max size of a run
    for(ix=0;ix<x->msk[x->count].p_numFrames;ix++)
        {
        size = GetRunsSize(((long *)(*(x->msk[x->count].runs))) + ix * RUN_ELEMS);
        //post("size %d",size);
        if(size > sizesize)
            sizesize = size;
        }
    x->msk[x->count].RSize = sizesize;

scratch = x->msk[x->count].runs;
```

FIG. 46

```
                x->msk[x->count].runs = NewHandleClear(x->msk[x->count].RSize * 4 * x->msk[x->count].p_numFrames);
                //copy old into new
#if 1
                HLock(scratch);
                HLock(x->msk[x->count].runs);
                for(ix=0;ix<x->msk[x->count].p_numFrames;ix++)
                {
                    long *src,*dst;

dst = ((long *)(*(x->msk[x->count].runs))) + ix * x->msk[x->count].RSize;
                    src = ((long *)(*(scratch))) + ix * RUN_ELEMS;

CopyRun(src,dst);

//dst = ((long *)(*(x->msk[x->count].runs))) + ix * x->msk[x->count].RSize;
                    //src = ((long *)(*(scratch))) + ix * RUN_ELEMS;

//CMPRun(src,dst);
                }
#endif
                //PrintRun(&x->msk[x->count]);

HUnlock(x->msk[x->count].runs);
                HUnlock(scratch);
                //delete old handle,make sure its unlocked
                DisposeHandle(scratch);

pics_free_misc(x,x->count);

//PrintRun(&x->msk[x->count]);

}
            ////// end mask part
endif    ///////////////// if (oldResFile != -3300)
            {
                CloseResFile(refNum);
                UseResFile(oldResFile);
            }
            ExitCallback();
            return;
```

FIG. 47

```
ferr:    if (oldResFile != -3300)
            {
            CloseResFile(refNum);
            UseResFile(oldResFile);
            }
bag:
         //freeobject((Object *)x);
         ExitCallback();
         return;
         } int loadit_pics_file(picsGuts *x,char *name)
{
    Rect frameResult;
    short np;
    register short i,res;
    PicHandle thePic;

EnterCallback();
    np = Count1Resources('PICT');

if (!np) {
        //error("pics: no PICT resources in %s",fn);
        error("pics: no PICT resources in this file");
        ExitCallback();
        return(-1);
    }
    if (hasColorQD) {
        post("pics: reading file... %s",name);
        x->p_pic = (PixMapHandle *)NewPtr(4L * np);    /* getbytes? */
        x->p_mem = (Handle *)NewPtr(4L * np);
        x->p_mask = (BitMapHandle *)NewPtr(4L * np);
        x->p_offset = (Point *)NewPtr(4L * np);
        for (i=0; i < np; i++) {
            x->p_pic[i] = 0;
            x->p_mem[i] = 0;
            x->p_mask[i] = 0;
            x->p_offset[i].h = x->p_offset[i].v = 0;
        }
        x->p_numFrames = np;
        for (i=0; i < np; i++) {
            thePic = (PicHandle)Get1Resource('PICT',128+i);
            if (!thePic || ResError() || MemError()) {
```

FIG. 48

```
            error("pics: difficulty reading file");
            ExitCallback();
            return(-1);
        }
        x->p_pic[i] = NewPixMap();
        x->p_mem[i] = newhandle(0L);
        x->p_mask[i] = (BitMapHandle)newhandle(0L);
        res = DrawCPicInto(thePic,x->p_pic[i],x->p_mem[i],x->p_mask[i],0,
                           &frameResult,x->p_offset+i,x);
        post("Frame %d size %ld",i,GetHandleSize(x->p_mem[i]).res);
        ReleaseResource((Handle)thePic);
        if (i==0)
            x->p_bounds = frameResult;
    }
    post("pics: requires color quickdraw");
    } else
        post("pics: requires color quickdraw");
    ExitCallback();
    return 0;
} void *pics_new(Symbol *sel, short argc, Atom *argv)
{
    Pics *x;
    //GWind *fooG;

EnterCallback();
    x = (Pics *)newobject(pics_class);
    x->count = -1; //inc on loadit
    //x->p_qelem = qelem_new(x,(method)pics_qfn);
    x->m_intout = intout(x);
    x->m_bangout = bangout(x);
    x->glob_h = x->glob_v = 0;
    x->back_ground = -1;
    x->draw_back = 0;
    x->NumDirty = 0;
    x->lock = 0;
    x->m = (struct picsguts *)NewPtrClear(sizeof(picsGuts) * NUM_PICS_FILES);
    x->msk = (struct picsguts *)NewPtrClear(sizeof(picsGuts) * NUM_PICS_FILES);

// ----------
    // this sets up the window association
    if (argc && argv->a_type==A_SYM)
```

FIG. 49

```
        {
        x->p_sym = argv->a_w.w_sym;  // this is actualy the graphics window
        argv++;
        argc--;
        }
else
        {
        x->p_sym = 0;
        } if (argc && argv->a_type == A_LONG)
        {
        x->wtop = argv->a_w.w_long;
        argc--;
        argv++;
        }
if (argc && argv->a_type == A_LONG)
        {
        x->wleft = argv->a_w.w_long;
        argc--;
        argv++;
        }
if (argc && argv->a_type == A_LONG)
        {
        x->wbottom = argv->a_w.w_long;
        argc--;
        argv++;
        }
if (argc && argv->a_type == A_LONG)
        {
        x->wright = argv->a_w.w_long;
        argc--;
        argv++;
        }
// init in case they forget
x->Scale = 1.0;
if (argc && argv->a_type == A_FLOAT)
        {
        x->Scale = argv->a_w.w_float;
        //xScale = .5;
        argc--;
        argv++;
        }
```

FIG. 50

```
    x->Display = wind_new (x, x->wtop,x->wleft,x->wright,x->wbottom,0x00f3);
    wind_settitle(x->Display,x->p_sym->s_name,0);
    x->the_off = off_new(&x->Display->w_wind.port);
    x->Movied = 0;
    x->MGCount = -1;
    x->stopRate = FixRatio(0,1);
    x->startRate = FixRatio(1,1);
    x->BGx = x->BGy = 0;

//--------

ExitCallback();
    return (x);
}

/*---- convert a picture into a bitmap --------- */
// called:
//res = DrawCPicInto(thePic,x->p_pic[i],x->p_mem[i].x->p_mask[i],0,
//                                             &frameResult,x->p_offset+i,x);
//
short DrawCPicInto(PicHandle ph, PixMapHandle pm, Handle mem, BitMapHandle mask, short slop,
    Rect *frameResult, Point *offset,picsGuts *x)
{
    CGrafPort tempPort,tempPort2;
    GrafPtr savePort;
    Rect gTemp;
    short len,height,rowBytes,theDepth;
    long theSize;

Handle Tmem;

GetPort(&savePort);
    OpenCPort(&tempPort);
    OpenCPort(&tempPort2);
    theDepth = (*(tempPort.portPixMap))->pixelSize;
    *frameResult = (*ph)->picFrame;
    //scale frame result here
    if(x->xScale < 1.0)
        frameResult->right *= x->xScale;
    if(x->IScale < 1.0)
```

FIG. 51

```
frameResult->right *= x->xScale;
if(x->xScale < 1.0)
        frameResult->bottom *= x->xScale;
if(x->lScale < 1.0)
        frameResult->bottom *= x->lScale;

len = frameResult->right - frameResult->left;
height = frameResult->bottom - frameResult->top;
//rowBytes = (short)((((long)(((long)theDepth * (len)) + 15)) / 16L) * 2L);
rowBytes = (short)((((long)(((long)theDepth * (len)) + 31)) / 32L) * 4L);

theSize = (long)rowBytes * (long)height;
SetHandleSize(mem,theSize);
if (MemError())
        return (FALSE);

Tmem = NewHandle(0L);
SetHandleSize(Tmem,theSize);
if (MemError())
        return (FALSE);

SetRect(&gTemp,0,0,len,height);
(*((tempPort.portPixMap))->rowBytes = rowBytes + 32768;    /* set high bit for some reason */
(*((tempPort2.portPixMap))->rowBytes = rowBytes + 32768;   /* set high bit for some reason */

SetRect(&((*((tempPort.portPixMap))->bounds),0,0,len,height);
SetRect(&((*((tempPort2.portPixMap))->bounds),0,0,len,height);

HLock(mem);
HLock(Tmem);

HLock((Handle)tempPort.portPixMap);
HLock((Handle)tempPort2.portPixMap);

CalcBaseAddr(tempPort.portPixMap,mem);
CalcBaseAddr(tempPort2.portPixMap,Tmem);

offset->h = (*ph)->picFrame.left;
offset->v = (*ph)->picFrame.top;
OffsetRect(frameResult,-((*ph)->picFrame.left)-slop,
        -((*ph)->picFrame.top)-slop);
```

FIG. 52

```
BlockMove(frameResult,&(*pm)->bounds,8L);

SetPort((GrafPtr)&tempPort);

EraseRect(frameResult);
EraseRect(&gTemp);
//FillRect(frameResult,&qd.black);
//FillRect(&gTemp,&qd.black);
//////DrawPicture(ph,frameResult);
CopyPixMap(tempPort.portPixMap,pm);
CopyPixMap(tempPort2.portPixMap,pm);

if(x->angle > 0.001)
    {
    SetPort((GrafPtr)&tempPort2);
    EraseRect(frameResult);
    EraseRect(&gTemp);
    //FillRect(frameResult,&qd.black);
    //FillRect(&gTemp,&qd.black);

DrawPicture(ph,frameResult);
    //FrameRect(&vr);
    //FlashMenuBar(0L);

MRotate(tempPort.portPixMap,tempPort2.portPixMap,Tmem,x->angle);
    }
else if(x->angle < -359.0)
    {
    SetPort((GrafPtr)&tempPort); //diff temp port
    EraseRect(frameResult);
    EraseRect(&gTemp);
    DrawPicture(ph,frameResult);
    MFlip(tempPort2.portPixMap,tempPort2.portPixMap,mem,x->angle);
    MFlop(tempPort.portPixMap,tempPort2.portPixMap,Tmem,x->angle);
    CopyPixMap(tempPort2.portPixMap,tempPort.portPixMap);
    }
else if(x->angle < -179.0)
    {
    SetPort((GrafPtr)&tempPort2);
    EraseRect(frameResult);
    EraseRect(&gTemp);
```

FIG. 53

```
            DrawPicture(ph,frameResult);
            MFlip(tempPort.portPixMap,tempPort2.portPixMap,Tmem,x->angle);
        }
        else If(x->angle < -0.001)
        {
            SetPort((GrafPtr)&tempPort2);
            EraseRect(frameResult);
            EraseRect(&gTemp);
            DrawPicture(ph,frameResult);
            MFlop(tempPort.portPixMap,tempPort2.portPixMap,Tmem,x->angle);
        }
        else
        {
            SetPort((GrafPtr)&tempPort);
            EraseRect(frameResult);
            EraseRect(&gTemp);
            //FillRect(frameResult,&qd.black);
            //FillRect(&gTemp,&qd.black);

DrawPicture(ph,frameResult);
        }

HUnlock((Handle)tempPort.portPixMap);
        CloseCPort(&tempPort);

HUnlock((Handle)tempPort2.portPixMap);
        CloseCPort(&tempPort2);

HUnlock(mem);
        HUnlock(Tmem);
        DisposeHandle(Tmem);
        SetPort(savePort);
        return (TRUE);
} void CalcBaseAddr(PixMapHandle ph, Handle bh)
{
        (*ph)->baseAddr = (Ptr)*bh;
}
```

FIG. 54

```
int PM5Copy(void *off,long *r, PixMapHandle map, PixMapHandle backmap, Handle mem,Handle backmem, Rect *dstR, Rect *clipR)
{
    //int i,j;
    int w,wf,w2;
#ifdef BIT_16
    short *f, *BackGround, *WindBase;
#else
    long *f, *BackGround, *WindBase;
    long *wb_p, *f_p, *bg_p;
#endif
    GWorldPtr wo;
    OffScreen *offs;
    Point       pt;
    int row_w;
    long c=0;
    int NumLines = 0;
    int WinRight, WinBot, WinLeft, WinTop;

Rect *bounds = &(*map)->bounds;

#define ROW_DIV_PIXEL_SIZE

HLock(mem);
    HLock(backmem);
    HLock((Handle)map);
    HLock((Handle)backmap);

CalcBaseAddr(map,mem);
    CalcBaseAddr(backmap,backmem);

offs =(OffScreen *)off;
    //w2 = (*(offs->offPix))->rowBytes; the evil line of crashes
    //w2 = offs->offBits.rowBytes;
    wo = offs->world;
#ifdef BIT_16
    WindBase = (short *)GetPixBaseAddr(wo->portPixMap);
#else
    WindBase = (long *)GetPixBaseAddr(wo->portPixMap);
#endif
    w = (*map)->rowBytes & 0x3fff;
    wf = (*backmap)->rowBytes & 0x3fff;
```

FIG. 55

```
w2 = ((*(wo->portPixMap))->rowBytes & 0x3fff);

if(LockPixels (wo->portPixMap))
        ;
else
        error("pics : background has been purged");

WinRight = clipR->right;
WinBot = clipR->bottom;
WinLeft = clipR->left;
WinTop = clipR->top;
        //f = (short *)GetPixBaseAddr(map->portPixMap);
#ifdef BIT_16
        f = (short *)(*map)->baseAddr;
        BackGround = (short *)(*backmap)->baseAddr;
#else
        f = (long *)(*map)->baseAddr;
        BackGround = (long *)(*backmap)->baseAddr;
endif pt.h = dstR->left;
pt.v = dstR->top;

//akey = (short *) WindBase;
WindBase += pt.h;
WindBase += ((*(wo->portPixMap))->rowBytes & 0x3fff) * pt.v / ROW_DIV;

BackGround += pt.h;
BackGround += (wf) * pt.v / ROW_DIV;

wb_p = WindBase;
        f_p = f;
        bg_p = BackGround;

row_w = (dstR->right - dstR->left);

//for(j=0;j<dstR->bottom - dstR->top;j++)
        {
        //for(i=0;i<row_w;i++)
                while(r[c] != STP_TAG)
                        {
                        if(c>RUN_ELEMS)
                                {
                                error("Something is wrong, ask Mark about it");
                                return 1;
```

FIG. 56

```
//if((pt.v + NumLines < WinBot) && (pt.v + NumLines > WinTop) ) // vert clip
{
switch(r[c])
    {
    case KEY_TAG:
        WindBase += r[c+1];
        f += r[c+1];
        BackGround += r[c+1];
        //c+=2;
        break;
    case PIX_TAG:
        {
        int d,s;
        s = r[c+1];
        d=0;
/* put this optimization back in some time
        for(;d<s-4;d+=4)
            {
            //if(d==0)
            if((pt.v + NumLines > WinBot) && (pt.v + NumLines < WinTop) ) // vert clip
                {
                break;
                }
            if(((pt.h) + (WindBase - wb_p) > WinRight - 4) && ((pt.h) + (WindBase - wb_p) > WinLeft))
                {
                break;
                }
            else
                {
                *WindBase++ = *f++;
                *WindBase++ = *f++;
                *WindBase++ = *f++;
                *WindBase++ = *f++;
                BackGround += 4;
                }
            }
*/
        for(;d<s;d++)
            {
            if((pt.v + NumLines > WinBot)) // vert clip
                {
                break;
```

FIG. 57

```
                if((((pt.h) + (WindBase - wb_p) > WinRight) || ((pt.h) + (WindBase - wb_p) < WinLeft))
                {
                    //FlashMenuBar(0L);
                    WindBase++;
                    BackGround++;
                    f++;
                }
                else if(((pt.v + NumLines > WinTop))
                {
                    //if(d==0)
                    *WindBase = *f;
                    //*WindBase = 0x0000ff;
                    WindBase += 1;
                    f += 1;
                    BackGround += 1;
                }
            }
            //c+=2;
        }
        break;
        case CMP_TAG:
        {
            int s;
            s = r[c+1];
            if(((pt.h) + (WindBase - wb_p) < WinRight) && ((pt.h) + (WindBase - wb_p) > WinLeft))
            if(((pt.v) + (NumLines) < WinBot) && ((pt.v) + (NumLines) > WinTop))  //was 600 very reciently
            {
                long degree = (s) & 0xff;// reverse ramp
                long BackPix = *WindBase;    //*BackGround
                long Pix = *f; //this is non aliased pixel needs to be fixed in source image

*WindBase = ((          (RED(BackPix)*(255-degree) + RED(Pix)*(degree))
                                /255   )<<16) |
                            ((          (GREEN(BackPix)*(255-degree) + GREEN(Pix)*(degree))
                                /255   )<<8) |
                            (           (BLUE(BackPix)*(255-degree) + BLUE(Pix)*(degree))
                                /255/*  << 0 */);

WindBase += 1;
                f += 1;
                BackGround += 1;
            }
```

FIG. 58

```
                    break;
case END_TAG:
    {
        f_p += (w/ROW_DIV);
        BackGround = bg_p += (w/ROW_DIV);
        WindBase = wb_p += (w2/ROW_DIV);
        NumLines += 1;
        //c += 2;
    }
    break;
case STP_TAG:
    {
    }
    break;

c+=2;
    }//while c
}//if for vert clip

////....ValidRect(bounds);
/*
*WindBase++ = 0xff00ff;
*WindBase++ = 0xff00ff;
*WindBase++ = 0xff00ff;
*WindBase++ = 0xff00ff;
*WindBase++ = 0xff00ff;
*/
UnlockPixels (wo->portPixMap);

HUnlock(mem);
HUnlock(backmem);
HUnlock((Handle)map);
HUnlock((Handle)backmap);

return 0;
} void pics_update (Pics *x)
{
    GrafPtr op,gp;
    Wind *it;
```

FIG. 59

```
        EnterCallback();
        it = x->Display;
        if (!it || !(op = gp = wind_setport(it)))
                    goto bag;
//      InvalRect(&x->Display->w_wind.port.portRect);
        BeginUpdate((GrafPtr)&(x->Display->w_wind));
        if(x->back_ground != -1)
                    x->draw_back = 1;
        ValidRect(&x->Display->w_wind.port.portRect);
//for(i=0;i<x->count;i++)
//          x->m[i].dirty=1;

//pics_qfn(x);

EndUpdate((GrafPtr)&(x->Display->w_wind));
        SetPort(op);
bag:    ExitCallback();
} void pics_activate (Pics *x, short active)
{
EnterCallback();
//if(x->back_ground != -1)
//       x->draw_back = 1;
//pics_bang(x);
ExitCallback();
} void pics_close (Pics *x)
{
EnterCallback();

HideWindow((struct GrafPort *)&(x->Display->w_wind));
```

FIG. 60

```
pics_free(x);
ExitCallback();
} int MEncode(void *off,long *r,PixMapHandle maskmap,Handle maskmem)
{
    int i,j;
    int maskrowB;
    long    *rPtr;
    long *Mask,*MaskStart,*ms;
    int row_w;

#define ROW_DIV_PIXEL_SIZE

HLock(maskmem);
    HLock((Handle)maskmap);
    CalcBaseAddr(maskmap,maskmem);

maskrowB = (*maskmap)->rowBytes & 0x3fff;

MaskStart = Mask = (long *)(*maskmap)->baseAddr;

row_w = (*maskmap)->bounds.right - (*maskmap)->bounds.left;
    rPtr = r; //set it
    //post("loop bot = %d",(*maskmap)->bounds.bottom - (*maskmap)->bounds.top);
    //post("left right = %d",(*maskmap)->bounds.right - (*maskmap)->bounds.left);

for(j=0;j< (*maskmap)->bounds.bottom - (*maskmap)->bounds.top;j++)
    {
        ms = Mask;
        for(i=0;i< (*maskmap)->bounds.right - (*maskmap)->bounds.left;)//no i++ big change
        {
            switch(*Mask)
            {
                case KEY_COL:
                    *rPtr=KEY_TAG;
                    rPtr++;
                    *rPtr = 1;
                    Mask++;
                    while(*Mask == KEY_COL)
                    {
                        if( i >= (*maskmap)->bounds.right - (*maskmap)->bounds.left)
                        {
```

FIG. 61

```
            //      post("breaking");
                    break;
                }
                *rPtr+=1;
                Mask++;
            }
            i+= *rPtr;//-1;
            rPtr += 1;
            break;
        case WHITE_COL:
            //*WindBase = *f;
            *rPtr=PIX_TAG;
            rPtr++;
            *rPtr = 1;
            Mask++;
            while(*Mask == WHITE_COL)
            {
                *rPtr+=1;
                Mask++;
                i++;
                if(i>= (*maskmap)->bounds.right - (*maskmap)->bounds.left)
                    break;
            }
            //i+= *rPtr;//-1;
            rPtr += 1;
            break;
        //else //---if((*Mask != KEY_COL) && (*Mask != BLACK_COL))//Alias background with mask here
        default:
            *rPtr=CMP_TAG;
            rPtr++;
            *rPtr = *Mask;
            Mask++;
            //while(*Mask != KEY_COL)
            //  {
            //      *rPtr+=1;
            //      Mask++;
            //  }
            i+= 1;//*rPtr-1;
            rPtr += 1;
            break;
        }//switch
        if((long *)rPtr-(long *)r > RUN_ELEMS-2)
        (
            FlashMenuBar(0L);
```

FIG. 62

```
                    post("i=%d rPtr=%d",i,(long *)rPtr-(long *)r);
                    error("image is too complex for simplification, repent, the end is near");
                    goto hell;
                }
                //Mask += 1;
            }//for i
            *rPtr=END_TAG;
            rPtr += 1;
            *rPtr=209;
            rPtr += 1;
            Mask = ms + ((maskrowB/ROW_DIV));
        }
hell:
        *rPtr=STP_TAG;
        rPtr += 1;
        *rPtr=219;
        rPtr += 1;
        HUnlock(maskmem);
        HUnlock((Handle)maskmap);

return 0;
    } void PrintRun(picsGuts *pg)
{
    int i;
    long *r;

HLock(pg->runs);
    r = (long *)*(pg->runs);

for(i=0;r[i] != STP_TAG;i+=2)
    {
        if(r[i] == KEY_TAG)
            post("KEY TAG = %d", r[i+1]);
        if(r[i] == PIX_TAG)
            post("PIX TAG = %d", r[i+1]);
        if(r[i] == CMP_TAG)
            post("CMP TAG = %d", r[i+1]);
        if(r[i] == END_TAG)
            post("END TAG = %d", r[i+1]);
```

FIG. 63

```
        if(r[i] == STP_TAG)
            post("STP TAG = %d", r[i+1]);
    }
    HUnlock(pg->runs);
} void SpotRun(picsGuts *pg,long *spot)
{
    int i;
    long *r;

HLock(pg->runs);
    r = (long *)*(pg->runs);

for(i=0;r[i] != STP_TAG;i++)
    {
        if(r[i] == KEY_TAG)
        {
            int x=r[i+1];
            while(x>0)
            {
                *spot=0xff0000;
                spot+=1;
                x-=1;
            }
            //post("KEY TAG = %d", r[i+1]);
        }
        if(r[i] == PIX_TAG)
        {
            int x=r[i+1];
            while(x>0)
            {
                *spot=0x00ff00;
                spot+=1;
                x-=1;
            }
            //post("PIX TAG = %d", r[i+1]);
        }
        if(r[i] == CMP_TAG)
        {
```

FIG. 64

```
            int x=r[i+1];
            while(x>0)
            {
                *spot=0x0000ff;
                spot+=1;
                x-=1;
            }
            //post("CMP TAG = %d", r[i+1]);
        }
        if(r[i] == END_TAG)
        {
            int x=r[i+1];
            while(0)
            {
                //*spot++=0xff0000;
            }
            //post("END TAG = %d", r[i+1]);
        }
        if(r[i] == STP_TAG)
        {
            int x=r[i+1];
            while(0)
            {
                //*spot++=0xff0000;
            }
            //post("STP TAG = %d", r[i+1]);
        }
    }
    HUnlock(pg->runs);
} void pics_free_masks(Pics *x,int j)
{
    short i;
    EnterCallback();
    //for(j=0;j<=x->count;j++)
    {
        if (x->msk[j].p_pic) {
```

FIG. 65

```
        for (i=0; i < x->msk[j].p_numFrames; i++) {
            if (x->msk[j].p_pic[i])
                DisposePixMap(x->msk[j].p_pic[i]);
        }
        DisposePtr((Ptr)x->msk[j].p_pic);
    }
    if (x->msk[j].p_mem) {
        for (i=0; i < x->msk[j].p_numFrames; i++) {
            if (x->msk[j].p_mem[i])
                DisposeHandle(x->msk[j].p_mem[i]);
        }
        DisposePtr((Ptr)x->msk[j].p_mem);
    }
    if (x->msk[j].p_mask) {
        for (i=0; i < x->msk[j].p_numFrames; i++) {
            if (x->msk[j].p_mask[i])
                DisposeHandle((Handle)x->msk[j].p_mask[i]);
        }
        DisposePtr((Ptr)x->msk[j].p_mask);
    }
    if (x->msk[j].p_offset)
        DisposePtr((Ptr)x->msk[j].p_offset);

ExitCallback();
} void pics_free_misc(Pics *x, int j)
{
    EnterCallback();

if (x->msk[j].p_pic)
    {
        DisposePtr((Ptr)x->msk[j].p_pic);
    }
    if (x->msk[j].p_mem)
    {
        DisposePtr((Ptr)x->msk[j].p_mem);
    }
    if (x->msk[j].p_mask)
    {
        DisposePtr((Ptr)x->msk[j].p_mask);
    }
```

FIG. 66

```
            if (x->msk[j].p_offset)
            {
                DisposePtr((Ptr)x->msk[j].p_offset);
            }
    ExitCallback();
}
void pics_free_pic_inmask(Pics *x,int j,int i)
{
    EnterCallback();
        if (x->msk[j].p_pic)
        {
            if (x->msk[j].p_pic[i])
                DisposePixMap(x->msk[j].p_pic[i]);
        }
        if (x->msk[j].p_mem)
        {
            if (x->msk[j].p_mem[i])
                DisposeHandle(x->msk[j].p_mem[i]);
        }
        if (x->msk[j].p_mask)
        {
            if (x->msk[j].p_mask[i])
                DisposeHandle((Handle)x->msk[j].p_mask[i]);
        }
    ExitCallback();
}
long GetRunsSize(long *r)
{
    long c=0;
    while(r[c] != STP_TAG)
        c++;
    return c+2;//2
}
void CopyRun(long *src,long *dst)
{
```

FIG. 67

```
long c=0;
while(src[c] != STP_TAG)
    {
    dst[c] = src[c];
    c++;
    }
dst[c] = STP_TAG;
dst[c+1] = 219;
} void CMPRrun(long *src,long *dst)
{
long c=0;
while(src[c] != STP_TAG)
    {
    if(dst[c] != src[c])
        FlashMenuBar(0L);
    c++;
    }
}

///////////////////////////////
//Movie support
///////////////////////////////

Movie   GetMovie (Pics *x,char *mmname)
{
    OSErr               err;
    SFTypeList          typeList = {MovieFileType, 0,0,0};
    //StandardFileReply  reply;
    Movie               aMovie = nil;
    short               movieResFile;
    FSSpec              spec;
    short               vol,bin;
    char pmmname[128];

if(x->Movied == 0)
        {
        err = EnterMovies();
        if(err)
```

FIG. 68

```
            {
            error("cant enter movies");
            return nil;
            }
        x->Movied = 1;
        }
//StandardGetFilePreview (nil, 1, typeList, &reply);
locatefile (mmname, &vol, &bin);
ctopcpy(pmmname,mmname);
err = FSMakeFSSpec (vol, 0, (unsigned char *)pmmname, &spec);
if(err != noErr)
        FlashMenuBar(0L);
//if (reply.sfGood)
if(err == noErr)
        {
        err = OpenMovieFile (&spec, &movieResFile, fsRdPerm);
        if (err == noErr)
            {
            short   movieResID = 0;
            Str255  movieName;
            Boolean wasChanged;

err = NewMovieFromFile (&aMovie, movieResFile, &movieResID, movieName,
                    newMovieActive, &wasChanged);
            CloseMovieFile (movieResFile);
            }
        }
    return aMovie;
}
void MRotate(PixMapHandle idestmap,PixMapHandle imap,Handle imem,double angle)
{
    int i,j;
    int ImgrowB;
    long *Img,*ImgStart,*hs,*ds;
    long *Dest,*DestStart;

int row_w;
    int centerx,centery;

double s_ang,c_ang;

#define ROW_DIV PIXEL_SIZE
```

FIG. 69

```
HLock(imem);
HLock((Handle)imap);
CalcBaseAddr(imap.imem);

s_ang = sin(angle);
c_ang = cos(angle);
ImgrowB = (*imap)->rowBytes & 0x3fff;

ImgStart = Img = (long *)(*imap)->baseAddr;
DestStart = Dest = (long *)(*idestmap)->baseAddr;

for(j=(*imap)->bounds.top;j< ((*imap)->bounds.bottom);j+=1)
    for(i=(*imap)->bounds.left;i< ((*imap)->bounds.right);i+=1)
        *(Dest + (j*(ImgrowB/ROW_DIV)) + (i)) = 0;//fill blac to rid rot zones post("rot");

row_w = (*imap)->bounds.right - (*imap)->bounds.left;

centerx = ((*imap)->bounds.right - (*imap)->bounds.left)/2;
centery = ((*imap)->bounds.bottom - (*imap)->bounds.top)/2;
for(j=(*imap)->bounds.top;j< ((*imap)->bounds.bottom)-1;j+=1)
{
    hs = Img; //hold start
    ds = Dest;
    for(i=(*imap)->bounds.left;i< ((*imap)->bounds.right)-1;i+=1)
    {
        double x,y;
        int tx,ty;
        double p1,p2,p3,p4;

int r1,r2,r3,r4;
        int g1,g2,g3,g4;
        int b1,b2,b3,b4;
        int rtot,gtot,btot;

//x=i;
        //y=j;
        x= (centerx + ((i - centerx) * c_ang) - ((j - centery) * s_ang));
        y = (centery + ((j - centery) * c_ang) + ((i - centerx) * s_ang));
//      x = i * c_theta - j * s_theta;
//      y = j * s_theta + j * c_theta;
        tx=x;//trunc
        ty=y;//trunc
```

FIG. 70

```
p1 = x - (double)tx;
p2 = 1.0 - p1;
p3 = y - (double)ty;
p4 = 1.0 - p3;

p1 /= 2; p2 /= 2; p3 /= 2; p4 /= 2;

if(ty < (*imap)->bounds.top)
    ://*Img++;
else if(tx < (*imap)->bounds.left)
    .
    .
else if(tx >= centerx * 2)
    ://*Img++;
else if(ty >= centery * 2)
    ://*Img++;
else
{ r1 = RED(*(Img + (j*(ImgrowB/ROW_DIV)) + (i)));
    g1 = GREEN(*(Img + (j*(ImgrowB/ROW_DIV)) + (i)));
    b1 = BLUE(*(Img + (j*(ImgrowB/ROW_DIV)) + (i)));

r2 = RED(*(Img + (j*(ImgrowB/ROW_DIV)) + (i+1)));
    g2 = GREEN(*(Img + (j*(ImgrowB/ROW_DIV)) + (i+1)));
    b2 = BLUE(*(Img + (j*(ImgrowB/ROW_DIV)) + (i+1)));

r3 = RED(*(Img + ((j+1)*(ImgrowB/ROW_DIV)) + (i)));
    g3 = GREEN(*(Img + ((j+1)*(ImgrowB/ROW_DIV)) + (i)));
    b3 = BLUE(*(Img + ((j+1)*(ImgrowB/ROW_DIV)) + (i)));

r4 = RED(*(Img + ((j+1)*(ImgrowB/ROW_DIV)) + (i+1)));
    g4 = GREEN(*(Img + ((j+1)*(ImgrowB/ROW_DIV)) + (i+1)));
    b4 = BLUE(*(Img + ((j+1)*(ImgrowB/ROW_DIV)) + (i+1)));

rtot = r1 * p1 + r2 * p2 + r3 * p3 + r4 * p4;
    gtot = g1 * p1 + g2 * p2 + g3 * p3 + g4 * p4;
    btot = b1 * p1 + b2 * p2 + b3 * p3 + b4 * p4;

*(Dest + (ty*(ImgrowB/ROW_DIV)) + (tx)) = ((rtot)<<16) | ((gtot)<<8) | (btot);//p1
    *(Dest + (ty*(ImgrowB/ROW_DIV)) + (tx+1)) = ((rtot)<<16) | ((gtot)<<8) | (btot);//p1
}

}//for i
```

FIG. 71

```
//................
img = ImgStart;
Dest = DestStart;
if(inMask == 3)
{
for(j=(*idestmap)->bounds.top+1;j< ((*idestmap)->bounds.bottom)-1;j+=1)
    {
    //hs = Img; //hold start
    //ds = Dest;
    for(i=(*idestmap)->bounds.left+1;i< ((*idestmap)->bounds.right)-1;i+=1)
        {
        int rt,gt,bt;
        int rl,gl,bl;
        int ra,ga,ba;
        int ri,gi,bi;
        int rr,gg,bb;

ra = RED(*(Dest + (j*(ImgrowB/ROW_DIV)) + (i-1)));
        ga = GREEN(*(Dest + (j*(ImgrowB/ROW_DIV)) + (i-1)));
        ba = BLUE(*(Dest + (j*(ImgrowB/ROW_DIV)) + (i-1)));

rr = RED(*(Dest + (j*(ImgrowB/ROW_DIV)) + (i)));
        gg = GREEN(*(Dest + (j*(ImgrowB/ROW_DIV)) + (i)));
        bb = BLUE(*(Dest + (j*(ImgrowB/ROW_DIV)) + (i)));

ri = RED(*(Dest + (j*(ImgrowB/ROW_DIV)) + (i+1)));
        gi = GREEN(*(Dest + (j*(ImgrowB/ROW_DIV)) + (i+1)));
        bi = BLUE(*(Dest + (j*(ImgrowB/ROW_DIV)) + (i+1)));

rt = RED(*(Dest + (j-1*(ImgrowB/ROW_DIV)) + (i)));
        gt = GREEN(*(Dest + (j-1*(ImgrowB/ROW_DIV)) + (i)));
        bt = BLUE(*(Dest + (j-1*(ImgrowB/ROW_DIV)) + (i)));

rl = RED(*(Dest + (j+1*(ImgrowB/ROW_DIV)) + (i)));
        gl = GREEN(*(Dest + (j+1*(ImgrowB/ROW_DIV)) + (i)));
        bl = BLUE(*(Dest + (j+1*(ImgrowB/ROW_DIV)) + (i)));

*(Dest + (j*(ImgrowB/ROW_DIV)) + (i)) = (((rr*5+ri)/6)<<16) | (((gg*5+gi)/6)<<8) | ((((bb*5+bi)/6));

}//for i

}//inMask
//................
```

FIG. 72

```
        HUnlock(imem);
        HUnlock((Handle)imap);
} void MFlop(PixMapHandle idestmap,PixMapHandle imap,Handle imem,double angle)
{
        int i,j;
        int ImgrowB;
        long *Img, *ImgStart, *hs, *ds;
        long *Dest, *DestStart;
        int tx,ty;

int row_w;
        int centerx,centery;

#define ROW_DIV  PIXEL_SIZE

HLock(imem);
        HLock((Handle)imap);
        CalcBaseAddr(imap,imem);

ImgrowB = (*imap)->rowBytes & 0x3fff;

ImgStart = Img = (long *)(*imap)->baseAddr;
        DestStart = Dest = (long *)(*idestmap)->baseAddr;

for(j=(*imap)->bounds.top;j< ((*imap)->bounds.bottom);j+=1)
                for(i=(*imap)->bounds.left;i< ((*imap)->bounds.right);i+=1)
                        *(Dest + (j*(ImgrowB/ROW_DIV)) + (i)) = 0;//fill blac to rid rot zones post("flop");

row_w = ((*imap)->bounds.right - (*imap)->bounds.left;

centerx = ((*imap)->bounds.right - (*imap)->bounds.left)/2;
        centery = ((*imap)->bounds.bottom - (*imap)->bounds.top)/2;

for(j=(*imap)->bounds.top;j< ((*imap)->bounds.bottom);j+=1)
        {
                hs = Img; //hold start
                ds = Dest;
```

FIG. 73

```
        //tx = ((*imap)->bounds.right);
        //ty = j;
        for(i=(*imap)->bounds.left;i< ((*imap)->bounds.right);i+=1)
        {
            tx=((*imap)->bounds.right) - (i-(*imap)->bounds.left);//norm
            ty=j;//

*(Dest + (j*(ImgrowB/ROW_DIV) + (i)) = (*(Img + (ty*(ImgrowB/ROW_DIV) + (tx)));
        //       tx -= 1;
        }//for i //..............
    Img = ImgStart;
    Dest = DestStart;

//..............
    HUnlock(imem);
    HUnlock((Handle)imap);
} void MFlip(PixMapHandle idestmap,PixMapHandle imap,Handle imem,double angle)
{
    int i,j;
    int ImgrowB;
    long *Img, *ImgStart, *hs, *ds;
    long *Dest, *DestStart;
    int tx,ty;

int row_w;
    int centerx,centery;

#define ROW_DIV PIXEL_SIZE

HLock(imem);
    HLock((Handle)imap);
    CalcBaseAddr(imap,imem);

ImgrowB = (*imap)->rowBytes & 0x3fff;

ImgStart = Img = (long *)(*imap)->baseAddr;
    DestStart = Dest = (long *)(*idestmap)->baseAddr;
```

FIG. 74

```
for(j=(*imap)->bounds.top;j< ((*imap)->bounds.bottom);j+=1)
    for(i=(*imap)->bounds.left;i< ((*imap)->bounds.right);i+=1)
        *(Dest + (j*(ImgrowB/ROW_DIV)) + (i)) = 0;//fill blac to rid rot zones post("flip");

row_w = ((*imap)->bounds.right - (*imap)->bounds.left;

centerx = ((*imap)->bounds.right - (*imap)->bounds.left)/2;
centery = ((*imap)->bounds.bottom - (*imap)->bounds.top)/2;

for(j=(*imap)->bounds.top;j< ((*imap)->bounds.bottom);j+=1)
{
    hs = Img; //hold start
    ds = Dest;

//tx = ((*imap)->bounds.right);
    //ty = j;
    for(i=(*imap)->bounds.left;i< ((*imap)->bounds.right);i+=1)
    {
        tx=i;//norm
        ty=((*imap)->bounds.bottom) - (j-(*imap)->bounds.top)-1;//

*(Dest + (j*(ImgrowB/ROW_DIV)) + (i)) = (*(Img + (ty*(ImgrowB/ROW_DIV)) + (tx)));
        tx -= 1;
    }//for i
}

//..................
Img = ImgStart;
Dest = DestStart;
//..................
HUnlock(imem);
HUnlock((Handle)imap);
}
int Mabs(int x)
{
    if(x<0)
        return x * -1;
    else
        return x;
}
```

FIG. 75

IMAGE MANIPULATION METHOD AND SYSTEM

CROSS-REFERENCE TO RELATED APPLICATIONS

This application claims priority under 35 USC 119(e)(1) of provisional patent application Ser. No. 60/165,822 filed Nov. 16, 1999.

COPYRIGHT RIGHTS

A portion of the disclosure of this patent document contains material that is protected by copyright. The copyright owner has no objection to the facsimile reproduction of the patent document or the patent disclosure as it appears in the Patent and Trademark Office file or records, but otherwise reserves all copyright rights whatsoever.

BACKGROUND OF THE INVENTION

Animation in its various incarnations can be extremely labor intensive. In its most traditional form, individual cels must be drawn so that a sequencing through the cels in quick succession produces the desired effect. With this technique, if an individual cel is later found to be incorrect or a change in the animation is desired, an entire group of cels may need to be discarded.

The advent of the computer has enabled the production of individual cels to be sped up to some extent and facilitated easier editing of existing cels. However, conventional computer assisted animation techniques still do not readily allow changes to the animation to be made "on the fly" or in the middle of a sequence without the need to manually re-edit several, if not many, frames thereafter. Moreover, because most animation, is based upon a sequence of key frames, a single change affecting timing can skew the rest of the animation, such that its synchronization with audio is jeopardized, if not ruined. This is a particular problem when the synchronization relates to the correspondence of mouth images with the audio. A skew between the audio and images can result in a finished product that looks like a poorly dubbed movie. Additionally, if an animation is created for one language, it is currently difficult, if not impossible, to reproduce the same animation in another language in a quick and cost-efficient manner.

Additionally, once an animation is completed the individual cels are typically unusable to produce a new animation, unless the cels are used as is. Thus, in order to produce a series of episodes of a show including animations, new animation cels must be created for each episode, thereby significantly increasing the cost of creating the series.

Moreover, the process of creating animation sequences using traditional techniques also makes it difficult, if not impossible, to have an animated character interact with a living person in a live and spontaneous or impromptu manner without any prior coordination between them.

Furthermore, there is presently no cost effective, non-highly labor intensive way to re-use or generate new footage from old cels or film footage.

SUMMARY OF THE INVENTION

Thus there is a need in the art for an arrangement that does not suffer from the drawbacks of the prior art. Advantageously, applying the teachings herein allows for creation of sophisticated animations in a cost-efficient and less labor intensive manner than often present in the prior art.

In the interest of brevity, an understanding of animation systems and techniques, such as described in Kit Laybourne, "The Animation Book: A Complete Guide to Animated Filmmaking-From Flip-Books to Sound Cartoons to 3-D Animation" is presumed. Moreover, it is to be understood that, by applying the principles of the invention, aspects of the animation techniques described in Laybourne may be advantageously employed, augmented, replaced or surpassed.

In general, in a first aspect, the invention features an animation system made up of an audio analysis unit having an audio output and a state change output and a control unit having an input and an output, the input being constructed to receive a state change indication from the audio analysis unit, the control unit being further constructed to generate compositing command information for individual component elements of an animation frame and send the compositing command information out the output.

In general, in a second aspect, the invention involves a method of creating an animation from a set of actions. The method specifically involves receiving a set of signals reflecting the set of actions, outputting a set of compositing commands based upon the set of signals, the set of compositing commands being related to the set of signals by sequences of transition data items; and compositing first images into a first animation using the set of compositing commands and a first graphic database.

Still other aspects involve numerous additional features and provide further advantages beyond those set forth herein, the enumerated advantages and features described herein being a few of the many advantages and features available from representative embodiments. These enumerated advantages and/or features are presented only to assist in understanding the invention. It should be understood that they are not to be considered limitations on the invention as defined by the claims, or limitations on equivalents to the claims. For instance, some of these advantages are mutually contradictory, in that they cannot be simultaneously present in a single embodiment. Similarly, some advantages are applicable to one aspect of the invention, and inapplicable to others. Thus, the specifically referred to features and advantages should not be considered dispositive in determining equivalence. Additional features and advantages of the invention will become apparent in the following description, from the drawings, and from the claims.

BRIEF DESCRIPTION OF THE DRAWINGS

FIGS. 5A-5B are example arrangements of components of the Audio Analysis Unit in accordance with the invention;

FIGS. 9A and 9B are each functional block diagrams of Mouth Classification Unit variants according to the principles of the invention;

FIGS. 10A-10R and 10S-10LL are two examples of software implementing aspects of the Audio Analysis Unit according to the principles of the invention;

FIG. 12 shows four example poses that the character of FIG. 11 can assume;

FIG. 14A illustrates selected images from a frames database for an in-pose transition of the character of FIG. 11;

FIG. 14B illustrates selected images from a frames database for a pose to pose transition of the character of FIG. 11;

FIG. 15 is an illustration of a portion of a transition table for the character of FIG. 11;

FIGS. 17 through 75 are a program listing of one example embodiment of a Compositing Engine suitable for use according to the principles of the invention;

DETAILED DESCRIPTION

The principles of the invention and certain representative applications of those principles in various embodiments will be evident from the following discussion with reference to the Figs.

Figure 1A:
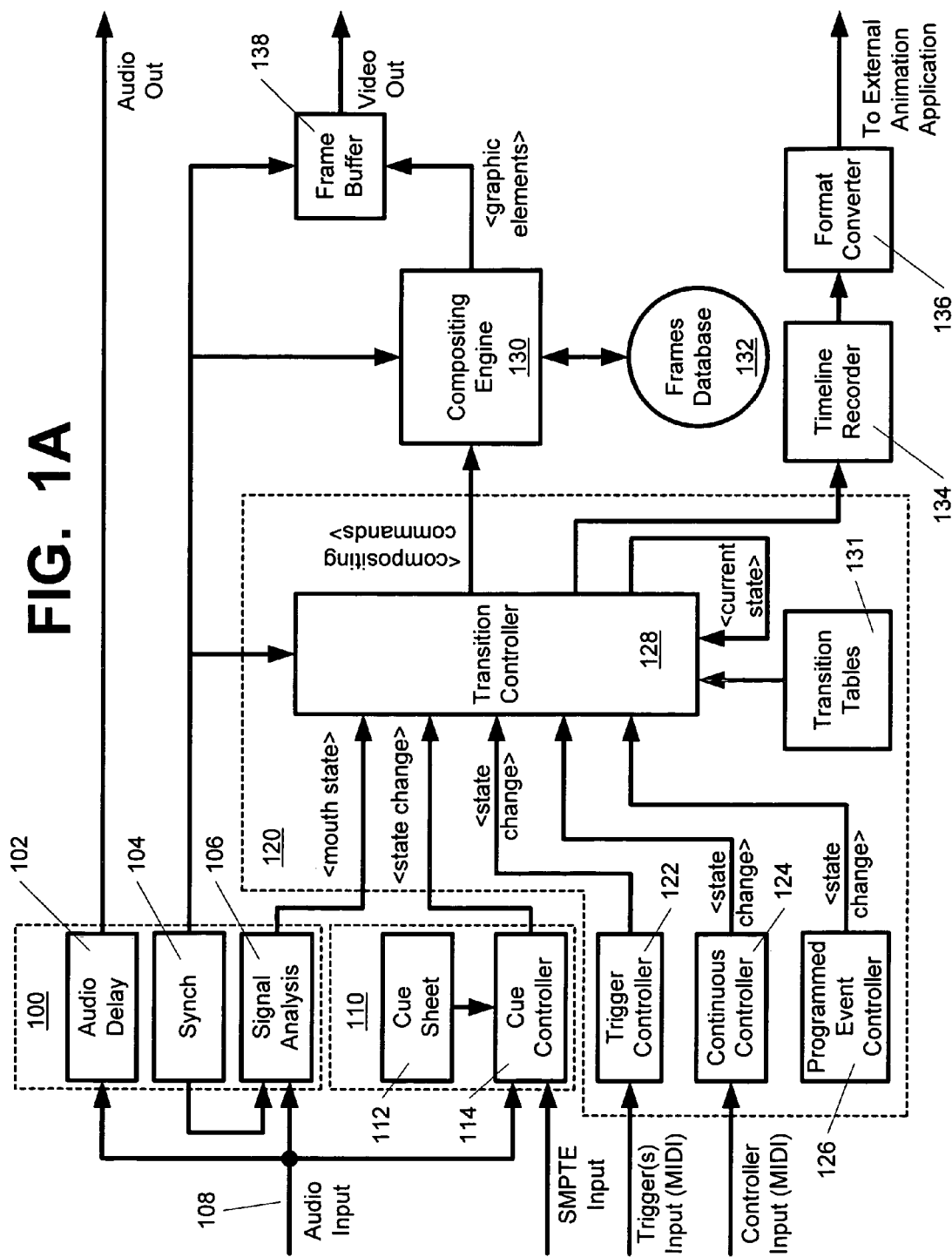
FIG. 1A is a high level functional block diagram representation of an example system constructed to apply the principles of the invention.

FIG. 1A is a high level functional block diagram representation of an example system constructed to apply the principles of the invention. The system includes, as primary functional components, an audio analysis unit (AAU) 100, a Cueing Unit 110, a Transition Control Unit (TCU) 120, and a Compositing Engine (CE) 130.

Audio Analysis Unit (AAU)

The AAU 100 is made up of an audio delay 102, a synchronization signal generator 104, and an signal analysis unit 106 (SAU). The AAU 100 has an input circuit 108 connected to the audio delay 102 and the signal analysis unit 106. The audio delay 102 delays an input audio signal for the amount of time necessary to allow processing to occur and be synchronized with the corresponding generated images. Alternatively, or additionally, in some cases the input audio signal can be advanced so that the combination of the advance and delay results in the proper overall delay for resynchronization. The amount of delay is adjustable or programmable to flexibly allow, for example, usage of the system at film frame speeds of 64, 24, 18 or 8 frames per second, video frame speeds of 30 frames per second, computer frame speeds of 15 or 8 frames per second, or other desired standard or non-standard frame speeds while maintaining syncrony between audio and video. The synchronization generator 104 is a "clock" applied to various system components and is specifically used to maintain a consistent frame rate among the system components involved in frame generation. It is the combination of the audio delay 102 and syncronization generator 104 which maintains the syncronization of the visual components of a frame with the audio input signal, for example, to produce animation that has a character's speech synchronized with the visual animation of the character's mouth, commonly referred to as "lip-sync."

To accomplish the lip-sync, the signal analysis unit 106 uses digital signal processing techniques to perform an analysis of the input audio signal and outputs information which is used to associate the input audio signal stream with a series of mouth images. The output of the signal analysis unit 106 is a series of individual data signals each representing a "mouth state." In one embodiment, the signal analysis unit 106 performs a Fast Fourier Transform (FFT) on the audio input signal and analyzes the result to make associations between the characteristic of a sound and the mouth shape that is used to articulate that sound.

In general, the specific correlation between spoken sounds and mouth shapes depends upon the preferences of each particular animator and may even vary among characters animated by the same animator. In one embodiment, one feature of the signal analysis unit 106 is that it is tunable. This allows different animators to use the same system while accounting for their own preferences in spoken sound/mouth correlation as well as for processing and syncronization of different tones of voice, individual character traits or speaker dialects, and/or non-phonetic languages. In other embodiments, the tuned settings may be stored and retrieved so that two or more different animators can share the same system for different projects and time is not wasted re-tuning for each animator's preferred settings. As will also become apparent from the detailed description below, alternative embodiments of the signal analysis unit 106 can also be used to synchronize non-vocal input audio signals with character movements and/or other changes, for example, to allow an animated character to dance based upon input music or react in some controlled way to particular sounds such as a honking horn, a gunshot or the buzzing of an insect.

Cueing Unit

The cueing unit 110 is functionally a control unit made up of a cue sheet 112 and a cue controller 114. The cue sheet 112 is a logical construct which describes a point in time where a particular action, or change in the animation frame, is supposed to take place, for example, relative to some specified reference. By way of a particular example, the cue sheet 112 can specify that at time t0, use background 1; at time $t_5$ (or k milliseconds from the start of the audio), switch to background 2; at time $t_{100}$, introduce a new character, etc. The cue sheet 112 is an input to the cue controller 114.

The cue controller 114 clocks time, for example, relative to the start of the audio; and compares it against the cue sheet 112. When the cue controller 114 finds a match between an entry in the cue sheet 112 and the current elapsed time for the audio signal, it sends out data representing a change of state. As will be described in greater detail below, this state change information is used to signal or effect a change in the animation, for example, to cause a background change or initiate an action sequence.

As shown, the cue controller 114 optionally includes an input for a Society of Motion Picture and Television Engineers (SMPTE) time code which is a time code that is commonly written onto video tapes and can be used as a standard reference. This allows, as an added convenience, the cue sheet 112 to use SMPTE times as an alternate reference. In this manner, if an audio track or videotape has been pre-recorded with SMPTE times, and key events are to occur at prescribed times, the cues can be indicated as needing to match a particular SMPTE time as opposed to an elapsed audio time. Of course, the cue sheet 112 would then hold SMPTE time codes instead of elapsed audio time.

Transition Control Unit (TCU)

The TCU 120 is functionally made up of one or more controllers, illustratively shown as a discrete trigger controller 122, a continuous controller 124, a programmed event controller 126 and a transition controller 128. These controllers are the primary control mechanism. Using one or more of these controllers, an animation can be "performed" in a manner somewhat analogous to a puppeteer controlling a puppet except, as will become apparent from the discussion below and unlike a puppet, any component of an animation frame can be controlled.

The discrete trigger controller 122 and continuous controller 124 manage triggers coming in from input devices, for example, triggers generated by MIDI boards, serial control devices, contact closures, analog to digital converters, etc. . . . In general, discrete trigger controllers 122 and continuous controllers 124 are similar in function to the cue controller 114, in that, when a trigger is applied to one of the controllers 122, 124 and it matches a specified trigger action in that controller 122, 124, an event is generated or "fired off" to cause a state change to take place. The state change can include, for example, a change in head position, eye position, or mouth position; a costume change, a translation or rotation in a plane or in space, a camera change, or a compound change (e.g. head position and face color, or arm position, face color and mouth position), etc. In short, virtually any state change can be set up to be fired off with a trigger.

Different discrete trigger controllers 122 generally handle different kinds of trigger actions. For example, an instantaneous trigger, like a button or piano keyboard key, can fire off one trigger when the button or key goes both down and up. Alternatively, the button can be used to produce separate state changes for the down transition and the up transition.

A continuous controller 124 handles trigger actions which generate a continuous or time varying state change rather than an instantaneous change. A few examples of the many trigger actions that are appropriate for a continuous controller 124 are: movement of a wheel or slider on an audio mixing console, the motion of a computer joystick, depressing a pedal such as is used by musicians with keyboards or guitars, or motion along a ribbon on a MIDI keyboard which registers a continuous change as a finger is slid along it for as long as the finger is in motion, an ergonomic, goniometric, kinetic and/or telemetric input device for identifying, responding to, or controlling movement, a motion tracking or capture suit, etc.

A programmed event controller 126 is a controller which fires off pre-specified events as opposed to requiring external trigger actions. Examples of programmed trigger actions include firing off events at some random interval to cause eye blinks or lightning flashes, causing trigger events based upon the time of day or according to some specified algorithm in order to cause a state change.

Depending upon the particular implementation, a system may have none, one, or more than one of each type of controller 122, 124, 126. Additionally, two or more different types of controllers can be part of a single device.

State changes indicated by the controllers 122, 124, 126, as well as state changes and mouth states respectively output by the cue controller 114 and audio analysis module 100 are applied as inputs to the transition controller 128. The transition controller 128 uses the input state changes and/or mouth state and creates a goal state, which is the desired state to which the animation frame will be brought. It also uses transition tables 130 to resolve the difference between the current state and the goal state. The transition controller 130 cycles through a series of actions in order to bring the current state of frame elements in concordance with the goal state of frame elements on a frame-by-frame basis. Feedback 132 is used to allow the transition controller 128 to know when the goal state has been reached. When a trigger signals that an action is required to bring the current state toward the goal state, the transition controller 128 outputs commands which cause a component of the frame or element of the character to be updated, in response to the trigger signals, to reflect some kind of motion or change. The compositing commands consist of, for example, commands that cause hiding and showing of elements; moving an element around on the screen; changing the color or order in which the elements are drawn on the screen; or others which affect the appearance of the character or look at any given frame.

Although described in greater detail below, in overview, transition tables 131 define the allowed sequential steps between initial states and goal states. For example, a particular trigger may indicate a movement of a character's arm from its hip down to its side. A series of steps would be used to get the arm from the initial state (onHip) to another state (atSide). An entry in the transition table 131 would include the particular series of sequential steps that would be required to effect that change in state which would ultimately be reflected in the images of sequential animation frames.

Another output coming out of the transition controller 128 is the current state. This current state is fed back into the transition controller 128 in order to monitor for when the goal state is achieved. As the transition controller 128 optionally brings the character to the goal state, all actions that are required to achieve that result are optionally recorded in an optional time line recorder 134. This record is useful, for example, for quickly and efficiently redubbing in a new language, changing character looks, etc. It can also be used to "sweeten" a performance after it has been captured and then re-layed down to tape. Additionally the time line recorder 134 allows a real time performance to be captured and, if necessary, converted to other animation file formats using a Format Convertor 136, such as Macromedia Flash. In this manner, an animation can be streamed in a format compatible with current popular internet browsers such as Netscape Navigator or Internet Explorer over the internet. Additionally, by opening a socket to the browser, an animation can be performed live. Since the process can occur in real time (as used herein, "real time" means the time ($\Delta t$) between the input of an audio signal or trigger at a time ($t_x$) and the compositing of a frame incorporating the effect of the input at $t_x$ will be less than the frame speed (i.e., $\Delta t$<frame speed)), animation for web casting can be produced very quickly, much quicker than can be done, for example, in Flash by itself.

Compositing Engine (CE)

The CE 130 is the unit that creates the viewable portion of the animation based upon the output of the transition controller 128. In one embodiment, the CE 130 creates 2-dimensional animation frames in a conventional manner. In another alternative embodiment, the compositing engine 130 is designed to create 3-dimensional animation frames. This embodiment of the compositing engine is built around a notion of taking a transparent piece of geometry, called an Idolon (after an Eidolon or phantom), and on to that piece of geometry is hung an image which can be positioned in space, rotated, scaled and otherwise contorted in real-time, the transparency can also be adjusted in real-time with the image or independently. In the case where the Idolon and image move as one, the combination is referred to as a Scrim. A frame database 132 is one of the inputs into the compositing engine 130. The frame database 132 is a database of images of all the components of the character in all possible usable states, as well as other visual elements of a frame subject to change. The TCU 120 and the transition tables 131 sequence and layer those elements in the proper order so that when the images are composited using the CE 130, the desired effect is achieved. Compositing is conventionally done using software or hardware. In fact, graphics hardware often has a built in compositing program which is used for matting out parts of an image while permitting other parts of the image to show through. Alternatively, a custom compositing engine can be written in software, such as shown in FIGS. 17 through 75. The output of the CE 130 is a stream of graphic elements for the frames which are sent to a frame buffer 138. The frame buffer 138 is generally also built into the video hardware or accelerating display hardware that is used to produce the video output and may be of any suitable type commercially available. Some representative examples of suitable display hardware are the DigiMotion, DigiMix and DigiSuite from Matrox Electronic Systems Ltd., 1055 St. Regis Blvd, Dorval, Quebec, Canada, H9P 2T4, and the Tornado 3000 from Evans & Sutherland, 600 Komas Drive, Salt Lake City, Utah 84108.

Figure 1B:
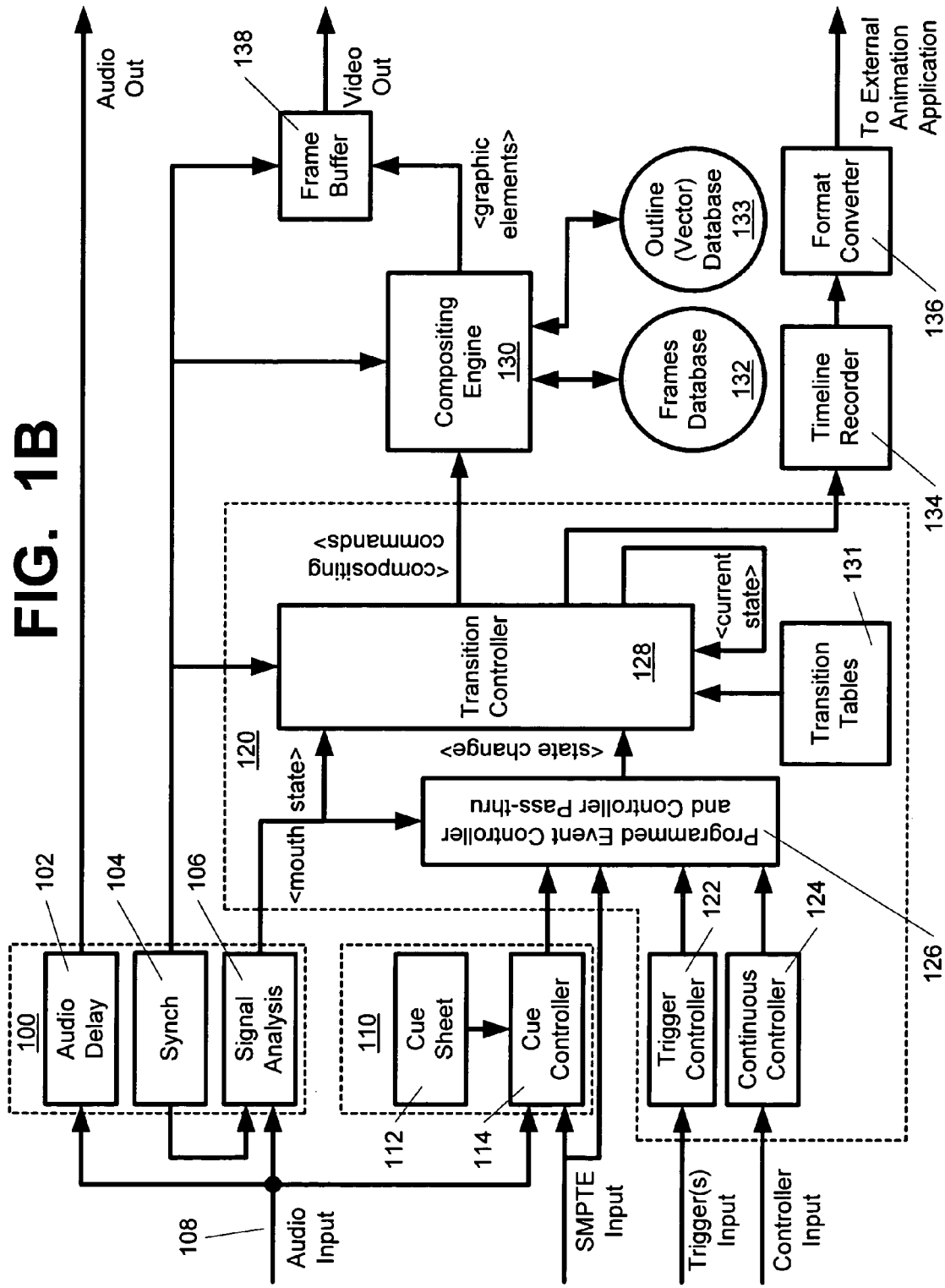
FIG. 1B is a high level functional block diagram of an alternate example system constructed to apply the principles of the invention.

FIG. 1B is a high level functional block diagram of an alternate example system constructed to apply the principles of the invention. The system is similar to the system of FIG. 1A except that the system of FIG. 1B includes a Programmed Event Controller and Controller Pass-thru (PECP) Unit 127. The PECP Unit 127 is constructed to receive state change indications from other controllers and, in some cases, pass them directly through to the Transition Controller 128 and, in other cases, trap the state change indications and use them as an internal trigger for a programmed event sequence or, in still other cases, both pass the state change indications and use them internally. In the example system of FIG. 1B, the PECP Unit 127 can receive and trap and/or pass state change indications from the Signal Analysis Unit 106, Cue Controller 114, Trigger Controller 122 and the Continuous Controller 124. Additionally, in some variants, the PECP Unit 127 can be capable of receiving SMPTE input directly for internal use (for example, as a key for a programmed event sequence). In operation, the programmed event controller functionality of the PECP Unit 127 is similar to the Programmed Event Controller 126 of FIG. 1A.

An optional Outline (Vector) Database 133 is also included in the system of FIG. 1B. The Outline Database 133 is similar in function to the Frames Database 132 except instead of containing actual images of components, for example, in bitmap form, the Outline Database 133 contains drawing outline or "vector" information that can be manipulated and/or filled in by separate algorithms running in the CE 130. The contents of the Outline Database 133 can be understood, by contrasting it, with the Frames Database 132. In a simple example, a two dimensional representation of a cube would be stored in the frames database as a number of discrete images taken from particular angles of view. Every visible face of the cube that had a color would be colored as well. In contrast, in the Outline Database 133, the same cube would be represented as data that would produce a "wire frame" or outline image of the cube. Hidden line and polygon fill algorithms running in the CE 130 would then be used to place the cube in the desired perspective position and fill the sides of the cube appropriately.

Alternatively, a combination of the two databases 132, 133 could be used, with the Outline Database 133 containing the outline information for a character component or shape and the Frames Database 132 containing image information to be placed within the outline.

It should also be understood that, while the optional Outline Database 133 has been shown and described in connection with FIG. 1B, it could be readily employed in, for example, the system of FIG. 1A or virtually any other variant thereof described herein.

Referring now to FIGS. 2A-2D, there are at least several possible physical configurations or distributions of these functional units within computer hardware. In the first example (FIG. 2A), the AAU 100, TCU 120 and CE 130 are all contained in one computer 200. In the second example (FIG. 2B), the AAU 100 is logically in one computer 202, and the TCU 120 and CE 130 are both logically in a second computer 204. In the third example (FIG. 2C), the AAU 100 and the TCU 120 are both logically in the same computer 206, whereas the CE 130 is logically on its own computer 208. In the fourth example (FIG. 2D), each of the AAU 100, TCU 120, and CE 130 are logically on their own computers 210, 212, 214. It will also be apparent that any logical unit may be distributed among two or more physical computers, that portions of two or more logical units can be in the same physical computer, and that any of the individual computers can be physically made up of two or more independent processors in a parallel processing, loosely coupled, or tightly coupled arrangement if more speed or processing power is desired for a particular logical unit.

In the simplest embodiment, the logical units described above, the AAU 100, the TCU 120, and the CE 130 are all physically part of a single computer. One such suitable example computer is a 300 MHz Macintosh PowerBook. This embodiment has the advantage of portability and can, for example, be advantageously employed as a demonstration unit for rehearsing an animation, as a mini production studio, or to provide low cost, on-site or remote editing capability, etc.

In another embodiment involving producing material for a television show where a lot of elements are moving on the screen at one time, the AAU 100 can, for example, be separated from the TCU 120 CE 130. One example impetus for doing so, is that the demands of a television show with multiple simultaneous actions can require a great deal of computer power, particularly if the usage requires the animation to run within a real-time window at a typical rate of 15 frames per second (66 milliseconds). The AAU 100 is therefore embodied in a separate computer 202 to allow the TCU 120 and CE 130 to consume most of the CPU power of their host computer 204 for the animation output.

In still other embodiments, where even more computer power is required for compositing, the CE 130 can be embodied on its own computer 214, with or without special purpose hardware. One example embodiment of this type employs a high speed, powerful computer 214 for dedicated use as compositing engine 130. Suitable example computers for this application are the Silicon Graphics (SGI) Model O2 from Silicon Graphic Inc., 1600 Amphitheatre Parkway, Mountain View, Calif. 94043, or the Z series computers from Intergraph Corp., Huntsville, Ala. 35894-0001, the latter also specifically including hardware suitable for use in conjunction with the TCU 120 and/or CE 130. Built-in graphics acceleration and, for example, OpenGL software can also be employed to composite in real-time using 3-D acceleration hardware and frame buffer acceleration. Where multiple computers are employed (FIGS. 2C-2D), information transferred among the various units is done according to known techniques and protocols appropriate for the situation including, for example, MIDI, Ethernet, and optical fiber, to name a few. Moreover, by employing known techniques such as multiplexing, several AAUs can share a common TCU, several TCUs can share a common CE, and/or a multiplexed output of a TCU can be demultiplexed for compositing by two or more CEs. In the case where multiple CEs are used, they may share a common Frames Database 132 and/or Outline Database 133 as desired or each employ their own discrete databases. As to the individual computers themselves, other suitable computers are any commercially available computers incorporating the Unified Memory Architecture (UMA) or an analogous memory usage scheme, such as employed, for example, in the CyberBlade i7 chip from Trident Microsystems, Inc., 2450 Walsh Avenue, Santa Clara, Calif. 95051 or the Apollo MVP4 chip set from Via Technologies, Inc., 1045 Mission Court, Fremont, Calif. 94539.

Figure 2A:
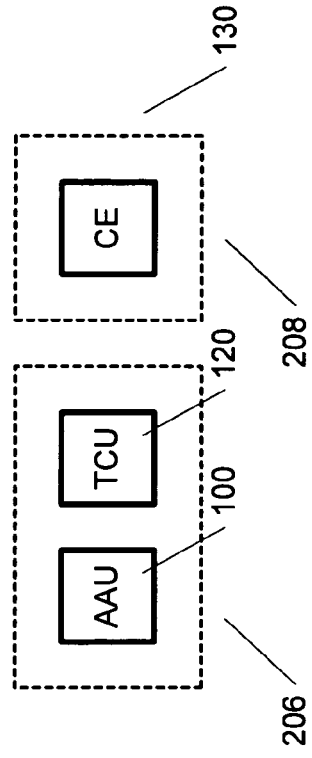
FIGS. 2A-2D illustrate possible physical configurations or distributions of functional units within computer hardware.
Figure 2B:
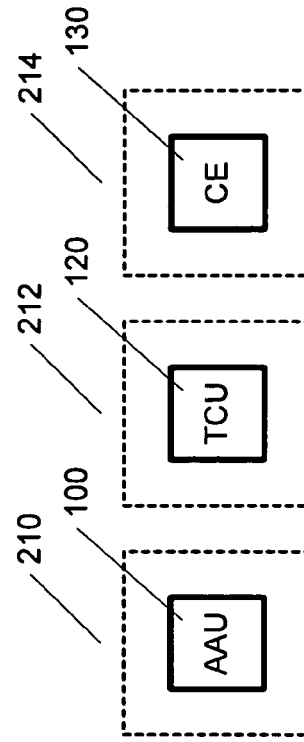
Figure 2C:
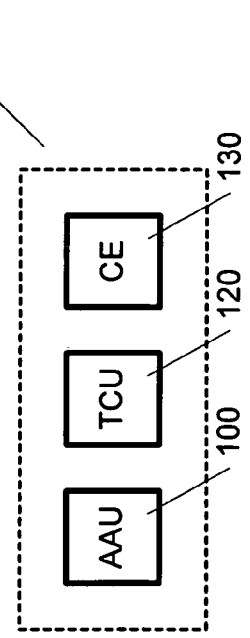
Figure 2D:
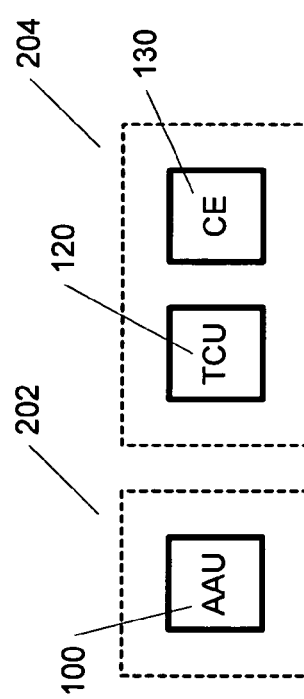
Figure 3:
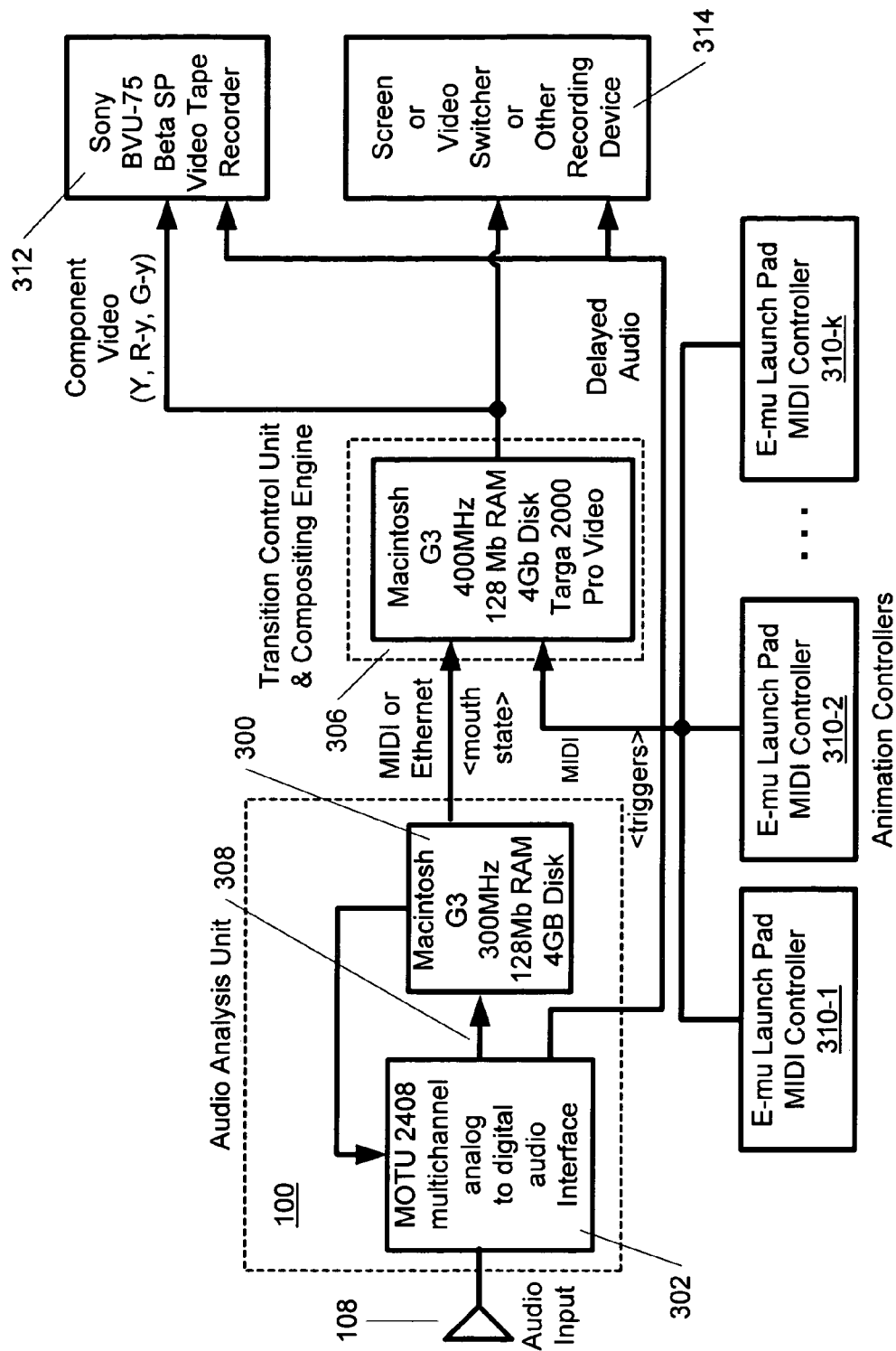
FIG. 3 is one example embodiment of the system logically shown in FIGS. 1 and 2B.

FIG. 3 is one example embodiment of the system logically shown in FIGS. 1 and 2B. In this embodiment, the AAU 100 runs on a Macintosh G-3 300, 300 MHz or higher, having approximately 256 megabytes of RAM or more, and having disk storage of sufficient size to hold digitized audio as appropriate. As shown, the disk storage is a single 4 Gbyte hard disk drive, however other suitable storages such as solid state disks and/or disk arrays my alternatively be used. A multi-channel analog and digital audio interface unit 302 connects to the Macintosh 300 through a PCI card (not shown) via a high speed connection 304 between the interface unit 302 and the PCI card, for example, a high speed serial audio wire. There are several suitable commercially available audio interface units 302, one such example of a suitable audio interface unit 302 is model MOTU2408, commercially available from Mark of The Unicorn, 1280 Massachusetts Avenue, Cambridge, Mass. 02138, which has analog audio inputs, digital audio inputs, and multiple inputs and outputs for both analog and digital.

The purpose of the audio interface unit 302 is to convert audio input into a digital data stream. By way of some representative examples, a microphone connected to the analog audio input channel would be converted to a digital signal and then transmitted to the Macintosh G-3 300 as a stream of digital audio data. Similarly, the audio output of a video tape deck when input into one of the analog inputs, would also be presented to the Macintosh as a digital data stream. Another alternative would be to send a digital audio stream from a digital audio tape (DAT), a stored digitized file or from the output of a digital video deck such as Sony Digibeta (a digital Sony Beta recorder playback deck) into the digital inputs of the MOTU2048 302 which, in turn, presents it to the Macintosh 300 as a digital audio stream. The delayed audio from the AAU 100 also comes out of the audio interface unit 302 and is then suitable for displays in sync with the frame output, for example, on a video tape deck.

The AAU 100 in one embodiment is software which, when executing, examines the audio stream, converts it to an FFT, does some analysis, does some classification, and outputs a mouth state. The mouth state is basically a character identification associated with the channel on which the audio input stream is being presented, and which is appropriate for the given sound.

The mouth state is then presented to the TCU 120 shown, for purposed of illustration, as running in a second Macintosh 306. The connection 308 between the two computers 300, 306 is illustratively shown as standard MIDI or ethernet connections, although optical or other connections of suitable speed and bandwidth may also be used.

A series of conventional MIDI controllers 310-1, 310-2, 310-K for example, those contained on the "Launch Pad" by E-MU/ENSONIQ, 600 Green Hills Road, P.O. Box 660015, Scotts Valley, Calif. 95067-0015 are connected to the TCU 120. The Launch Pad product has a series of octave twelve buttons that record an up and a down state, four sliders for continuous control, buttons that only record a down state, a knob that is spring loaded for continuous variation, pedal input, etc. Other alternative inputs could be any other general or special purpose MIDI-control device such as commonly used by musicians. The output is standard MIDI data, which is presented to the TCU 120 as a trigger occurring on a particular channel. Depending upon the implementation, multiple MIDI inputs can be fed into the computer hosting the TCU 120 at once. In others, they can be daisy-chained together, or they can go through a large MIDI interface supporting multiple inputs. In any event, the triggers are presented to the computer as stream of data associated with a channel. The trigger has a value associated with it which is processed by one of the trigger controllers 122, 124. A relationship between a channel and a trigger is made such that, when a trigger is presented with a certain value, a state change is output and sent the TCU 120. It is with these devices that character movement, such as head turns, costume changes, background changes, etc., are produced. For example, button 1 on a MIDI control channel may cause the head of character 1 to go from whatever position it is currently in to a profile left position. The same button on controller 2 could be used to bring character 2's head to its profile position. It is noteworthy that the association between trigger and action is arbitrary and is actually made in the trigger controllers themselves which, as noted above, are functionally considered part of the TCU 120. In most instances, the trigger controllers 122, 124 are simple software elements that make the desired associations. Alternatively, one could use a patch bay.

On the output side of the TCU 120, an available option is to use a video card which converts the frame buffer pixels to an analog video signal. Alternatives cards can be employed if there is a need to which produce a digital video signal. One of the many acceptable video cards is called a "Targa 2000 Video Pro" made by Pinnacle Systems, 280 N. Bernardo Avenue, Mountain View, Calif., 94043, which outputs an image that is displayable on the screen. The video card converts the digital video signal to a component video signal, which is a professional grade video signal suitable for input into broadcast quality video tape decks 312. In another embodiment, the output can be sent to a video switcher 314 for use in a television studio. In yet another embodiment, it can be sent to a large screen or projector. In short, it will be apparent that the output could readily be formatted and sent to any video display or recording device. For example, in the case of the Targa 2000, it permits the generation of not only professional grade component video, it can also output a consumer grade NTSC composite signal. In yet other embodiments, the output of the frame buffer 138 can be formatted and stored for use by some other application or in some other manner.

Figure 4:
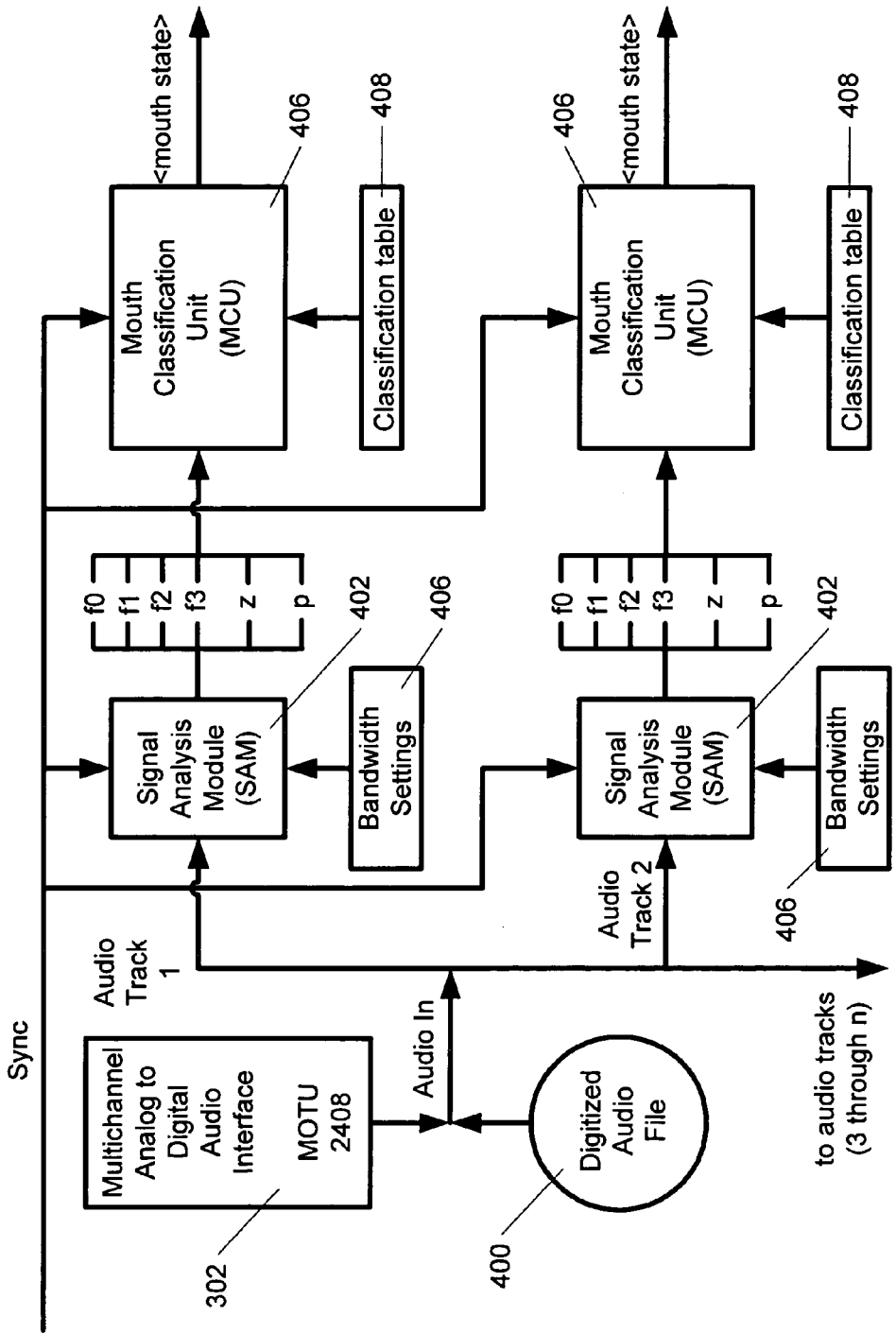
FIG. 4 is a functional block diagram of an example Audio Analysis Unit in accordance with the invention.

FIG. 4 is a functional block diagram of the AAU 100. This functional unit can be viewed as being made up of two primary subcomponents. One of them is called the Signal Analysis Module 402 (SAM), and the other is the Mouth Control or Mouth Classification Unit 404 (MCU). The SAM 402 is where a signal analysis is performed and the MCU 404 is where the mouth classification is performed, the net result being a largely phoneme independent lip-sync. In the example embodiment of FIG. 4, each track of audio coming in has an associated SAM 402 and MCU 404. This permits separate analysis and classification for separate characters, so that multiple characters can be talking at the same time and the analysis for each can occur in parallel (i.e., the mouth states are generated separately for each individual character). This also allows for multiple characters to be simultaneously animated and lip synced. In other embodiments, where time is less of a factor, multiple audio inputs can share a common SAM 402 using known techniques such as multiplexing (FIG. 5A) or by serially analyzing audio tracks and accumulating the results before provision of an audio track to the MCU 404. In similar fashion, multiple SAM's 402 can share a common MCU 404 (FIG. 5B), although additional complexity or increased processing time may result. Of course, in the simplest case an arrangement like that of FIG. 4 can use a single audio track with a single SAM/MCU pair by making a series of passes. It should now be apparent that there is no required correspondence between the number of SAM's 402 and MCU's 404 for any particular embodiment and that the correspondence can vary while preserving the independent benefits or features each provides.

The SAM 402 takes a digitized audio input from the audio interface 302 or a stored file 400, converts it into a spectral representation using a Fast Fourier Transfer (FFT) technique. Stated another way, the input to the SAM 402 is a signal in the time domain—the audio signal—and the output of the SAM 402 is the same signal represented in the frequency domain. The output from the SAM 402 typically consists of six values. Four of the values (f0, f1, f2, and f3) are associated with the power of the signal within defined bands ($b_0$, $b_1$, $b_2$ and $b_3$) defined by Bandwidth Settings 406 after taking the FFT. A single value is derived in each of the bands representing how much of the spectral content exists within that band. Although not necessary, for convenience, the values are normalized over the total power to a value between 0 and 1. In addition to the spectral content, a zero crossing value (z) is also output by the SAM 402. Zero crossings refer to the number of times that a signal will go above or below zero within a particular time window, and also gives some indication as to the noise level of the signal. The final value that comes out of the SAM 402 is the overall power (p) of the spectrum within the four bands. This gives a general sense of how loud the character is speaking at a given time and how much spectral power is being output at a given time. The SAM 402 doesn't usually use overall amplitude, just spectral power. One illustrative reason for using overall power is for a sound like an "S" sound, the amplitude may be very low on the signal, but there's quite a bit of high frequency spectral content in it because it's a very noisy signal.

The combination of the six values create a pattern that is presented to the MCU 404, which examines in the spectral content within bands, zero crossings and power values. When a pattern applied to the MCU 404 is matched, this indicates that a particular mouth shape should be used. The MCU 404 analyzes the six valves by comparing each value to see whether it falls within a prescribed range. The set of ranges correlates particular mouth shapes with the pattern defined by the six valves. One example of this correlation is shown in Table 1 below. In this manner, phoneme independence is largely and advantageously achieved.

At this point it is worthwhile to note that, for purposes of explanation, a set of mouth shapes introduced by Hanna-Barbara is used because it is a commonly used convention. It will be understood that the same technique of matching the FFT pattern with mouth shapes can be employed with any set of mouth shapes. According to Hanna-Barbara convention there are nine mouth shapes, labeled: A, B, C, D, E, F, L, V and M. In Table 1 (called a Classification Table 408), mouth shapes are correlated to the six values so that each row corresponds to a mouth shape (although some mouth shapes have several rows to account for different patterns or sound variations) and the columns are example minimum and maximum values for each one of the six values f0, f1, f2, f3, p and Z. The numbers at the intersection of each is the range within which each value must fall for each mouth shape.

TABLE 1

| | | f0 | | f1 | | f2 | | f3 | | p | | z | |
|---|---|---|---|---|---|---|---|---|---|---|---|---|---|
| | Mouth | Min | Max | Min | Max | Min | Max | Min | Max | Min | Max | Min | Max |
| M | Noise | 0 | 10 | 0 | 1 | 0 | 1 | 0 | 1 | 0 | 1 | 0 | 1K |
| | Breath | 0 | 50 | 0 | 10 | 0 | 5 | 0 | 1 | 1 | 5 | 1 | 60 |
| A | B/P (#1) | 0 | 0 | 0 | 0 | 0 | 0 | 0 | 0 | 1 | 2 | 0 | 600 |
| | B/P (#2) | 0 | 40 | 0 | 10 | 0 | 10 | 0 | 0 | 1 | 2 | 0 | 600 |
| | "emm" | 50 | 95 | 0 | 40 | 0 | 10 | 0 | 5 | 1 | 20 | 10 | 100 |
| V | V | 10 | 50 | 10 | 25 | 10 | 30 | 10 | 30 | 1 | 20 | 400 | 700 |
| | F | 60 | 93 | 4 | 50 | 2 | 40 | 0 | 90 | 1 | 6K | 150 | 500 |
| L | T | 0 | 15 | 0 | 20 | 30 | 92 | 10 | 30 | 5 | 6K | 80 | 450 |
| | "nd" | 0 | 15 | 0 | 20 | 30 | 92 | 0 | 10 | 5 | 6K | 80 | 250 |
| | L | 25 | 85 | 0 | 16 | 0 | 10 | 50 | 75 | 2 | 2K | 200 | 400 |
| B | "ee" | 10 | 97 | 0 | 35 | 1 | 85 | 0 | 15 | 1 | 12K | 15 | 400 |
| | "ess" | 0 | 50 | 0 | 5 | 0 | 80 | 0 | 100 | 1 | 12K | 200 | 650 |
| F | "oo" | 97 | 100 | 0 | 10 | 0 | 4 | 0 | 1 | 2 | 6K | 15 | 120 |
| | Filter | 93 | 100 | 0 | 10 | 0 | 4 | 0 | 1 | * | * | * | * |
| E | ER1 | 40 | 96 | 0 | 50 | 0 | 11 | 0 | 5 | 1 | 15K | 15 | 110 |
| | ER2 | 0 | 60 | 90 | 100 | 0 | 11 | 0 | 5 | 1 | 15K | 30 | 90 |
| D | hard1 | 10 | 80 | 10 | 80 | 0 | 20 | 0 | 5 | 15K | 40K | 30 | 150 |
| | hard2 | 0 | 30 | 10 | 99 | 0 | 60 | 0 | 10 | 15K | 40K | 30 | 180 |
| C | "eh" | 10 | 80 | 10 | 80 | 0 | 20 | 0 | 5 | 1 | 15K | 30 | 200 |
| | "ah" | 0 | 50 | 10 | 99 | 0 | 60 | 0 | 10 | 1 | 15K | 30 | 225 |

* = Don't Care

This classification table 408 illustratively contains representative values. Depending upon the implementation, the values in the table may vary from speaker to speaker and may also vary from animation director to animation director. In sum, the classification table 408 merely provides a range of values that need to be matched in order to output a particular mouth state.

Moreover, although shown as a table, the same concept can be employed using an algorithm or formula, or using software such as shown in either of FIGS. 10A through 10R or 10S through 10LL, or by implementing the arrangement using hardware created, for example, using an electronic design automation development tool, silicon compilers and/or by employing architectural synthesis techniques.

In another alternative variant, the classification can be done by converting the numerical values in the pattern to a symbol representing any value in a range. For example, particular ranges of values may be identified as zero (Z), very low (VL), low (L), medium low (ML), medium (M), medium high (MH), high (H), very high (VH) and maximum (X). Once classified into these ranges (i.e. a symbol has been assigned to the value), a search can be performed to identify the corresponding mouth state or mouth identifier for a particular set of symbols. For example, to identify an "A" mouth, the set of symbols for spectral content should be between M,Z,Z,Z and X,Z,Z,Z, with the zero crossings being in the range of VL to VL and the overall power being in the range of VL to X. An example of this variant is illustrated in FIGS. 10S to 10LL.

Figure 6:
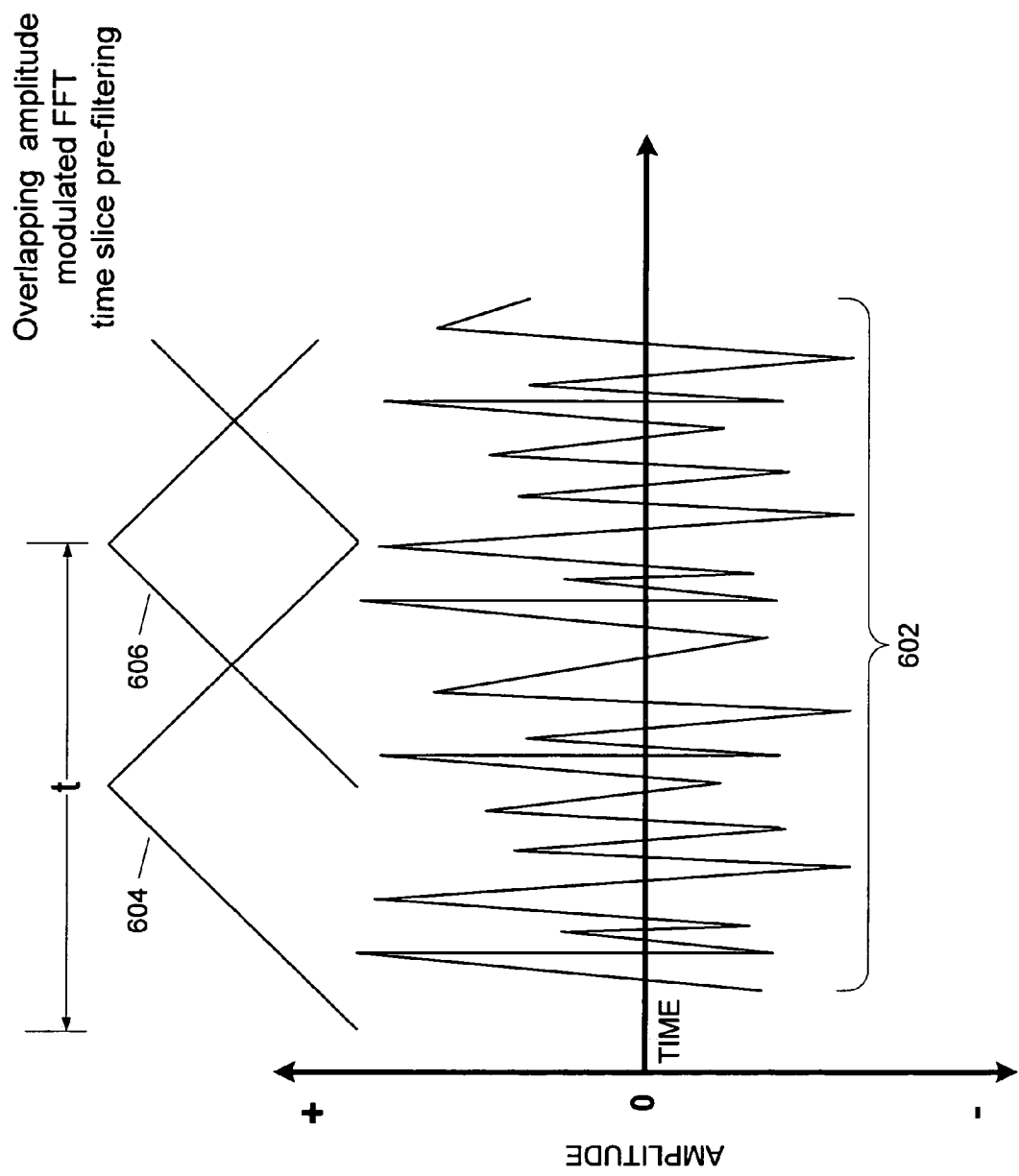
FIG. 6, is a representative audio input signal.
Figure 7:
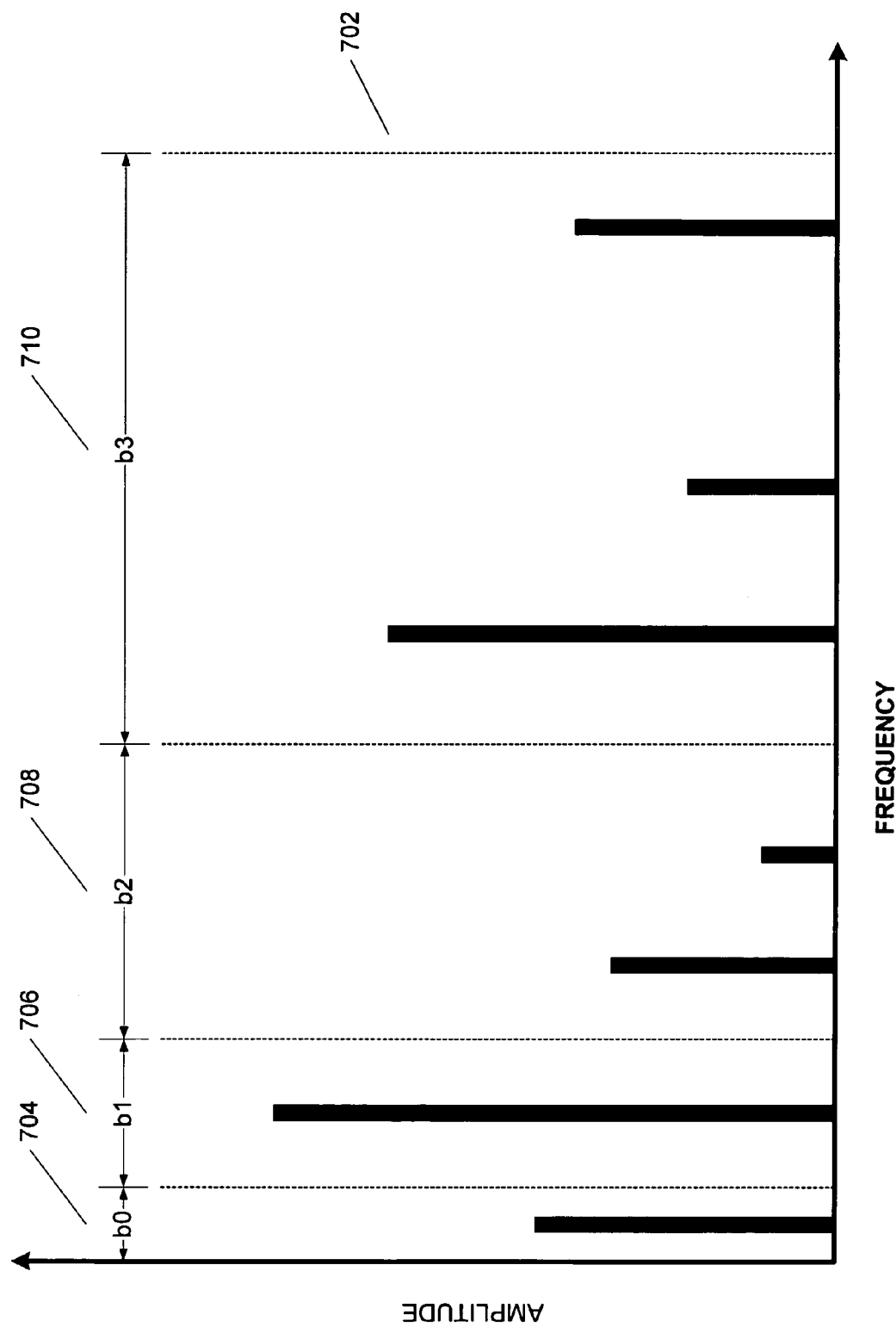
FIG. 7 is a sample output resulting from performing a Fast Fourier Transform (FFT) on an audio input signal.

FIG. 6, shows a representative audio input signal 602 and FIG. 7 shows a sample output 702 of the FFT for an audio input signal. A well known artifact of FFT's is that FFT's can potentially introduce frequencies which are not present in the input signal. There are several known ways to mitigate those introduced frequencies. One technique involves using an amplitude envelope over a time period. Multiple amplitude are employed and envelopes overlapped to eliminate or reduce undesirable clicking when the FFT goes from time period to time period.

Figure 8:
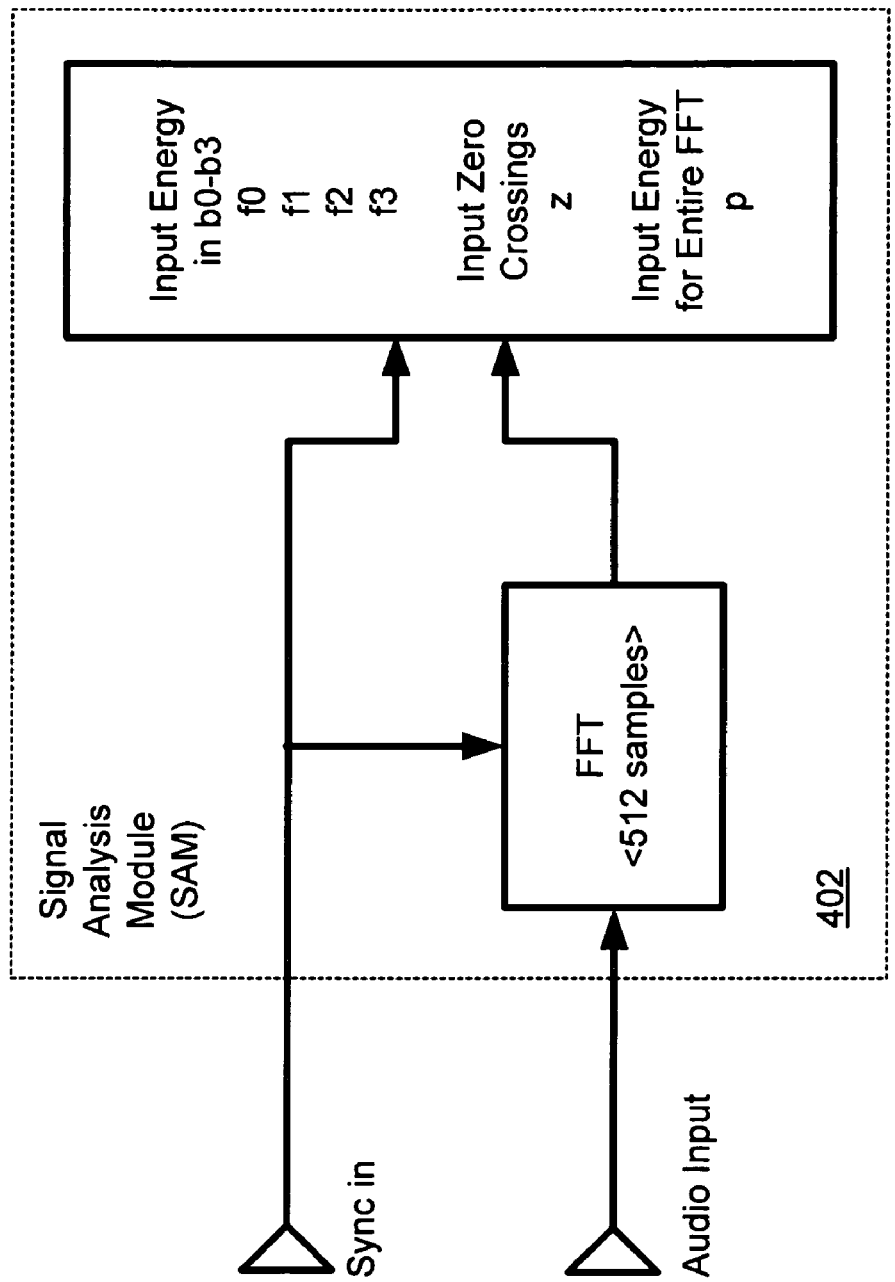
FIG. 8 is a functional block diagram of an Signal Analysis Module according to the principles of the invention.

The FFT time is a function of the audio signal clock and the number of samples in the FFT. Depending upon the specific application, an FFT sample size of 1024 or 512 is generally used, although other FFT sample sizes could be used, for example, if the number of bands were different or to allow for a different prefiltering scheme. With the 1024 sample FFT a sample clock of 44.100 kHz is used. The FFT time would then be 1/44.100*1024 or approximately 22 milliseconds. In the embodiment of FIG. 8, a 512 sample FFT is used. In both cases, the upper half of the FFT is discarded so, for the 1024 sample FFT, only the first 512 frequencies are analyzed in generating f0, f1, f2, and f3. Similarly, if a 512 sample FFT is used, only 256 frequencies would be used.

As noted above, there are alternative techniques that can be used for FFT prefiltering. Some examples are Hamming windows, square wave amplitude modulation and non-overlapping windows. In general, for most speech applications, the most desirable FFT uses overlapping triangular windows 604, 606. The duration that the FFT runs (t) is the width of a single triangle filter 604. The filter width (t) is also the inference period of time for the mouth state.

FIG. 7 shows the relationship between the spectrum returned by the FFT and the bandwidth settings 406 of FIG. 4. These bandwidth settings 406 are conventionally set to roughly approximate where a formant in speech would appear. This technique uses a narrow band and very detailed sampling of the low frequencies and, as you go up in the frequency spectrum, the bandwidth in each band becomes wider because there is less information present at the higher frequencies. The power in each band is calculated and is summed to obtain the overall power (p).

The power in bands $b_0$, $b_1$, $b_2$ and $b_3$ 704, 706, 708, 710 give an indication as to what type of sound is being spoken. A lot of very low frequencies in band $b_0$ with a little bit in $b_1$ indicates possibly a sound similar to an "R" sound; a very high value indicating a lot of power in $b_0$, but zero power in all the other bands indicates a sound similar to the double "O" sound as in "food." Conversely, low power in bands $b_0$, $b_1$ with a little bit of power in band $b_2$, and a lot of power in band $b_3$, usually indicate an "S" sound as in "Stephen" or "Z" sound as in "zone" or "xylophone."

FIG. 9A is a more detailed functional block diagram of the Mouth Classification Unit 404 (MCU) which actually applies the classification table 408 to the output from the SAM 402. The input to the MCU 404 is the power in the four bands, $b_0$, $b_1$, $b_2$, and $b_3$, the zero crossings (z), and the overall power (p) derived from the FFT. These values are then classified, for example, in the illustrative examples of FIGS. 10A-10LL by number or symbol and, when patterns are found, the output is one of the different mouth states 902. The mouth shapes in the example are also labeled A, B, C, D, E, F, L, V and Z, according to the Hanna-Barbara convention. According to this convention, the "A" mouth is generally used for the "M, B" and "P" sounds (the closed mouth sounds). The "B" mouth is used typically for "S" sounds and "ee" sounds, and is usually drawn as the teeth being closed and the mouth being open. The "C" mouth and the "D" mouth are used for most of the consonants, the "C" mouth is used for the quieter consonants, the "D" sound is used for the louder consonants. The "E" mouth is used for an "R" sound and a soft "O" as in "Rob." The "F" sound is used for the "W" and, "oo" type sounds. The L mouth is used for the "L" sound as in "lung," or for the "tch" as in "touch", as well as any sound that would require the articulation of the mouth to suggest movement of the tongue. The V mouth is used for "V" sounds and for "S" sounds. The M mouth is generally also considered the neutral mouth position and is used when no sound is being spoken.

Figure 9B:
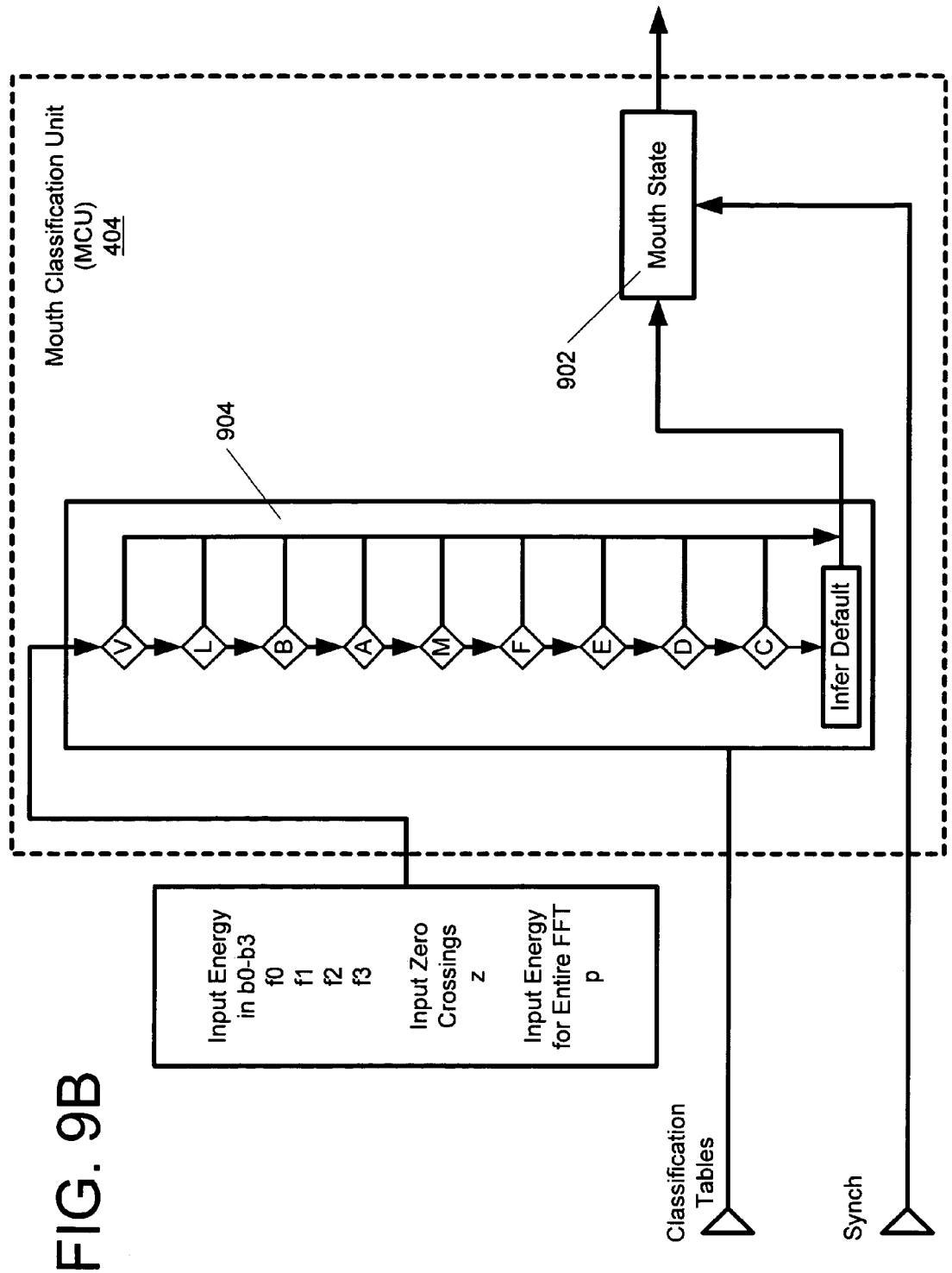

FIG. 9B is an example alternative variant having a slightly different pattern match search order.

The pattern matching 904 is done with a simple scheme that conditionally looks for values within ranges. This may be done in software such as in either of the examples of FIGS. 10A-10LL, using, for example, MAX which is an object oriented programming environment for music and multimedia and is commercially available from Opcode Systems, Inc., 365 East Middlefield Road, Mountain View, Calif. 94043, or in hardware, using, for example, conventional digital logic elements or specialized application specific to integrated circuit (ASIC) or programmable logic type (FPLAs, PLAs, PLDs, etc.) devices. The pattern matching procedure is done by sequentially by typically looking for the V mouth patterns first, followed by the L mouth, S mouth, E mouth and B mouth, then the A mouth, and the M mouth patterns then follow. In other alternatives, the sequence can be V mouth followed by L mouth, followed by B, A, M, F and E mouths in sequence.

The C and D mouths patterns are covered last because they are used for sounds that are not specifically categorized, but generally indicated by overall spectral power, with low spectral power indicating a C mouth and higher spectral power indicating a D mouth. Depending upon the particular implementation, the C mouth can be searched for before the D mouth or vice versa. If a pattern match failure takes place for any reason after the above attempts, an inference can be made based upon zero crossings, or the combination of zero crossings and power.

To generalize the process, it is one of successively increasing the latitude for a pattern match. To select a V mouth a fairly precise pattern match is required, whereas to select the D mouth a fairly broad pattern will do.

In certain cases, the pattern match procedure order may vary to accommodate user preference or character idiosyncrasies. For example, in some cases, the B mouth is searched for before the F mouth whereas in other cases the reverse is true. In still other cases, a particular pattern, for example the V mouth pattern, can be disabled, dispensed with or varied slightly to customize or "tune" the correlation to a particular speaker or maintain character related consistency.

An added level of processing can be optionally added to reduce the amount of fast oscillation between mouth shape and mouth shape or "mouth fluttering," which is considered to be visually undesirable. In one approach, simple rules are applied by looking at mouth patterns over three different samples. For example, if there's an open mouth, a closed mouth and then an open mouth in succession, the second open mouth is discarded to keep the visual lip-sync looking smooth, not erratic. A visual analysis of simple characteristics can be used to identify the undesirable visual effects and filter them out by applying rules in a similar fashion.

While the general technique is to match patterns in order to sequentially identify mouth shapes, and thereby transition as necessitated by the audio input, for example from the V mouth to an E mouth, animation directors sometimes want to make the transition happen more slowly or and more smoothly, and introduce subtle gradations between the V mouth and E mouth or, in general, between any mouth and any other mouth. The MCU 404 is flexible enough to allow both an instantaneous change from mouth shape to mouth shape, or a transition from mouth shape to mouth shape, as well as to allow for the filtering out, or introduction of, particular mouths for sounds based upon how it appears to the animation mouth director.

The SAM 402 and MCU 404 also differentiates this technique from the phoneme type of lip-syncing technique conventionally used which requires a complex analysis involving looking for stops, affricates, fricatives, nasals, glides, etc. Although there is some broad correspondence between some mouth shapes and some phonemes, there are many situations where the spectral analysis technique is too broad or too coarse to be considered accurate phonetically. Advantageously, by using the spectral analysis and classification technique described herein, no particular attempt is made to find and parse words so there is no specific phonetic analysis that needs to be done. There are no phoneme tables involved, just an analysis of the audio signal and a heuristic association between a pattern of frequencies, zero crossings and power to a mouth shape.

Using the signal analysis and classification technique, there is no language dependency because no language elements are being looked at or examined for, phonetic structure—rather the approach is simply a matter of matching a particular sound with a particular mouth shape. The "oo" sound, whether it's produced as part of a word in Arabic, or Japanese or English, will use the "S" mouth, which is the appropriate mouth for that particular sound. Thus, by using multiple SAM 402, MCU 404 pairs, multiple language versions of the same animation may be created, with each having its own proper lip sync.

In some embodiments, the technique is also, tunable. The bands f0, f1, f2 and f3 are tunable, in software or hardware, to account for the differences in speakers, languages or intonation, or to suit a particular animator's sense of aesthetics. Tuning also is done by changing the values in the classification table 408, the bandwidth settings 406, and the heuristics used to filter out undesirable visual effects.

It should be noted that although the classification process performed by the AAU 100 and its SAM 402, MCU 404 components the same technique can easily be implemented in hardware which could, in some embodiments, significantly increase the speed or reduce the size of the computer hardware that is required to perform the mouth classification. A hardware implementation could however result in loss of some of the flexibility in the tuning.

Nevertheless, the classification tables 408 could also be modularized and programmed, for example, into a flash memory or EEPROM so that they could at least be tuned minimally or into a PROM or EPROM if tunability is not an issue. As will also be recognized, the SAM 402 can be implemented in hardware while the MCU 404 is done in software or vice versa.

For general speech, minor tuning seems to produce fairly good classifications which work well for a wide variety of voices. For example, men and women speaking into the same AAU 100 can produce reasonably good lip-sync without tuning the classification tables 408 or the bandwidth settings 406 in between.

The tunable nature also allows for professional quality animation for a very demanding animation director who wants specific directorial control over the movement of the mouth and/or lip-sync.

One of the further advantages of the instant approach is that the classification tables 408 can also be empirically generated by running a particular audio segment over and over again and making a visual correlation between the pattern of spectral content, power and zero crossings and the resulting mouth shapes. That classification of mouth sounds can then be further tried, over a wide variety of words or phrases the character might be using, and iterated until the desired visual effect is achieved.

Similarly, using two, three and five bands for purposes of classification can also produce favorable results although, in general, two and three bands do not work as well as four bands and greater than about five bands introduce ambiguities that typically exceed acceptable levels. Moreover, it is to be appreciated that, in some cases, any two sequential bands may not be contiguous (i.e. there may be a gap between them). Additionally, the number of bands described herein refers to the number of bands used for classification purposes—in other words, the number of bands used for purposes of measurement is may significantly exceed five bands, however in those cases, the values in measurement bands will be combined to create the two to about five classification bands. By way of example, band $b_2$ may contain values from a single measurement band or be consolidated from 2, 3 or even 1024 or more measurement bands.

Having described the various functional components and some exemplary implementation variants, the overall operation will now be discussed.

An animation is typically a series of scenes, where a scene is made up of a number of different components or elements which are layered together and composited to create an animation frame. Generally speaking, scenes are made up of a background element, one or more characters and possibly some foreground elements which may be in front of the character. Layering is done so that the background is at the back, the character is in front of the background and the foreground elements are on top of the character. There also may be situations where there are no backgrounds or the background is blue and the character sits on a blue background for compositing using a traditional chroma-key method. Compositing combines the pieces together into a series of animation frames.

Figure 11:
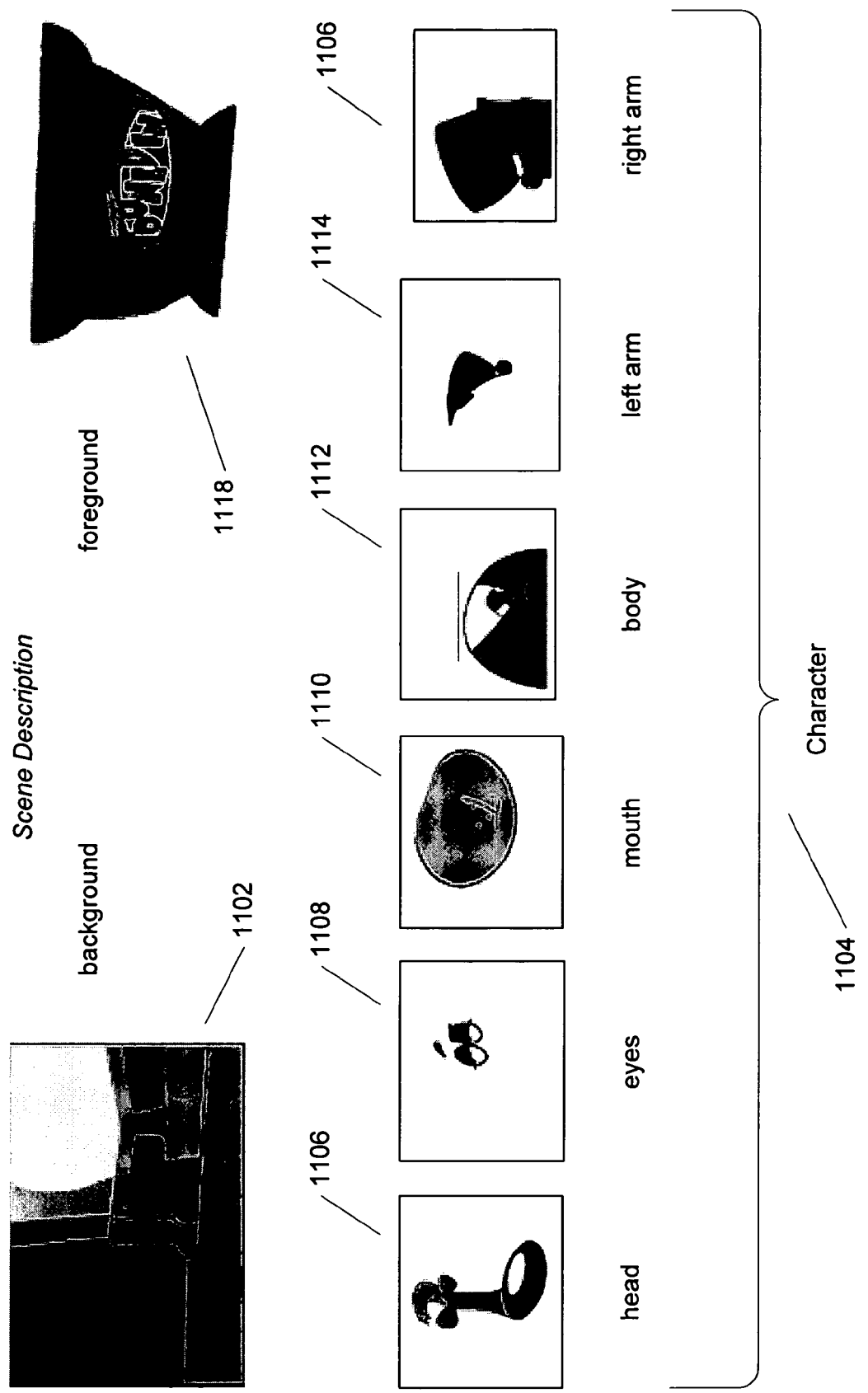
FIG. 11 is an example of the basic components of a character and how they are arranged in relative priority or layer order.

Referring now to FIG. 11 which includes an example character. The example shows the character elements as will be assembled onto a background 1102. The character 1104 is illustratively made up of a number of elements: a head 1106, eyes 1108, mouth 1110, body 1112, left arm 1114 and right arm 1116. Each of these elements animates independently, or moves independently. As a result, the layering is such that the eyes 1108 are placed on top of the head 1106 and the head 1106 is placed beneath the mouth 1110, the mouth 1110 is sits atop the body 1112 and the arms 1114, 1116 will change their layering depending upon their gestures. The left arm 1114 sits on the left side of the body 1112, and the right arm 1116 lays on top of the body 1112 on the right side, and finally, the foreground element 1118 sits and covers a small portion of the bottom of the body 1112. In this example these elements constitute a scene. Each of these components may have animated gestures associated with them including changes to the background or foreground and all may be manipulated or changed independently. Thus, FIG. 11 shows by example the basic components and how they are arranged in relative priority or layer order. The character 1104, when it is composited together (i.e. with a particular body with particular head positions and arm positions etc. . . . ) or assembled from a particular point of view, is generally considered "posed." Poses can range from different camera angles to different body states and positions. Characters are organized into poses so that all the necessary elements can be created, assembled and used within a particular pose in any sequence. FIG. 12 shows four example poses that this character 1104 can assume. One pose has the character standing with his arms at his side and standing somewhat upright (Pose A). In Pose B, the character is leaning forward on the podium. In Pose C, the character is leaning forward more and in Pose D, the character has one elbow resting on the podium with his shoulder basically turned to the viewer. The way this particular character was designed, the head elements are all the same in all four poses so the facial expression elements are compatible with all of the poses. The arms are the elements which incompatibly vary from pose to pose. In other words, the arms in pose A could not be used on pose D, C or B, but the head in pose A and its elements are used in pose B, C and D except, in Pose D, they are translated slightly down in the frame to correspond to the body moving forward. All the elements that were drawn for the head in pose A are reusable in the other poses. In contrast, there are unique animations and drawings for each of the arms in each different body pose. This organization of the possible poses is called a "character table". So, for this example, the character table shows the four poses and the relationship between the background character and foreground in a composite frame.

Figure 13:
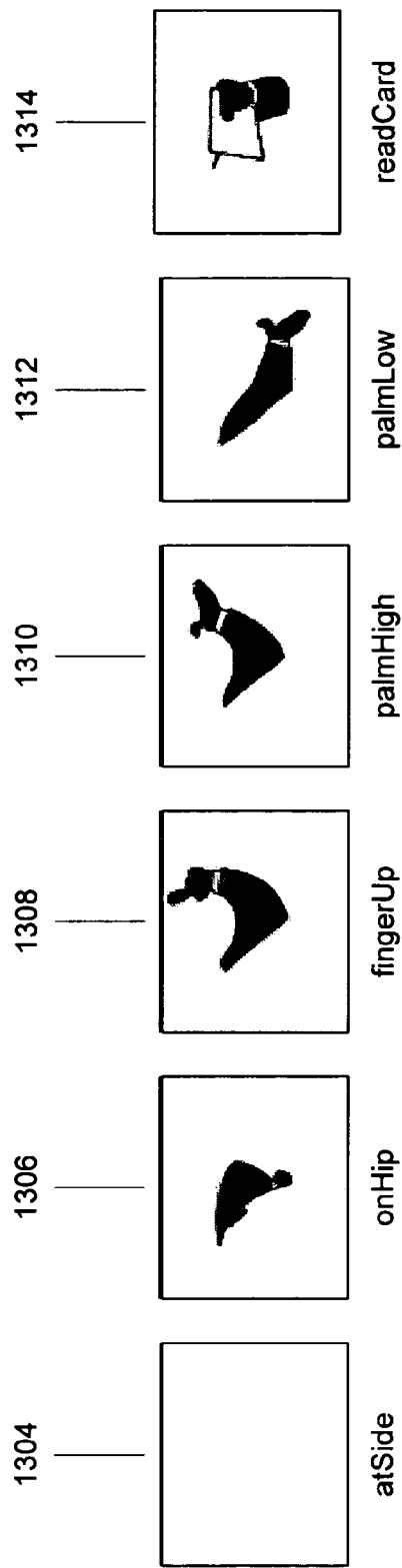
FIG. 13 is an example gesture table for the character of FIG. 11 in Pose A.

The list of legal or possible gestures defined for each of the different components within a given pose is called a "gesture table". FIG. 13 is an example gesture table 1302 for the character of FIG. 12 in Pose A. In this example gesture table 1302, there are five elements which can possibly change—the left arm, right arm, head, mouth and eyes. The left arm is the element for which there are the largest number of defined gestures that the character can go to in that particular pose and each has a corresponding image. They are the arms at the character's side 1304, arms on the hip 1306, finger up in the air 1308, palm raised high 1310, the palm is low 1312 and another gesture where the character is reading from a card 1314. Although the images are not shown, in the gesture table 1302 the right arm has a defined corresponding set of atSide and on Hip gestures. It doesn't have a corresponding fingerUp, but it does have a palmHigh. Similarly, the head has a profile left gesture, a ¾ left, a front, ¾ right and profile right gesture. The range of head gestures corresponds to the character turning its head from profile left through to profile right, so the character can move its head from left to right or vice versa. Attached to each of these heads are a set of mouth gestures, each containing the mouth shapes which will be selected as a result of the audio analysis. The "up" and "down" mouths allow for lip-sync involving different facial expressions. A down turned set of mouths are usually used to indicate anger, sadness, etc. . . . . Up turned mouths are for normal or generally more congenial expressions. This organizational arrangement allows for many different mouth expressions for the character, for example, overly big or wide mouths; mouths to the side; mouths which vary based upon loudness, and so on. In addition, the eyes have a range of gestures, for example, they can be wide eyes or half mast. Half mast eyes are often used to indicate a level of boredom or exhaustion.

The frames database 132 of FIG. 1 is, to some extent, an image "library" for each element which may change at any time during the animation. Of course, it may also contain images which do not change or are not used. In fact, the frames database 132 will likely contain more images for a particular element and action than would actually be used during a given transition, or even a given scene or animation. However, those images are advantageous if expandability or future use is a consideration. For example, if an animated series is contemplated and time is available, it may be desirable to fully define all of the possible actions for a given character. This allows extremely fast, low cost production of high quality additional episodes and specials.

Another advantage to fully defining a movement will be evident from the following example. Assume that a given element's change from Pose A—start position to Pose A—goal position is fully imaged using a linear change over 10 frames. The sequence portion of the transition table described below can be used to define that change using all 10 images or some subset thereof. In most cases, the sequence will be a subset of the images in the frames database 132. If all ten images are used, the motion will take ⅔ of a second to complete if shot on twos. If a quicker transition was desired, 5 images can be used, for example images 1, 4, 7, 9, and 10. This would provide a faster transition movement with a smooth finish. Alternatively the same fast transition might involve using only images 1, 3, 5, 7 and 10 for a more continuous visual effect. Similarly, a slow to fast transition might use images 1, 2, 4, 7 and 10. Moreover, if a reverse movement needs to be defined, it can be done independent of the forward movement. For example, the forward movement might sequentially use images 1, 4, 7, 9, and 10 and the reverse use, images 10, 6, 3, 2, 1. Thus, a high degree of flexibility is afforded. In a similar vein, if during production, the 10, 6, 3, 2, 1 transition was deemed too slow and visually undesirable, the animation could be quickly changed merely by editing the values in the transition table to, for example, to use images 10, 5, 2, and 1. FIG. 14 illustrates the selected images from the frames database 132 used for an in-pose sequence 1402 and for a pose-to-pose sequence 1404.

As will be evident, the frames database 132 for this character and element contains at least 11 and more likely up to 103 images. The selected images (Images 1-7) are the ones which will be sequentially used during a transition of the arm within Pose A from atSide to on Hip and from Pose A on Hip to Pose B onDesk. Those image transitions are shown in what is referred to as a "sequence table" which is a table that takes the component from one gesture through to another. It is the sequence of transitions that the component would have to go to achieve a desired gesture from a given starting place. The sequence table can reflect any changes which will occur in the frames. So, for example, in addition to changes involving movement, the changes could involve a change in look, like a costume change, so that the same sequence is defined twice, once for a green jacket and once for a blue jacket. Each one of which would then be a separate entry in the gesture table 1302 and have a corresponding sequence.

There are two different kinds of sequences in this organizational arrangement: sequences which are transitions while staying in a particular pose and transitions that take you from one pose to another. Thus, FIG. 14 shows two parts of the sequence table. The sequence table of FIG. 14A shows the starting image, ending image and inbetweens for a transition between the atSide gesture and the on Hip gesture. The transition is done with seven images, all taking place within Pose A.

The example shown in FIG. 14A is a sequence or a transition from the arm for character named "Buddy" in a two shot for pose A (standing upright). This sequence takes the left arm from the at Side gesture to the onHips gesture. In this example, seven images are used to make the transition from atSide of onHip. The first image is black, because the body of the character hides that arm in that particular image. In image two the arm starts to become visible. By image three the arm has a very visible appearance. By image four the hand clenches as a prelude to resting on his hip. In image five, the arm comes fully up and then finally, in image 6 it begins to settle and in image seven ends in its resting place. This sequence of images, it will be recognized, uses the conventional animated effect of cushioning—for the settling of the arm into its final resting place to give the arm a natural appearance. So the seven images are used to make the transition from "at side" to "on hip."

The sequence table of FIG. 14B shows the pose-to-pose transition between the last image in the in pose transition (Image 7) where the arm is in the onHip and it is making a transition from that pose to the onDesk arm pose of Pose B. The transition from Pose A left arm onHip to the pose B left arm onDesk is effected in four frames, starting with the onHip and using two inbetweens going to the onDesk pose. During this transition there also is at least a corresponding new body transition with in between steps, however those transitions would be accomplished in the same manner and, accordingly, are not shown.

A transition table 131 is the overall structure that's used to coordinate the animation and movement of the character from state to state. In other words, the transition table 131 is the "glue" that holds the whole character together and its how the animated movement from state to state is described and constrained. FIG. 15 is an illustration of a small part 1502 of a transition table for the whole character. The part shown is for the character in pose A, and its assumed that the left arm is currently at the side. The transition table describes the only legal transitions and, in particular, how the transition from atSide to stayatSide, or atSide to go to: on Hip, fingerUp, or palmHigh. The list of in Pose transitions in this Fig. corresponds to the gesture table described above. The second entry is the list of in Pose transitions including from pose A left arm atSide to pose A left arm on Hip which is the sequence table of FIG. 14A. The values in the cells of the table show the frame numbers that are required to make that transition. The second section of the transition table describes the pose to pose transitions. In its simplest embodiment, the individual entries in the transition table each represent individual steps. In some embodiments however, boxes between two steps may be left empty or undefined for a particular aspect. In that case, the lack of one or more intervening values could signal the need to interpolate values between those two points, using for example, known linear interpolation formulae or morphing techniques. In those embodiments, as the transition controller 128 encounters empty boxes, a routine is invoked which "looks ahead" to determine what the goal state is, advances to the first step for which there is a value and "looks back", or maintains a count of the number of steps between the current state and the goal state. For example, if there is an initial value in step no. 1 and the goal is in step no. 7, and only step nos. 2 and 3 have values, an interpolation would be done for the steps between step 3 and step 7. Further rules could be imposed to require the interpolation to take into account the number of steps in between, or apply some other rule or constraint consistent with the desired effects. The pose to pose transitions and a number of different possible in pose transitions are shown in FIG. 15 for the example illustrated in FIG. 14B. The pose to pose transition illustrated is a Pose A to Pose B transition for the left arm, with the arm gestures for the arm being: atSide, onDesk, tapDesk, and pointWest. For simplicity, only the values for the transition from Pose A left arm atSide to Pose B left arm onDesk are shown.

The transition tables are used by the transition controller 128 when trying to bring the character from the current state into a desired or goal state. A trigger is presented to the transition controller 128 and the trigger indicates that the character's current state is atSide and desired transition is that the character move its left arm from atSide to onHip. The transition controller 128 detects that a new goal state is being presented and checks the current state of each element of the character to determine whether it is in the goal state. If it is not in the goal state, then it causes the next step to be taken to get to that goal state. This iterative process of querying each of the components continues until all elements report that they are in the desired state.

The transition table may also include different classes of default transitions which are used in the event that an exact match does not exist. This can occur, for example, if the transition calls for a move from Pose A are atSide to Pose D arm atChin and that transition is not defined directly. In that case, the Pose-to-Pose transition may involve a Pose A arm atSide to a "neutral" position defined as a default with the likelihood that a transition from that neutral position to Pose D arm atChin exists. Thus, if the defined transitions fail, a check is made to see whether, or not, the desired state falls into the Class I candidates. If a match of one of the candidates in Class I is found, then that's the transition it uses. If none of the classes are matched, a final default may be defined. For example, for one character the default may be to put their arm down when they are trying to go to a state which is not a legal state. For other characters, the default might just leave the arm in a particular state. An example of when this would be used is where a body suit on an actor moves in a way that is not defined in the gesture table. Another situation where a default would be used is to allow characters to evolve over time. A particular transition from a previous to a new state may not have been defined because of cost or budget constraints, the complexity of drawing it, etc. . . . In order to keep the character from falling apart, a neutral default action is defined to allow for the addition of further transitions from that neutral state at a later time. If pose A has a left arm atSide, pose B has a left arm atSide, pose A has a left arm onHip but Pose B does not have a pose arm onHip. If the character has its left arm on its hip and it is coming to a pose B position there is no corresponding onHip for Pose B. The default would be used to bring the arm down to the side, which it is a legal pose for Pose B. In that way the character can make the desired transition in a coherent and visually acceptable way.

These transition tables can be extensive. They will generally be as extensive as necessary to create the desired fluidness and flexibility in character movement. Every component in every state, and/or every component in every Pose, has a list of legal gestures that can be made from that state or from the existing pose to any other pose. The default and classification methodology also allows the table to be asymmetric. The organization of the transition tables also allows the transition table to be dynamically edited and modified as necessary and allows the animation process to proceed smoothly and systematically. Taken together, the frames database 132 and the transition table allows for character consistent, truly "live" appearances by the character, via an actor with a motion capture suit, or puppeteers manning a series of controllers, without the risk that the character will move uncharacteristically or in a manner contrary to the animator's wishes, irrespective of who is controlling the character. Additionally, if the character has particular vocal characteristics, those can be preserved for the "live" performance as well, for example, through straightforward adaptation, without the character suit, of the system and technique described in U.S. Pat. No. 5,327,521 incorporated herein by reference.

The frames database 132 also allows for multiple versions of the same animation to be simultaneously created. For example, by using three different frames databases, one where a particular character is male, one where a particular character is female, and another where the character is an anthropomorphic animal. By feeding the same compositing commands to either three compositing engines, each having one of the frames databases or by using the same compositing engine with each frames database in turn, three different animations are created. This can be extremely advantageous for targeting of diverse markets where, for example, it is unacceptable to portray females in particular jobs in one cultural market, but highly desirable in another. Both markets can now be satisfied with a minimum of extra work.

Another use for the frames database 132 in conjunction with the timeline recorder 134 is to permit off-line rendering of a real time performance so that it is compatible with high resolution film or HDTV. In this situation there would be two (or more) frames data bases 132 one for the real time performance at video resolution and one for the final output medium at high resolution. Once a performance is captured, and possibly edited, in the timeline data recorded by the timeline recorder 134 using the video resolution frames database, the final timeline would be played back using the high-resolution frames database and the composting engine would output high resolution frames to the high resolution film recorder or HDTV recorder.

Figure 16:
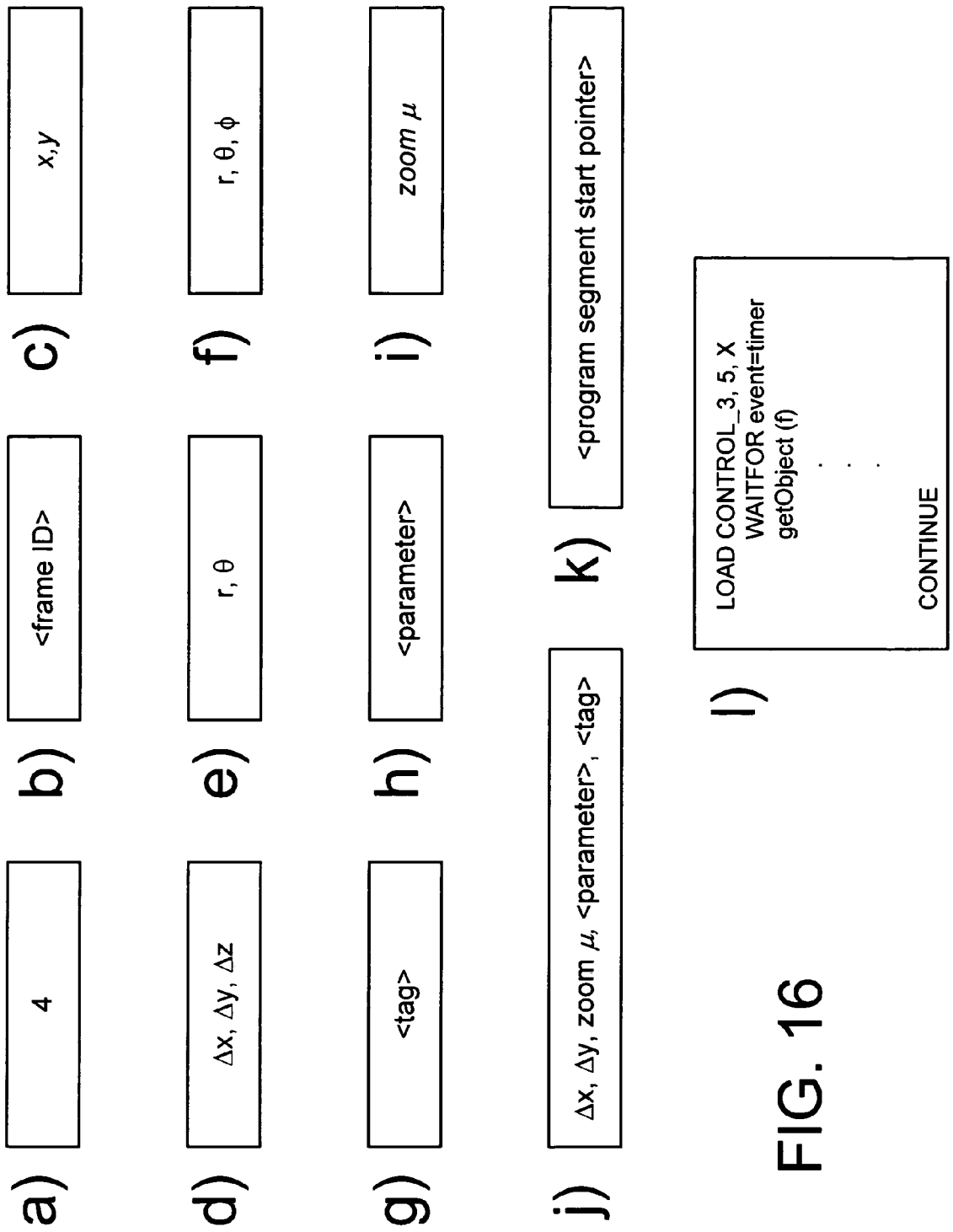
FIG. 16 is an illustration of entries that can be stored in transition table cells.

As shown in FIG. 16, the entries that are stored in the table cells can also be a variety of different types of data items. They can be single integers (FIG. 16a) or frame identifiers (FIG. 16b) which are used to select a particular frame number out of the frame data base 132, and which indicate the image that should be used for that component for that step of the process for that transition. Other entries that could be stored include X and Y position on the screen (FIG. 16c), like the head position will be the same frame number, but would have a different X, Y location in Pose B versus Pose C versus Pose D. The entry can be a change in position (FIG. 16d). The entry can also specify orientation in degrees of rotation in the plane of the image, the entries can be X, Y and Z values, or it could be location in space or orientation using spherical coordinates (FIG. 16e, 16f) rather than Cartesian coordinates. The transition table can also contain "tag" values (FIG. 16g) so that items can be requested by name and be application dependent, etc. . . . Similarly the entries could represent change or Δ of position, angle, etc., a scale, zoom or magnification value (FIG. 16i), a factor that would allow the character to change its size, for example, while the character makes the transition from farther away from the viewer toward the viewer, causing a perspective change in size, and/or an indicator of extra long (ELS), medium long (MLS), long (LS), medium (MS), close-up (CS), point-of-view (POV), wide angle (W), soft focus, selective focus and tilted shots. Table cells can also contain scalar values augmented by geometric transformation, for example, rotation, scale and position, or parameters for properties such as color, shading, lighting, etc. The entries can reflect camera effects such as panning, tracking, fade, dissolve, superimpose, wipe, and slow or accelerated motion.

Entries can also be any kind of information used to control other applications, so you can make requests outside of the domain of the current application, and control other applications with it, for example, a motion capture 3D animation system providing it has program inputs. The control information can be a pointer to a program segment (FIG. 16k) or program segment itself stored in the cell of the table (FIG. 16l) which used to control the system or affect some external application. This is useful in motion capture in which some kind of rig or suit that captures the actual performance of a human being and their location in space. While motion capture works very well if you want to replicate human movement, it does not necessarily work well when the motion capture system is used to control animated character movement since animated character movement is not necessarily human-like in its transition. Depending upon the application and contents of the transition table, a whole control system is created which uses a wholly different animation methodology and which still operates in real time, but allows the coherence of the animation to be specified by an animator, rather than the dancer or performer. This allows the character to remain true to its conventional animation and characteristic behavior, even though it is performed live and somewhat independent of the specific performer controlling it. In the Idolon/Scrim embodiment, the transition table organization allows the cells to include as entries, in addition to the contents described above, information pertaining to Idolon placement, as well as factors such as warping, degree of transparency or opaqueness, deflection or twist, or even thickness if desired. With this embodiment, the composite frame produced by the compositing engine is made up of these Idolons with the images hanging on them positioned in space one behind the other to create a layered compositing effect. This embodiment uses a real-time 3D rendering system, such as openGL or the like.

Additional Alternatives

It will now be apparent that the techniques and principles described herein are, to some extent, a powerful hybridization of general animation techniques, such as frame compositing using a computer and conventional puppetry, where a character moves under external control. To that extent, the technique may be considered a form of animation under puppeteer (human or automated) control referred to as "animateering", "animatry" or "cartooneering" depending upon the particular context.

There are also a number of applications of the principles of the invention which would not be considered by some to fall within the category of classical animation. Nevertheless, the above principles may be straightforwardly applied in those applications in the following ways.

It should be evident that the above principles can easily be applied to cutout animation. To do so, cut-outs of the individual elements are made and imaged in as many different positions as is necessary. Each image would then be stored in the frames database for use as described above. Similarly, cutout elements can be placed on Idolons for manipulation.

An offshoot or variant of cutout animation uses a set of photographic images which may be manipulated in a similar fashion. In the most basic application, the source for the individual manipulable elements will be photographs (conventional or from a digital camera) taken in each possible pose through a series of transitions. However, for other than the most basic scheme, the process of creating the image database in this manner can be very time consuming. An alternative is to film the actor going through the range of motions and extract the elements from each frame of the film or interval of videotape. The advantage of this approach is that, not only is the line blurred between conventional motion picture and animation, but new films can be created from old movies and movies can be made using actors who are no longer alive in a form of "anImageering". Moreover, to the extent films are recorded digitally, not only can component elements of body parts be extracted for use in a frames database, the creation of a library of mouths from a given actor can allow for foreign language dubbing with more visually acceptable results than achieved with conventional dubbing. To accomplish this result, mouth images are extracted from other frames of the film and are stored in the frames database since they are the images of the film which will change. The rest of each film frame is then treated as a background. The new audio track is then applied to the AAU 100 with the cells of the transition tables containing the information required to properly place the mouth images.

Depending upon the particular case, the extracting can be accomplished in a variety of ways, the simplest example being using masking techniques whereby undesired components of the frame are eliminated or blocked so that only the desired component is visible. For example, a sequence of frames showing a person swinging a golf club can be masked so, that only one arm transitioning through the swing is visible in each frame. Having masked out the remaining components, the arm becomes a usable image asset that, by translating its position in space, can be used as an uppercut punch in a fight.

Another alternative is to use a rig made up of a number of cameras located at different points about the human character, for example, as if the person or some part of the person were contained within a fixed enclosure like a sphere, with the cameras being mounted on the surface of the enclosure and pointed towards the person. By moving through a range of motions, a series of images, from a number of angles, can simultaneously be captured for use in a frames database. A more limited version would concentrate on the head or mouth, to facilitate facial animation or lip-sync and allow for faster, cheaper and/or more accurate editing and/or dubbing.

Another application is a hybrid clay animation technique in which the individual clay elements are formed in the desired shapes and imaged. Again, those images, as individual components, can be processed as described above in a form of "claytoonery". Similarly, true puppet components can be imaged and stored in an image database for similar usage.

Notably, all of the above applications of some of the principles described herein have the same basic advantage— namely the ability to allow third party manipulation of image elements within constraints imposed by the animator or director so that visual continuity and acceptability is maintained.

Other notable variants of system elements and methodologies using the same principles will also be apparent. For example, although the discussion has largely involved a tabular organization, it will be recognized that other organizational arrangements will work to a greater or lesser extent, depending upon the particular application. For example, instead of using tables or lists (which are merely single row tables), it is well known that formulas can be used instead. For example, where every third image in a set of images will be used, the notation "i+3≦10" can be used instead of "1", "4", "7", and "10" in four cells of a table.

In another alternative embodiment, the transition tables can be used for pure in-pose transitions, with the pose to pose transitions from the sequence tables being handled using "procedurals". Procedurals can be used to bind together key poses in more elaborate animations than might be implemented using sequence tables. Procedurals reduce the complexity of the gesture database by combining the effect of many sequence tables into a single sequence. For example, they can be used to effect dramatic entrances and exits from a scene or they can implement gags and effects that change the entire appearance of the character at one time, they can also be used to turn over manipulable aspects of the character from external control to a preprogrammed sequence and then back to external control. Alternatively, a procedural can have a preamble, defined by a transition sequence, to bring the character into a neutral pose that matches the start of the procedural. Once the preamble has completed, the sequence of frames that make up the procedural are run. After the procedural has completed, control can be transferred back or a postamble may be used to return the character to a specific neutral pose, again through the use of a sequence table. Procedurals can also be used in combination with sequence and/or transition tables to allow, certain elements to be externally controlled, while other elements have control periodically (or on a one-time basis) taken away and then returned so that, for example, a character can walk while waving its hands and talking with extreme facial expressions. All under external real time control. A procedural can be used to remove control of the arms and legs and run a sequence where the character trips, brushes themselves off and gets up—at which point control of the arms and legs would be returned to the external manipulator. At all times however, the facial expressions may have remained under external control.

In other embodiments, logical components of the system can be modularized (whether in hardware, software, firmware, microcode or some combination thereof) for use in related applications, for example by employing a silicon compiler, design automation tool or using architectural synthesis techniques so that some or all of a functional component or two or more functional components are implemented in one or more chips. For example, the AAU 100 can be modularized for use in a children's toy, such as a stuffed animal, which is set up to form particular mouth shapes. A prerecorded audio input 400 would allow the toy to convincingly sing songs. Similarly, a microphone would allow a person to serve as the voice in real-time.

In still other embodiments, the logical components, whether implemented in software, hardware or some combination, can be separately packaged for integration with applications or systems of third parties, for example, by creating a plug-in expansion card, a software extension or plug-in for an existing computer program or some combination thereof.

FIGS. 17 through 75 are a program listing of one embodiment of a CE implemented in software suitable for use as described herein, as an alternative to a hardware implementation of a compositing engine.

Figure 76:
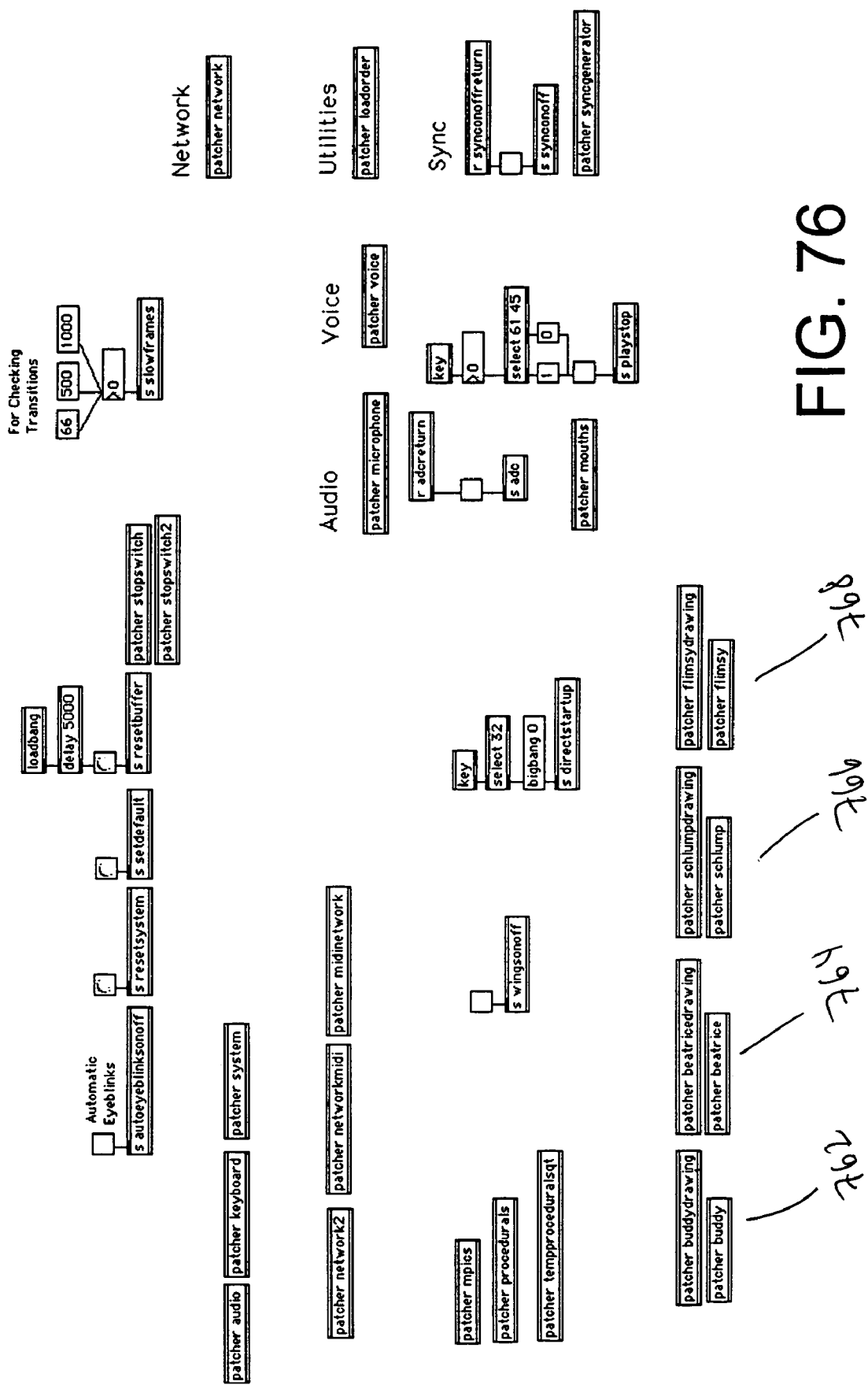
FIGS. 76 through 78 are an example of a software embodiment of an Audio Analysis Unit according to the principles of the invention.
Figure 77:
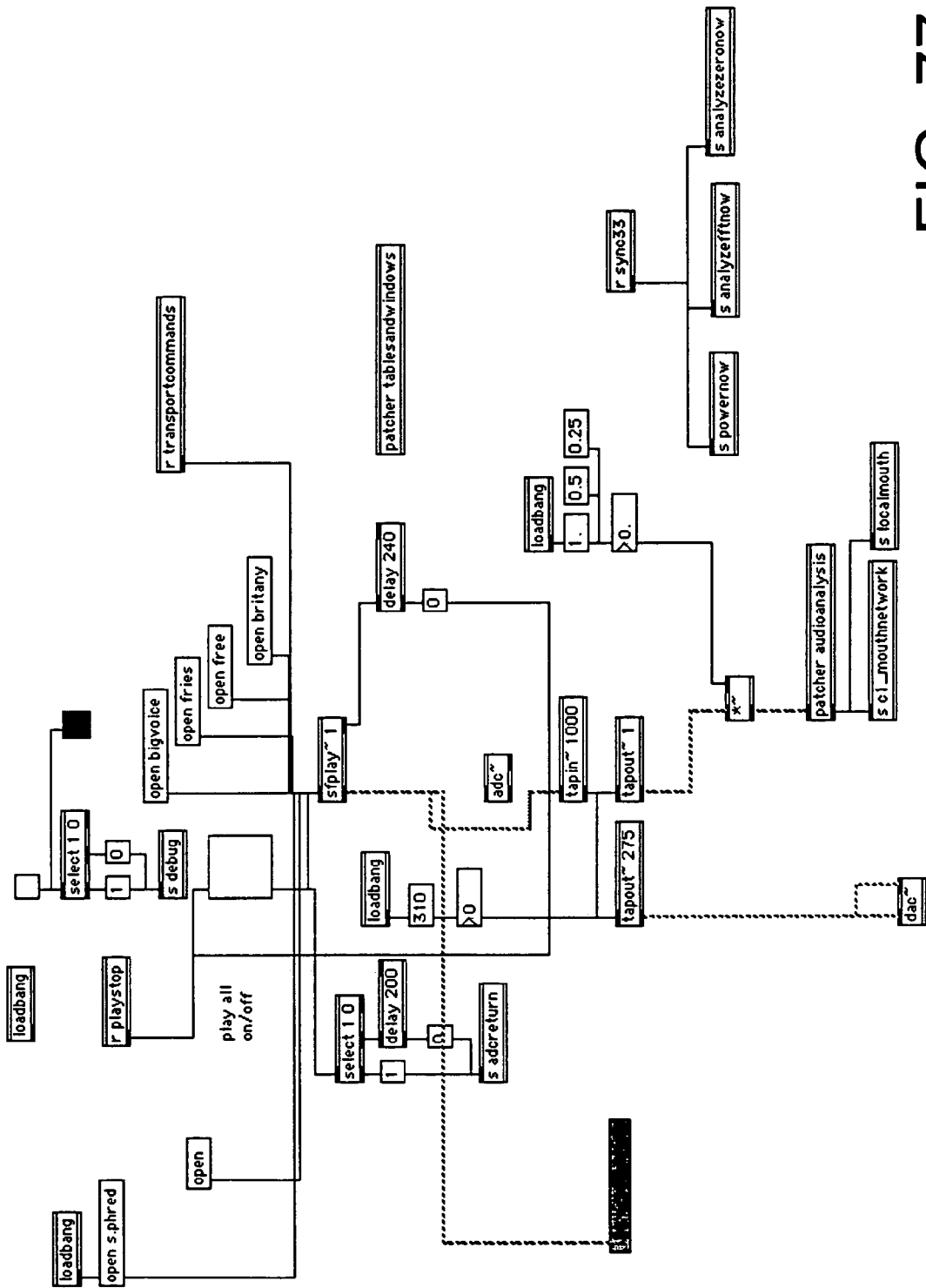
Figure 78:
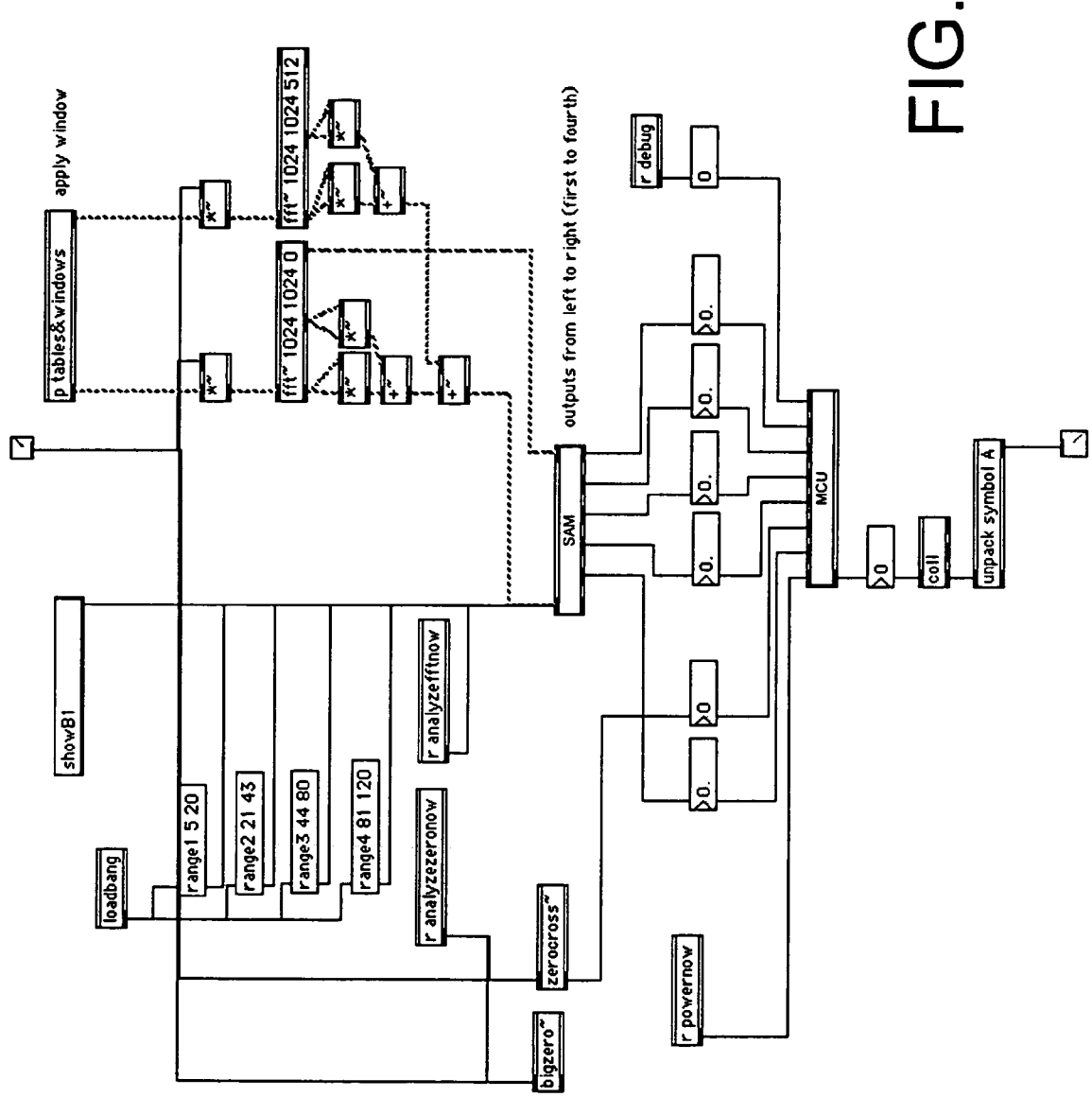

FIGS. 76 through 88 are an example software embodiment for each of the AAU 100 and TCU 128. This example is written in MAX, which is available from Opcode Systems, Inc., 365 East Middlefield Road, Mountain View, Calif. 94043 and additionally uses MSP, which is a set of object extensions to Opcode's MAX that synthesize, process, analyze and delay audio signals in realtime, available from Cycling '74, 1186 Folsom, San Francisco, Calif. 94103. FIG. 76 is the main program level in the hierarchy. There are several "patches" 762, 764, 766, 768 shown, each of which corresponds to a particular character. For example, one of the patches 763 is for the character "Buddy" illustratively used for purposes of explanation in FIGS. 11 through 15. FIG. 77 is the voice portion of the program, which roughly implements one example software embodiment of the of the AAU 100 and MCU 404 functionality. FIG. 78 is the audio portion of the program which is a subcomponent of the voice portion of FIG. 77 and specifically implements one example software embodiment of the SAM 402 and MCU 404 functionality. Depending upon the particular implementation, as noted above equivalents to the example software embodiment of the AAU and/or SAM (or sub-components thereof) can also be embodied in hardware.

Figure 79:
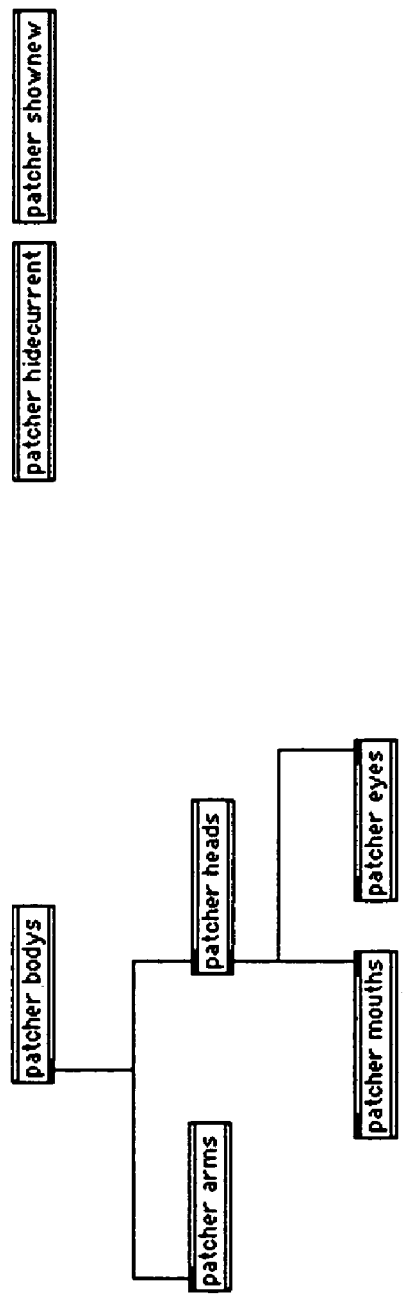
FIGS. 79 through 88 roughly implement an example software embodiment of a Transition Control Unit for the different components of the character of FIGS. 11 through 15.
Figure 80:
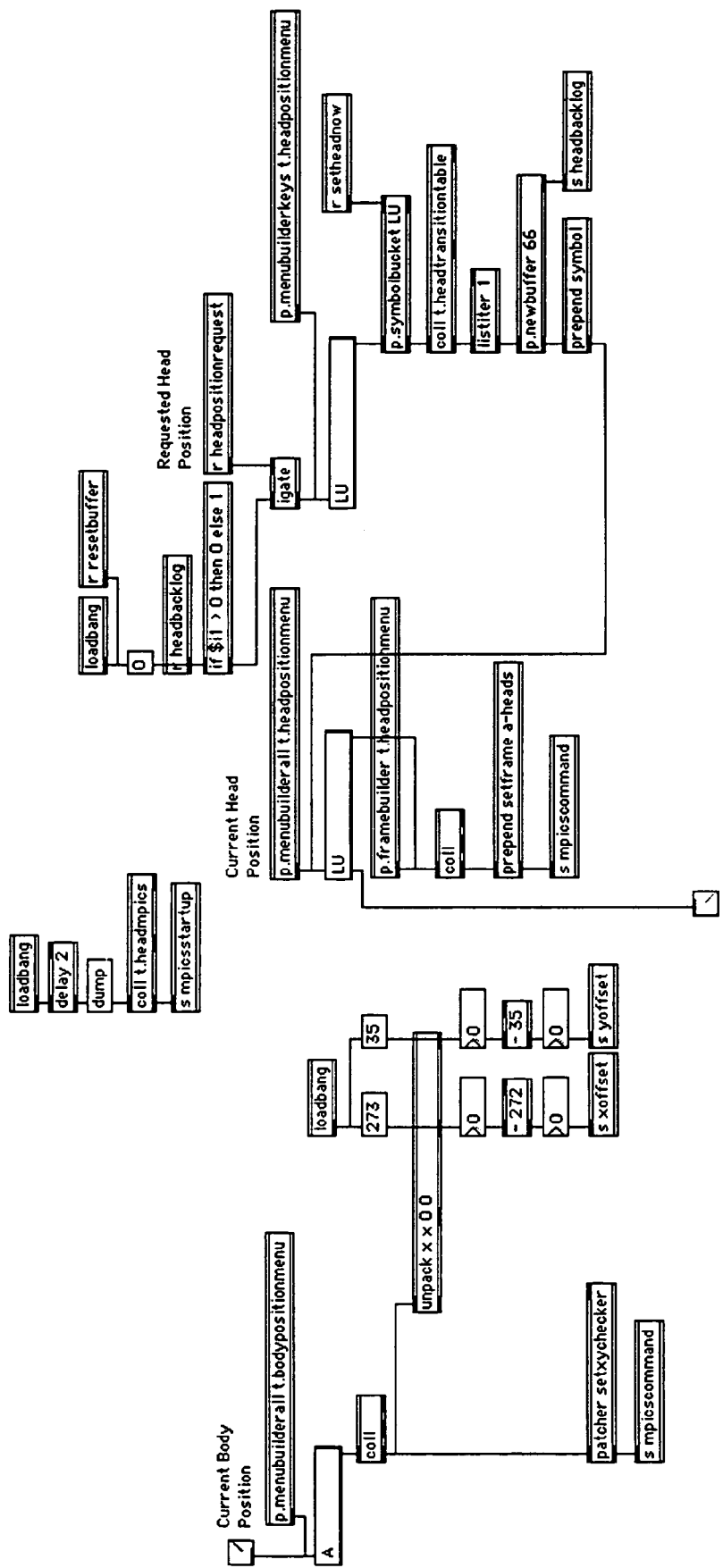
Figure 81:
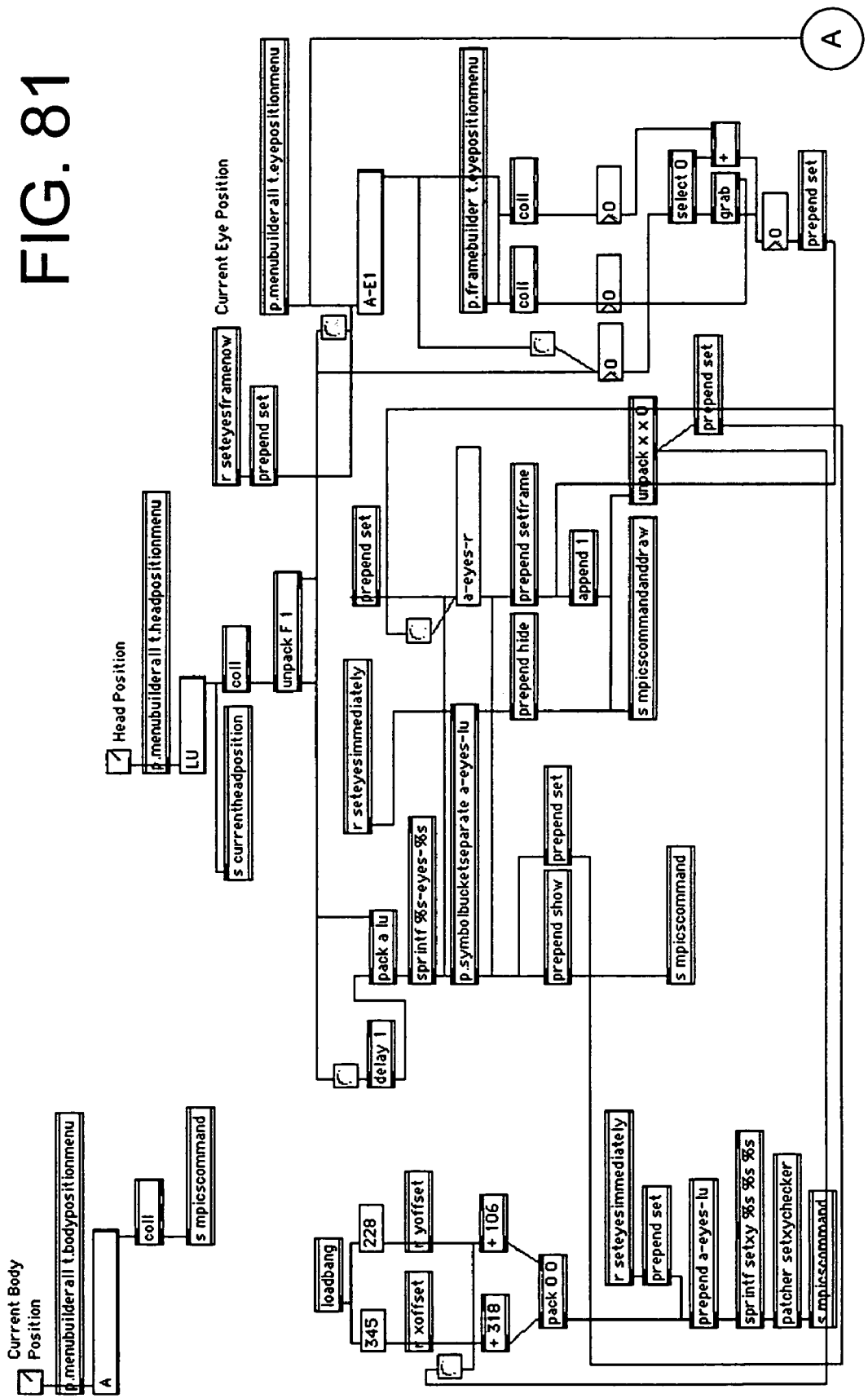
Figure 82:
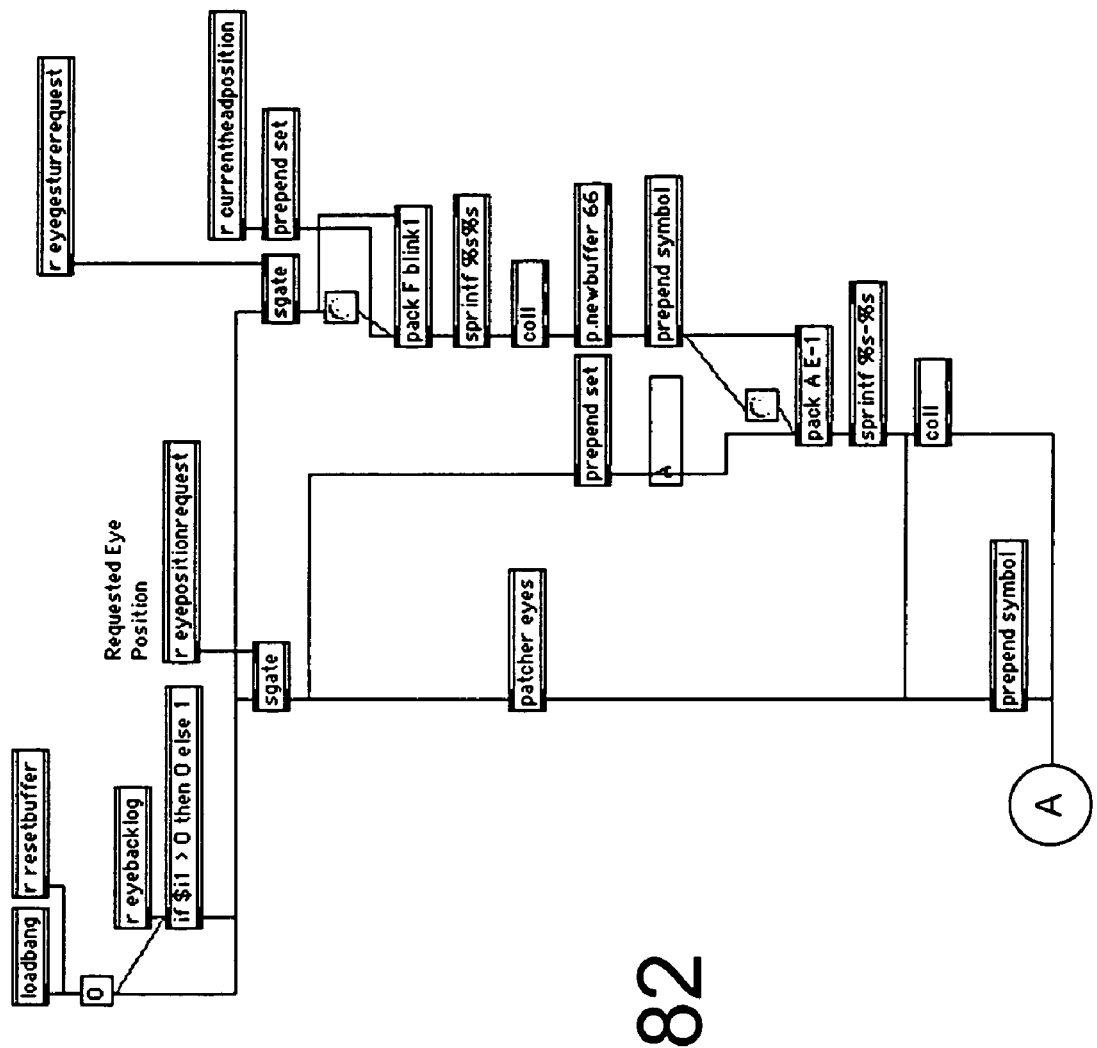
Figure 83:
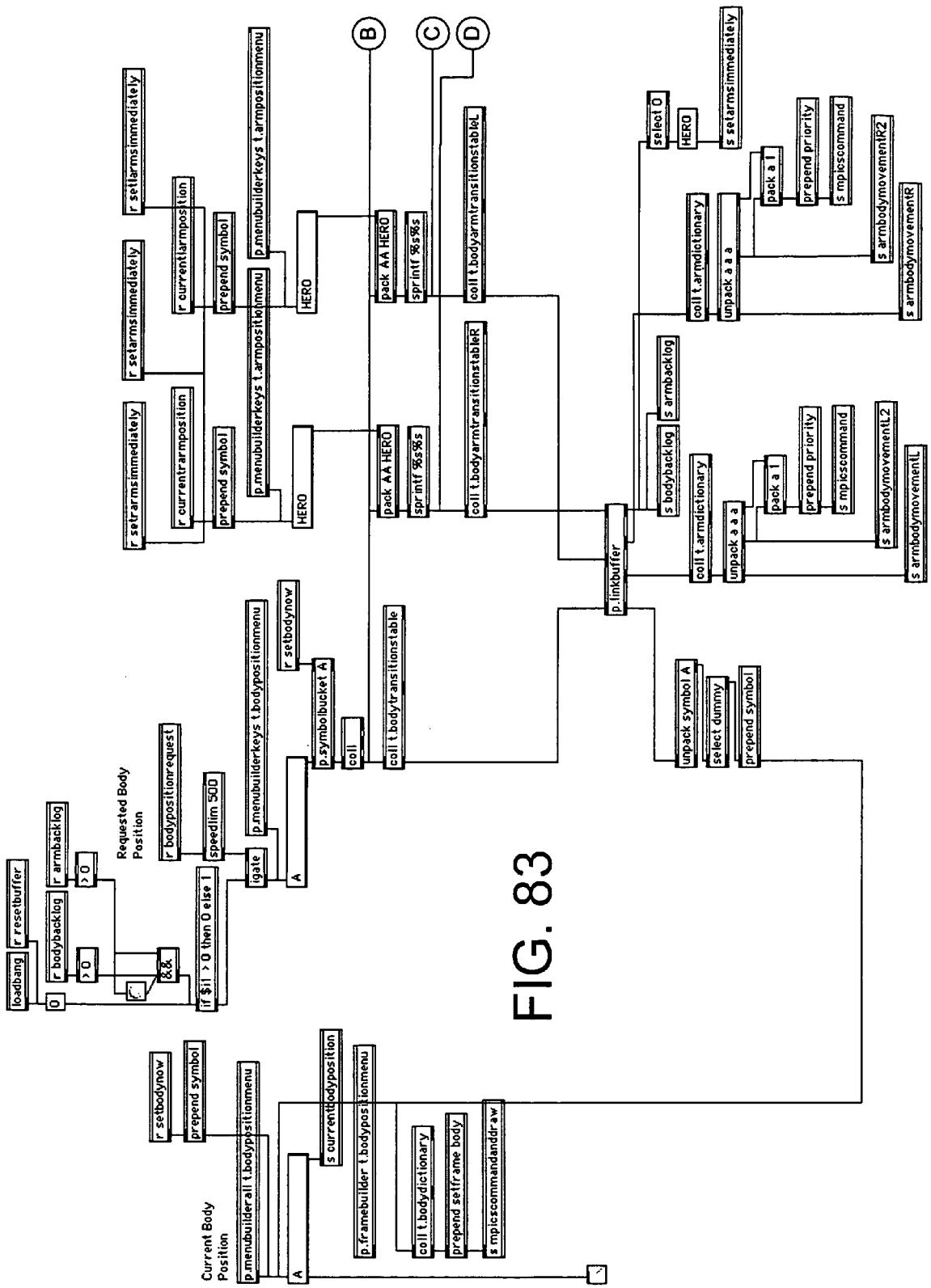
Figure 84:
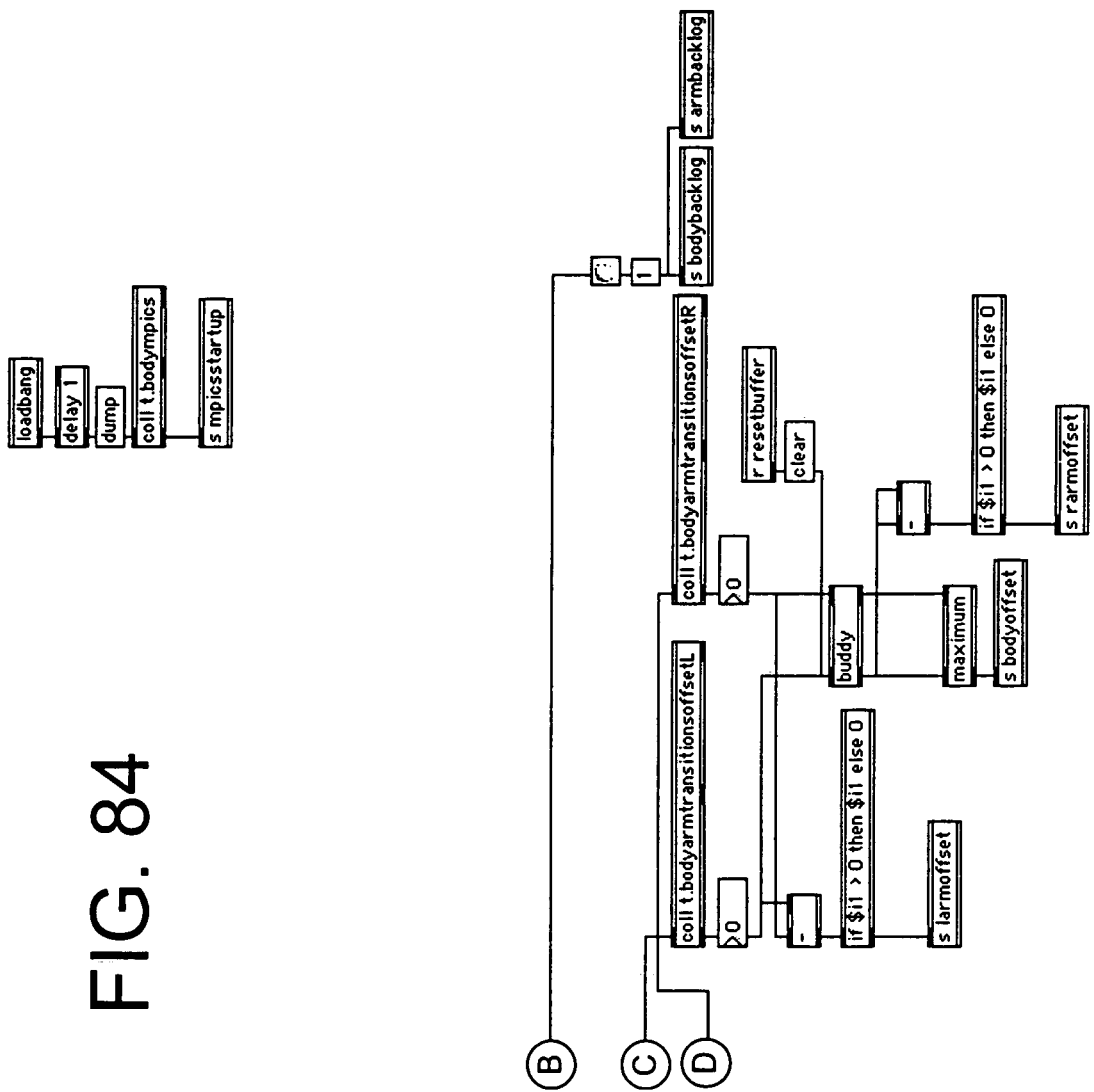
Figure 85:
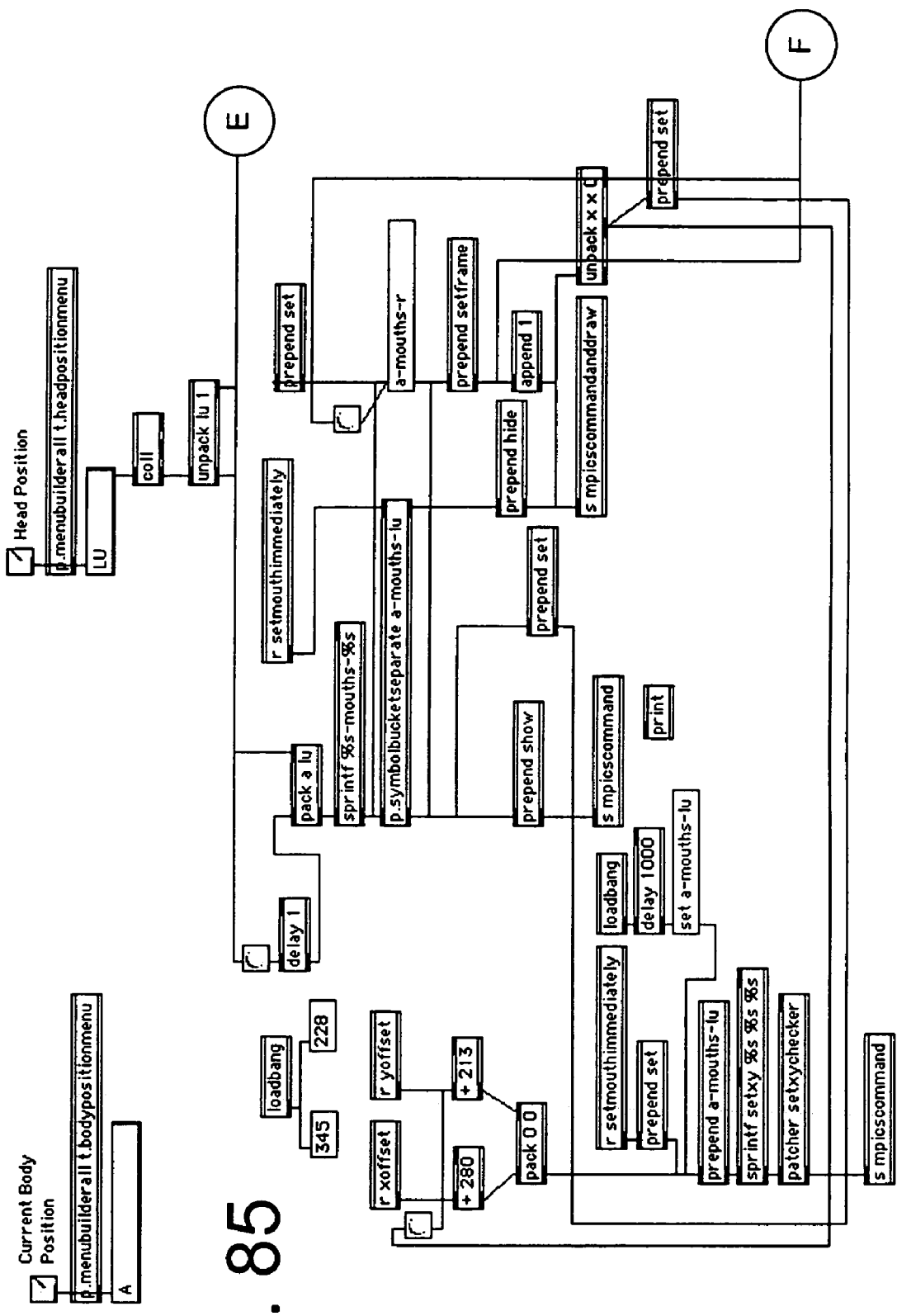
Figure 86:
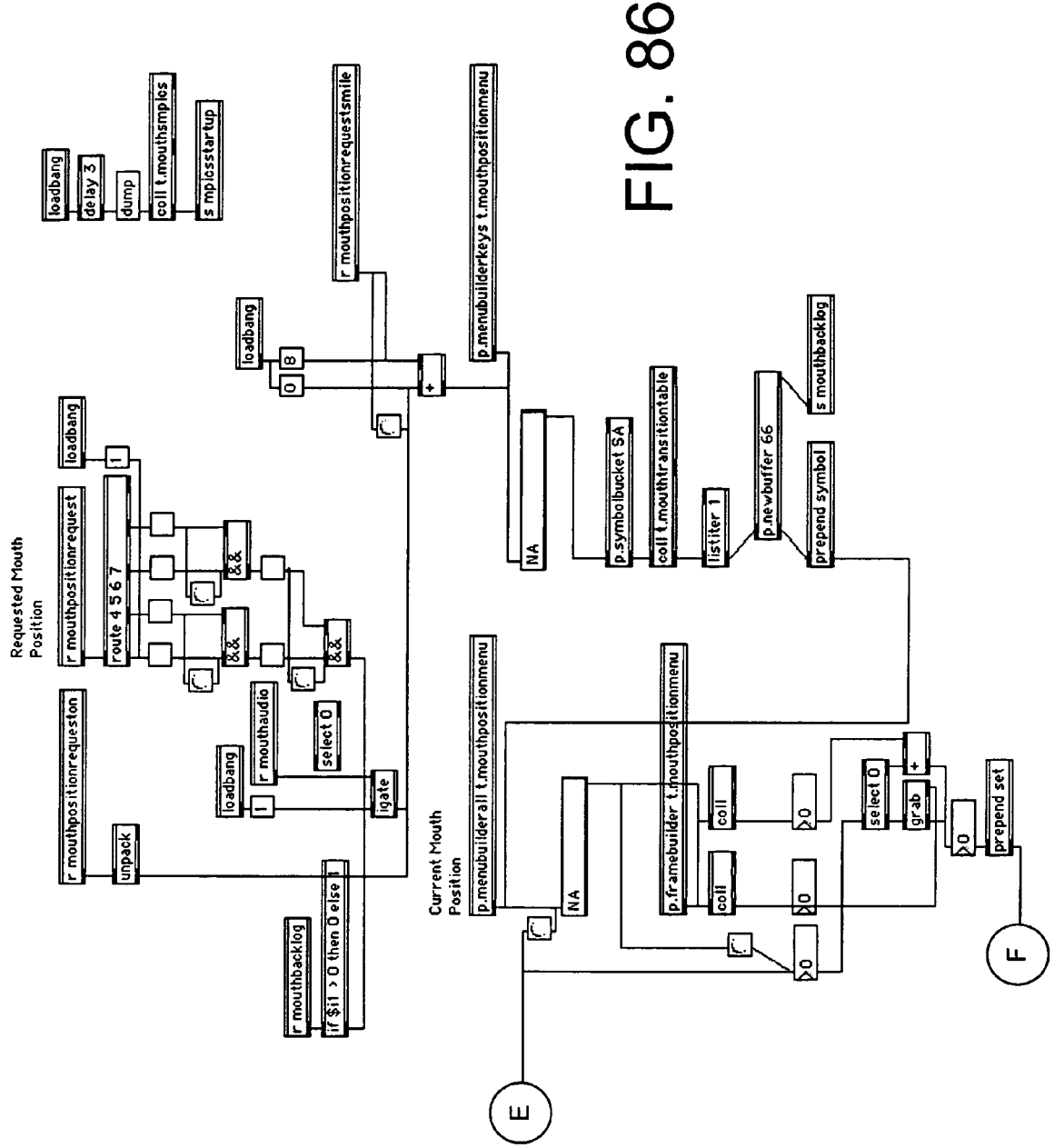
Figure 87:
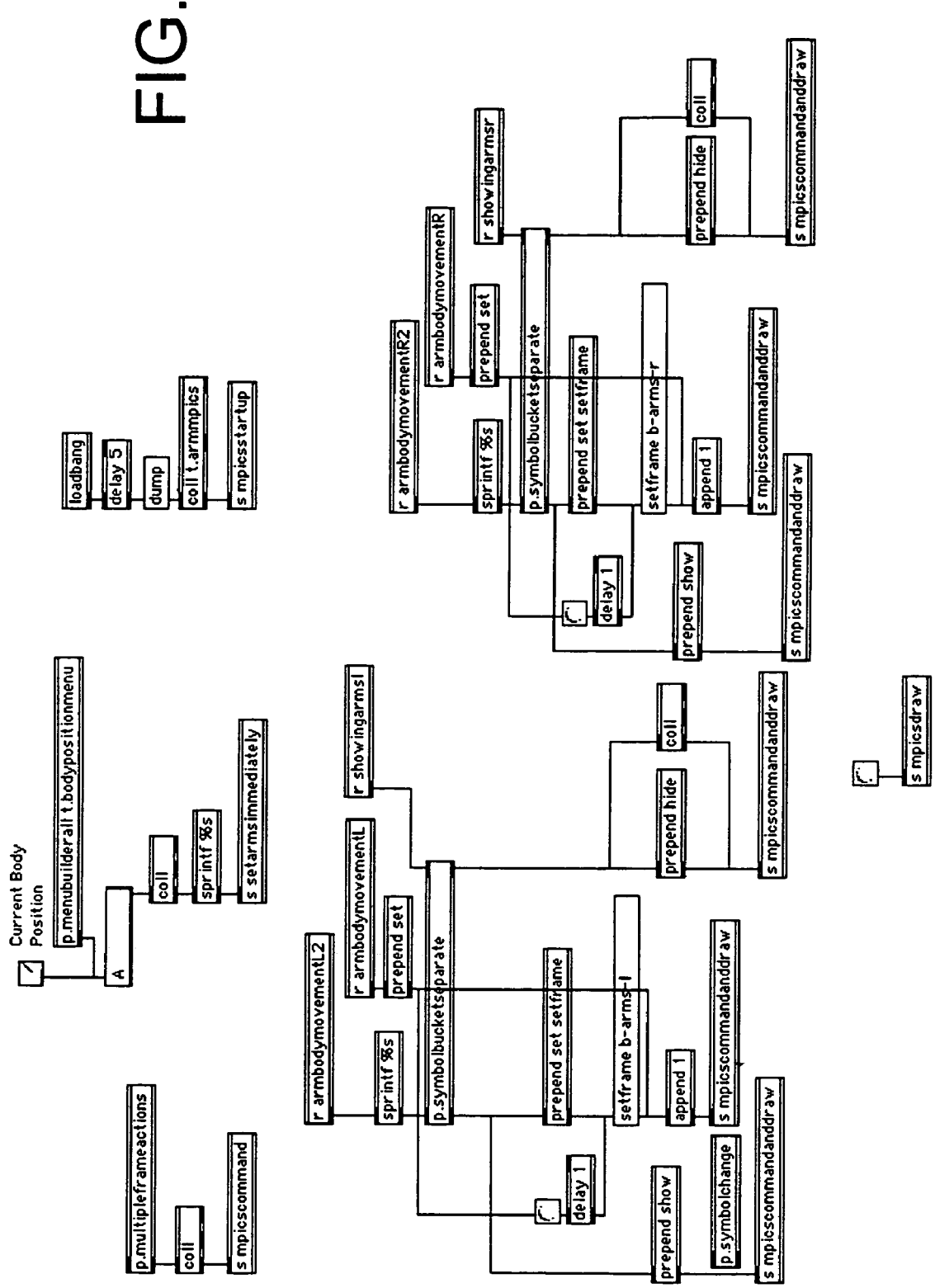
Figure 88:
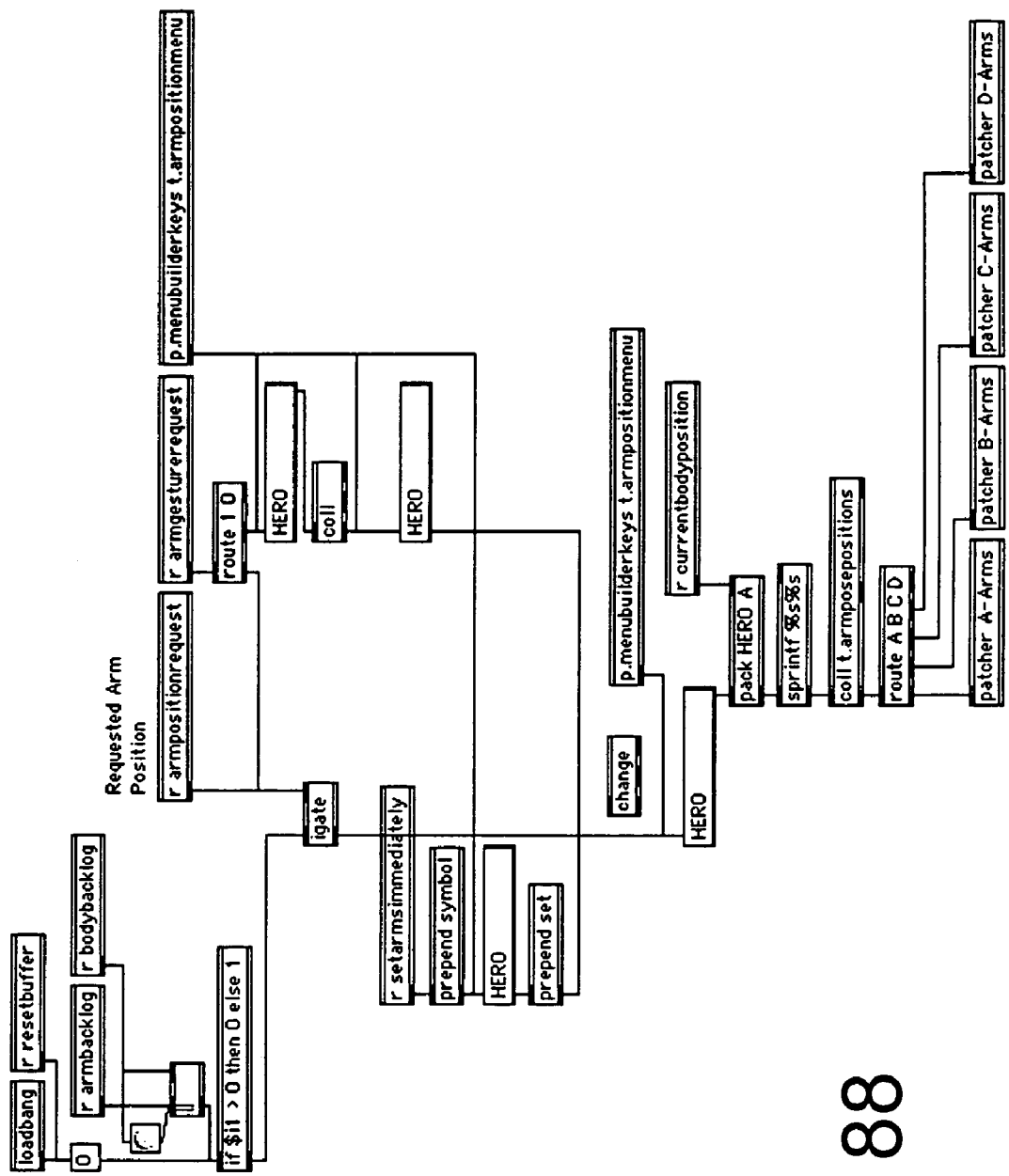

FIGS. 79 through 88 roughly implements one example software embodiment of the TCU 128 functions for the different components of the character of FIGS. 11 through 15. As noted above, equivalents to this example implementation (or sub-components thereof) can also be embodied in hardware. FIG. 79 is the highest level of the character hierarchy for a character, there would be one of these for each character patch which, at the lower levels would define those character elements subject to transitions. FIGS. 80 through 88 implement the changeable elements for the character of FIGS. 11-15. Specifically, FIG. 80 relates to head movement, FIGS. 81 and 82 relate to eye movement, FIGS. 83 and 84 relate to body movement, FIGS. 85 and 86 relate to mouth movement, and FIGS. 87 and 88 relate to arm movements. Of course, the program can be expanded in a straightforward manner for additional character elements (i.e. wings, ears, tail, etc.) or other elements of a frame subject to change, such as foreground elements, background elements, or parameters such as lighting, colors, opaqueness, twist, warp, etc. (i.e. those defined in the cells of the transition table).

Figure 89:
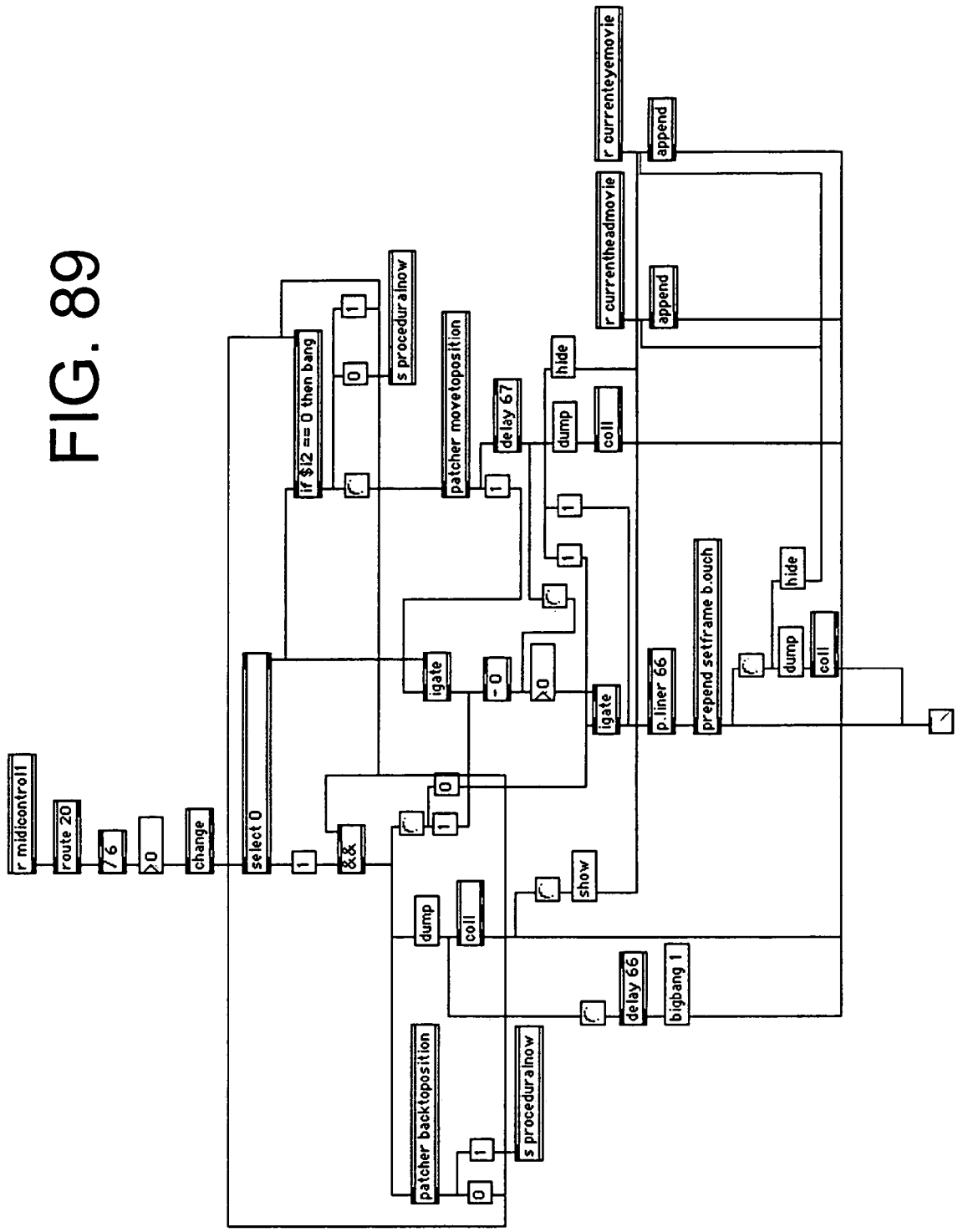
FIG. 89 is an example procedural for the character of FIG. 11.

FIG. 89 is an example procedural, written using MAX, which causes a character to react to pain with an "Ouch!".

It should be understood that the above description is only representative of illustrative embodiments. For the convenience of the reader, the above description has focused on a representative sample of all possible embodiments, a sample that teaches the principles of the invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. One of ordinary skill will appreciate that many of those undescribed embodiments incorporate the same principles of the invention and others are equivalent.

What is claimed is:

1. An animation system comprising:
   an audio analysis unit having an audio output and a state change output; and
   a control unit having an input and an output, the input being constructed to receive a state change indication from the audio analysis unit, the control unit being further constructed to generate compositing command information for individual component elements of an animation frame and send the compositing command information out the output,
   a compositing unit constructed to create a composite image sequence, from individual graphic elements, based upon the compositing command information received from the control unit, the composite image sequence being synchronized to an audio stream received from the audio output of the audio analysis unit, and
   wherein the control unit comprises a transition controller and a transition table.

2. The animation system of claim 1, further comprising a cueing unit coupled to the control unit.

3. The animation system of claim 1 further comprising a graphics database coupled to the compositing unit, the graphics database having graphic information stored for access by the compositing unit.

4. The animation system of claim 3 wherein the graphics database comprises digital images.

5. The animation system of claim 3 wherein the graphics database comprises image definition information.

6. The animation system of claim 1 further comprising a timeline recorder coupled to the control unit.

7. The animation system of claim 1 wherein the control unit further comprises a state change controller.

8. The animation system of claim 7 wherein the state change controller is a trigger controller.

9. The animation system of claim 7 wherein the state change controller is a continuous controller.

10. The animation system of claim 7 wherein the state change controller is a programmed event controller.

11. The animation system of claim 1 wherein the audio analysis unit comprises a signal analysis module.

12. The animation system of claim 11 wherein the signal analysis module is constructed to perform a fast fourier transform on an input audio stream.

13. The animation system of claim 12 further comprising classification bandwidth settings defining between at least two frequency bands and about five frequency bands.

14. The animation system of claim 13 wherein the classification bandwidth settings are tunable.

15. The animation system of claim 12 wherein the signal analysis module is constructed to output spectral content within the at least two frequency bands and about five frequency bands, power and zero crossing information for the input audio stream.

16. The animation system of claim 1 wherein the audio analysis unit comprises a mouth classification unit constructed to receive spectral analysis information and output mouth state information for provision to the control unit.

17. The animation system of claim 1 wherein the audio analysis unit further comprises a classification table.

18. The animation system of claim 17 wherein the classification table associates spectral information with mouth state information.

19. The animation system of claim 1 wherein the audio analysis unit further comprises a signal analysis module and a mouth classification unit.

20. The animation system of claim 19 wherein the signal analysis module is one of at least two signal analysis modules.

21. The animation system of claim 20 wherein the at least two signal analysis modules share the mouth classification unit.

22. The animation system of claim 19 wherein the signal analysis module is one of at least two signal analysis modules and the mouth classification unit is one of at least two mouth classification units.

23. The animation system of claim 22 wherein each signal analysis module is coupled to a mouth classification unit in a one-to-one relationship.

24. The animation system of claim 19 further comprising a multiplexor coupled to the signal analysis module and a demultiplexor coupled to the mouth classification unit so that at least two audio tracks can share the signal analysis module.

25. The animation system of claim 19 wherein the signal analysis module performs time-slice pre-filtering.

26. The animation system of claim 1 wherein the audio analysis unit and compositing unit run on a single computer.

27. The animation system of claim 1 wherein the audio analysis unit runs on of a first computer and the compositing unit runs on a second computer.

28. The animation system of claim 1 wherein each of the audio analysis unit, control unit and compositing unit run on separate computers.

29. The animation system of claim 1 wherein the control unit is constructed to accept MIDI signals.

30. The animation system of claim 1 wherein the audio analysis unit further comprises an audio delay device constructed to output the audio stream.

31. The animation system of claim 1 further comprising:
a processor;
storage, communicatively coupled to the processor; and
a program comprising instructions stored in the storage which, when executing, implements functions of the audio analysis unit.

32. The animation system of claim 1 further comprising:
a processor;
storage, communicatively coupled to the processor; and
a program comprising instructions stored in the storage which, when executing, implements functions of a transition controller.

33. The animation system of claim 1 further comprising:
a processor;
storage, communicatively coupled to the processor; and
a program comprising instructions stored in the storage which, when executing, implements functions of a compositing engine.

34. The animation system of claim 1 further comprising a transition table.

35. The animation system of claim 34 wherein the transition table includes entries to effect an in-pose transition.

36. The animation system of claim 34 wherein the transition table includes entries to effect a pose to pose transition.

37. The animation system of claim 34 wherein the transition table further comprises at least one of a command, a program segment, data, control information, a direct reference to an image, an indirect reference to an image, vector description information, a location, a transformation, a tag, a magnification factor, a zoom factor, a function or a parameter.

38. An animation development system comprising:
a library of graphic elements defining steps in a sequence to effect a change from one state to another state and capable of being composited together into animation frames, wherein the library comprises data representing mouth positions during speech;
a controller constructed to respond to state change information and generate graphic element change commands in response;
a delay having an input constructed to accept an audio stream; and
a compositing engine coupled to the library and the controller so that when the graphic element change commands generated by the controller are received, the controller will access the library and generate composite animation frames incorporating selected graphical elements identified by the steps in the sequence based upon the graphic element change commands.

39. The animation development system of claim 38 wherein the library further comprises character component elements.

40. The animation development system of claim 38 wherein the controller is further constructed to respond to audio analysis state change information.

41. The animation development system of claim 40 wherein the state change information is usable to effect a change in a graphic element other than a mouth.

42. The animation development system of claim 40 wherein the state change information is usable to effect a change in a mouth graphic element.

43. The animation development system of claim 40 wherein the controller is constructed to respond to audio analysis state change information generated from the audio stream and the delay is constructed to delay the audio stream by an amount sufficient to allow for synchronization of the audio stream with incorporated graphical elements.

44. A method of creating an image stream comprising:
stepping through individual components of a first transition sequence for a first image component element based upon first state change information;
correlating the individual components of the first transition sequence to first stored graphical information representing the first image component element as the first transition sequence is stepped through;
stepping through individual components of a second transition sequence for a second image component element based upon second state change information;
correlating the individual components of the second transition sequence to second stored graphical information representing the second image component element as the second transition sequence is stepped through; and
compositing the first stored graphical information and the second stored graphical information into frames such that, as the first and second transition sequences are stepped through, a sequence of composite frames comprising the image stream is created including the first stored graphical information and the second stored graphical information.

45. The method of claim 44 further comprising performing a format conversion on the image stream.

46. The method of claim 44 further comprising displaying the image stream in real time.

47. The method of claim 44 further comprising recording the image stream.

48. The method of claim 47 further comprising laying the image stream to tape.

49. The method of claim 44 further comprising analyzing an input audio stream.

50. The method of claim 49 further comprising synchronizing the input audio stream to the image stream.

51. The method of claim 49, wherein the first stored graphical information comprises mouth shapes, the method further comprising synchronizing the mouth shapes to the input audio stream based upon the analyzing.

52. The method of claim 49 wherein the analyzing comprises performing a Fast Fourier Transform on the audio stream.

53. The method of claim 49 further comprising correlating mouth images to the audio stream based upon a result of the analysis.

54. The method of claim 49 further comprising pre-filtering the audio stream.

55. A method of constraining external control of a performance of an animation comprising:
defining a universe of explicit state-to-state transitions for the performance, each of the explicit state-to-state transitions being represented by a defined sequence of identifiers;
receiving information indicating that a performer has triggered a transition from a current state to a new state;

determining if the new state is a defined goal state that is reachable by a state-to-state transition within the universe of explicit state-to-state transitions and, if so, compositing an image sequence into the animation based upon a sequence of identifiers defined for the state-to-state transition, otherwise, compositing a default image sequence into the animation.

56. The method of claim 55 further comprising:
compositing a pre-composited image sequence into the animation.

57. The method of claim 56 wherein the pre-composited image sequence is a procedural.

58. A system for producing a animation video comprising:
means for receiving a cue input and outputting a state change indication representing a transition end state;
means, coupled to the means for receiving, for determining whether a current state corresponds to the transition end state and for issuing a command when the current state does not correspond to the transition end state;
means, coupled to the means for determining, for recording a timeline of transitions; compositing means for receiving the command and outputting a composite frame containing a graphical image element associated with the command; and
frame buffer means for receiving the composite frame and outputting it to one of a screen or a recording device.

59. A method of creating a performable character from existing image assets, the existing image assets comprising an original sequence of composite frames that change from an original state to a new state as the original sequence is stepped through, the method comprising:
deconstructing pieces of at least some of the composite frames to obtain a series of component image elements extracted from the composite frames and representing a change of a component between one state and another state;
creating a database of the series of component image elements, the database being constructed such that any individual component image element can be accessed independent of any other individual component image element from the series; and
integrating the database into a system such that, when state change information calls for a transition in the component from a first state to a second state, at least some of the individual component image elements in the database for the component will be accessed based upon a transition sequence defined in the system for the transition.

60. The method of claim 59 further comprising:
indexing the database.

61. The method of claim 59 wherein the deconstructing comprises:
masking unwanted elements from a sequence of the existing image assets.

62. A method of creating an animation from a common image inventory, the method comprising:
receiving a first input audio stream during a time period;
receiving first state change indications identifying independent transitions of individual component elements between initial states and new states during the time period;
compositing first component image elements and first mouth component image elements into a first sequence of first individual frames, the first individual frames collectively representing the animation, the first component image elements being identified from the common image inventory based upon the first state change indications and the first mouth component image elements being identified from the common image inventory based upon an analysis of the first input audio stream; and
outputting the animation.

63. The method of claim 62 wherein the animation is one of at least two animations, the method further comprising:
receiving a second input audio stream during the time period; and
compositing the first component image elements and second mouth component image elements into a second sequence of second individual frames, the second individual frames collectively representing a second of the at least two animations, the first component image elements being identified from the common image inventory based upon the first state change indications and the second mouth component image elements being identified from the common image inventory based upon an analysis of the second input audio stream.

64. The method of claim 63 wherein the first input audio stream is in a first language and the second input audio stream is in a second language.

65. The method of claim 63 wherein the compositing the first component image elements and first mouth component image elements into the first sequence of first individual frames and the compositing the first component image elements and the second mouth component image elements into the second sequence of second individual frames occurs during the time period.

66. The method of claim 62 further comprising:
recording the first state change indications.

67. The method of claim 66 further comprising:
receiving a second input audio stream during a second time period;
playing back the recorded first state change indications in synchrony with the second input audio stream; and
compositing the first component image elements and second mouth component image elements into a second sequence of second individual frames, the second individual frames collectively representing a second of the at least two animations, the first component image elements being identified from the common image inventory based upon the recorded first state change indications and the second mouth component image elements being identified from the common image inventory based upon an analysis of the second input audio stream.

68. The method of claim 62 wherein the animation is one of at least two animations, the method further comprising:
receiving second state change indications identifying independent transitions of second individual component elements between second initial states and second new states during the time period; and
compositing second component image elements and first mouth component image elements into a second sequence of second individual frames, the second individual frames collectively representing a second of the at least two animations, the second component image elements being identified from the common image inventory based upon the second state change indications and the first mouth component image elements being identified from the common image inventory based upon an analysis of the first input audio stream.

69. The method of claim 62 further comprising:
following the outputting, editing the animation.

70. A method of simultaneously creating two animations, each having a character sharing common character image elements reflecting actions of the character and differing mouth image elements, the differing mouth image elements comprising first mouth image elements corresponding to a first language in the first animation and second mouth image elements corresponding to a second language in a second animation, the method comprising:

receiving a first audio stream in the first language and a second audio stream in a second language;

analyzing the first audio stream to obtain a first mouth state stream;

analyzing the second audio stream to obtain a second mouth state stream;

identifying a series of first mouth image elements using the first mouth state stream;

identifying a series of second mouth image elements using the second mouth state stream;

compositing a series of character image elements and the series of first mouth image elements together to create a first animation; and compositing the second series of character image elements and the series of second mouth image elements together to create a second animation.

71. A method of performing a live animation comprising:

receiving a series of signals representing animation element changes based upon movements of a motion capture unit;

correlating individual stored image components to the signals based upon a defined sequence of transition identifiers; and compositing the individual stored image components into frames of an animation, based upon the defined sequence, such that the movements of the motion capture unit are reflected in the animation as a sequence of the individual stored image components.

72. An animateering apparatus comprising:

an input converter having an output generator constructed to generate output patterns, each pattern being a function of a particular input supplied to the input converter;

a compositing engine;

a set of selectable images of a component, each image being combinable into a composite animation frame by the compositing engine; and an ordered list of entries, each of the entries identifying a step in a sequence that effects a change to the component as function of a generated output of the input converter when the entries are stepped through, an individual entry in the step identifying an image of the component in a specified state to be provided to the compositing engine from the set of images, so that when an input is applied to the input converter, a corresponding series of composite animation frames is created.

73. The apparatus of claim 72 wherein each of the entries includes an index into the set of selectable images.

74. The apparatus of claim 72 wherein each of the entries includes an image parameter.

75. The apparatus of claim 74 wherein the image parameter comprises at least one location, rotation, translation, scale, or spatial orientation parameter.

76. The apparatus of claim 75, wherein the parameter consists of a two-dimensional parameter.

77. The apparatus of claim 75, wherein the parameter consists of a three-dimensional parameter.

78. The apparatus of claim 74 wherein the image parameter comprises at 1 east one color, shading, shadow, or transparency parameter.

79. The apparatus of claim 72 further including an input device connected to the input converter, wherein the input device is at least one of a MIDI board, a signal processor, a waldo, a tracking device, a spot detector, a motion sensor, or a computer keyboard.

80. The apparatus of claim 72 wherein the action is one of multiple actions.

81. The apparatus of claim 80 wherein each of the multiple of actions is contained in a single table for a character.

82. The apparatus of claim 80 further comprising an additional set of selectable images of an additional component, wherein the component and the additional component are different from each other.

83. An animateering method comprising:

specifying a component from among multiple components subject to a parametric change; and defining an action for the component as an ordered list of data items which can be dynamically sequentially stepped through in an order based upon a change in an input value such that, a first change from a first input value to a second input value will cause a first sequential stepping from a first data item to a second data item and cause a corresponding first parametric change in the component, and a second change from the second input value to the first input value will cause a second sequential stepping from the second data item to the first data item and a corresponding second parametric change in the component.

84. The method of claim 83 wherein the first sequential stepping comprises m sequential steps and the second sequential stepping comprises n sequential steps.

85. The method of claim 84 wherein m is greater than n.

86. The method of claim 84 wherein m is less than n.

87. The method of claim 84 wherein m is equal to n.

* * * * *